(12) United States Patent  
Yamasaki

(10) Patent No.: US 7,593,619 B2  
(45) Date of Patent: Sep. 22, 2009

(54) DATA PROCESSING UNIT AND METHOD, AND PROGRAM

(75) Inventor: Kenji Yamasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 820 days.

(21) Appl. No.: 10/493,584

(22) PCT Filed: Aug. 27, 2003

(86) PCT No.: PCT/JP03/10822

§ 371 (c)(1),  
(2), (4) Date: Apr. 23, 2004

(87) PCT Pub. No.: WO2004/021701

PCT Pub. Date: Mar. 11, 2004

(65) Prior Publication Data

US 2004/0247284 A1    Dec. 9, 2004

(30) Foreign Application Priority Data

Aug. 27, 2002    (JP) ............................. 2002-247161

(51) Int. Cl.  
*G11B 27/00*    (2006.01)  
*H04N 5/93*    (2006.01)

(52) U.S. Cl. ............................. 386/55; 386/52; 386/46; 360/7

(58) Field of Classification Search .................... 386/55, 386/52, 46; 360/7  
See application file for complete search history.

(56) References Cited

U.S. PATENT DOCUMENTS 5,463,599 A    10/1995    Yifrach et al.

(Continued)

FOREIGN PATENT DOCUMENTS

GB    2 269 930    2/1994

(Continued)

OTHER PUBLICATIONS

Hochguertel G: "Nonlineare Aufzeichnung Mit Festplatten-Camcorder" Fernseh Und Kinotechnik, Vde Verlag GmbH. Berlin, DE, vol. 50, No. 10, Oct. 1996, pp. 578-582, XP000641203 ISSN: 0015-0142.

(Continued)

*Primary Examiner*—Thai Tran  
*Assistant Examiner*—Girumsew Wendmagegn  
(74) *Attorney, Agent, or Firm*—Frommer Lawrence & Haug LLP; William S. Frommer; Thomas F. Presson

(57) ABSTRACT

The present invention relates to a data processing apparatus and method and to a program in which a user can reliably record desired data. An instructed recording start point B indicates a position at which AV data captured when the user gives an instruction to start recording is recorded. An instructed recording end point C indicates a position at which AV data captured when the user gives an instruction to finish recording is recorded. Extra pre-AV data before the instructed recording start point B and extra post-AV data after the instructed recording end point C are recorded. Accordingly, the user can record required images (sound) more reliably, and thus, the possibility of the user missing desired images (sound) is decreased. The present invention is applicable to a video image recording apparatus.

14 Claims, 62 Drawing Sheets

U.S. PATENT DOCUMENTS

| | | | |
|---|---|---|---|
| 5,737,481 A * | 4/1998 | Gushima et al. | 386/113 |
| 6,072,645 A | 6/2000 | Sprague | |
| 6,236,802 B1 * | 5/2001 | Yamamoto | 386/52 |
| 6,263,147 B1 | 7/2001 | Tognazzini | |
| 6,965,723 B1 * | 11/2005 | Abe et al. | 386/55 |
| 7,214,868 B2 * | 5/2007 | Abe et al. | 84/600 |
| 2002/0101518 A1 * | 8/2002 | Suda | 348/231 |

FOREIGN PATENT DOCUMENTS

| | | | |
|---|---|---|---|
| GB | 2269930 A * | 2/1994 | |
| GB | 2 335 782 | 9/1999 | |
| JP | 11-146336 | 5/1999 | |
| JP | 2000-348469 | 12/2000 | |
| JP | 2002-232834 | 8/2002 | |
| JP | 2003-111071 | 4/2003 | |
| JP | 2003-219412 | 7/2003 | |
| WO | WO 99/25115 | 5/1999 | |

OTHER PUBLICATIONS

Yasmin Hashmi: "Tapeless Recording ans Editing" Image Technology, British Kinematograph Sound and Television Society, London, GB, vol. 73, No. 10, Oct. 1, 1991, pp. 406-408, XP000225621 ISSN: 0950-2114.

* cited by examiner

FIG. 31

```
1  <?xml version="1.0" encoding="UTF-8"?>
2  <indexFile xmlns="urn:schemas-professionalDisc:index"
3    indexId="0123456789ABCDEF0123456789ABCDEF">
4  <clipTable path="/PROAV/CLPR/"/>
5  <!-- Normal Clip -->
6  <clip id="C0001" umid="0D1213000000000000010444444484EEEE00E0188E130B"
7    file="C0001C01.SMI" fps="59.94" dur="12001" ch="4" aspectRatio="4:3">
8    <video umid="0D1213000000000000010444444484EEEE00E0188E130B"
9      file="C0001V01.MXF" type="DV25_411" header="65536"/>
10   <audio umid="0D1213000000000000010444444484EEEE00E0188E130B"
11     file="C0001A01.MXF" type="LPCM16" header="65536" trackDst="CH1"/>
12   <audio umid="0D1213000000000000010444444484EEEE00E0188E130B"
13     file="C0001A02.MXF" type="LPCM16" header="65536" trackDst="CH2"/>
14   <audio umid="0D1213000000000000010444444484EEEE00E0188E130B"
15     file="C0001A03.MXF" type="LPCM16" header="65536" trackDst="CH3"/>
16   <audio umid="0D1213000000000000010444444484EEEE00E0188E130B"
17     file="C0001A04.MXF" type="LPCM16" header="65536" trackDst="CH4"/>
18   <subStream umid="0D1213000000000000010444444484EEEE00E0188E130B"
19     file="C0001S01.MXF" type="PD-SubStream" header="65536"/>
20   <meta file="C0001M01.XML" type="PD-Meta"/>
21   <meta file="C0001M02.TXT" type="key:0123456789ABCDEF"/>
22   <rtmeta file="C0001R01.BIM" type="std2k" header="65536"/>
23 </clip>
24 <!-- Partial Deleted Clip -->
25 <clip id="C0002" umid="0D1213000000000000010444444484EEEE00E0188E130B"
26   file="C0002C01.SMI" fps="59.94" dur="4000" ch="4" aspectRatio="4:3">
27   <video umid="0D1213000000000000010444444484EEEE00E0188E130B"
28     file="C0002V01.MXF" type="IMX50" header="80000"/>
29   <audio umid="0D1213000000000000010444444484EEEE00E0188E130B"
```

FIG. 32

```
1   file="C0002A01.MXF" type="LPCM16" header="100000" trackDst="CH1"/>
2   <audio umid="0D1213000000000000001044444484EEEE00E0188E130B"
3   file="C0002A02.MXF" type="LPCM16" header="100000" trackDst="CH2"/>
4   <audio umid="0D1213000000000000001044444484EEEE00E0188E130B"
5   file="C0002A03.MXF" type="LPCM16" header="100000" trackDst="CH3"/>
6   <audio umid="0D1213000000000000001044444484EEEE00E0188E130B"
7   file="C0002A04.MXF" type="LPCM16" header="100000" trackDst="CH4"/>
8   <subStream umid="0D1213000000000000001044444484EEEE00E0188E130B"
9   file="C0002S01.MXF" type="PD-SubStream" header="90000"
10  clipBegin="8"/>
11  <meta file="C0002M01.XML" type="PD-Meta"/>
12  <rtmeta file="C0002R01.BIM" type="std2k" header="70000"/>
13  </clip>
14  <!-- Refered Clip -->
15  <clip id="C0003" umid="0D1213000000000000001044444484EEEE00E0188E130B"
16  file="C0003C01.SMI" fps="59.94" dur="100000" ch="4" aspectRatio="4:3"
17  referer="E0001 E0002 E0003"/>
18  <video umid="0D1213000000000000001044444484EEEE00E0188E130B"
19  file="C0003V01.MXF" type="IMX50" header="65536"/>
20  <audio umid="0D1213000000000000001044444484EEEE00E0188E130B"
21  file="C0003A01.MXF" type="LPCM16" header="65536" trackDst="CH1"/>
22  <audio umid="0D1213000000000000001044444484EEEE00E0188E130B"
23  file="C0003A02.MXF" type="LPCM16" header="65536" trackDst="CH2"/>
24  <audio umid="0D1213000000000000001044444484EEEE00E0188E130B"
25  file="C0003A03.MXF" type="LPCM16" header="65536" trackDst="CH3"/>
26  <audio umid="0D1213000000000000001044444484EEEE00E0188E130B"
27  file="C0003A04.MXF" type="LPCM16" header="65536" trackDst="CH4"/>
28  <subStream umid="0D1213000000000000001044444484EEEE00E0188E130B"
29  file="C0003S01.MXF" type="PD-SubStream" header="65536"/>
```

FIG. 33

```
1    <meta file="C0003M01.XML" type="PD-Meta"/>
2    <rtmeta file="C0003R01.BIM" type="std2k" header="65536"/>
3    </clip>
4    <!-- Long GOP -->
5    <clip id="C0004" umid="0D1213000000000000010444444484EEEEE00E0188E130B"
6    file="C0004C01.SMI" fps="59.94i" dur="1200l" ch="4" aspectRatio="16:9"
7    referer="E0004">
8      <video umid="0D1213000000000000010444444484EEEEE00E0188E130B"
9      file="C0004V01.MXF" type="MPEG2HD25_1440_MP@HL" header="65536"/>
10     <audio umid="0D1213000000000000010444444484EEEEE00E0188E130B"
11     file="C0004A01.MXF" type="LPCM16" header="65536" trackDst="CH1"/>
12     <audio umid="0D1213000000000000010444444484EEEEE00E0188E130B"
13     file="C0004A02.MXF" type="LPCM16" header="65536" trackDst="CH2"/>
14     <audio umid="0D1213000000000000010444444484EEEEE00E0188E130B"
15     file="C0004A03.MXF" type="LPCM16" header="65536" trackDst="CH3"/>
16     <audio umid="0D1213000000000000010444444484EEEEE00E0188E130B"
17     file="C0004A04.MXF" type="LPCM16" header="65536" trackDst="CH4"/>
18     <subStream umid="0D1213000000000000010444444484EEEEE00E0188E130B"
19     file="C0004S01.MXF" type="PD-SubStream" header="65536"/>
20     <meta file="C0004M01.XML" type="PD-Meta"/>
21     <meta file="C0004I01.XML" type="PD-PP"/>
22     <rtmeta file="C0004R01.BIM" type="std2k" header="65536"/>
23   </clip>
24   </clipTable>
25   <editlistTable path="/PROAV/EDTR/"/>
26   <editlist id="E0001" umid="0D1213000000000000010444444484EEEEE00E0188E130B"
27   file="E0001E01.SMI" dur="500" fps="59.94i" ch="4" aspectRatio="4:3">
28     <meta file="E0001M01.XML" type="PD-Meta"/>
```

FIG. 34

```
1  </editlist>
2  <editlist id="E0002" umid="0D12130000000000000104444484EEEEE00E0188E130B"
3      file="E0002E01.SMI" dur="500" fps="59.94i" ch="4" aspectRatio="4:3">
4      <meta file="E0002M01.XML" type="PD-Meta"/>
5  </editlist>
6  <editlist id="E0003" umid="0D12130000000000000104444484EEEEE00E0188E130B"
7      file="E0003E01.SMI" dur="500" fps="59.94i" ch="4" aspectRatio="4:3">
8      <meta file="E0003M01.XML" type="PD-Meta"/>
9  </editlist>
10 <editlist id="E0004" umid="0D12130000000000000104444484EEEEE00E0188E130B"
11     file="E0003E01.SMI" dur="500" fps="59.94i" ch="4" aspectRatio="16:9">
12     <meta file="E0003M01.XML" type="PD-Meta"/>
13     <meta file="E0003I01.XML" type="PD-PP"/>
14 </editlist>
15 </editlistTable>
16 </indexFile>
```

FIG. 41

```
1  <?xml version="1.0" encoding="UTF-8"?>
2  <smil xmlns="urn:schemas-professionalDisc:edl:clipInfo"
3  umid=" 0D1213000000000001044444484EEEE00E0188E130B
4  fps="59.94" dur="1200" ch="2" aspectRatio="4:3">
5    <body>
6      <par>
7        <switch>
8          <!-- main stream -->
9          <par systemComponent="IMX50">
10           <video src="urn:smpte:umid: 0D1213000000000001044444484EEEE00E0188E130B"
11             type="IMX50" —
12             clipBegin="smpte-30=00:00:10:00" clipEnd="smpte-30=00:00:30:00 />
13           <audio src="urn:smpte:umid: 0D1213000000000001044444484EEEE00E0188E130B"
14             type="LPCM16" trackDst="CH1" —
15             clipBegin="smpte-30=00:00:10:00" clipEnd="smpte-30=00:00:30:00 />
16           <audio src="urn:smpte:umid: 0D1213000000000001044444484EEEE00E0188E130B "
17             type="LPCM16" trackDst="CH2" —
18             clipBegin="smpte-30=00:00:10:00" clipEnd="smpte-30=00:00:30:00 />
19         </par>
20       </switch>
21     </par>
22   </body>
23 </smil>
```

FIG. 44

```
1  <?xml version="1.0" encoding="UTF-8"?>
2  <smil xmlns="urn:schemas-professionalDisc:edl:clipInfo"
3  umid=" 0D12130000000000010444444484EEEE00E0188E130B
4  fps="59.94i" dur="1200" ch="2" aspectRatio="4,3">
5    <body>
6      <par>
7        <switch>
8          <!-- main stream -->
9          <par systemComponent="IMX50">
10           <video src="urn:smpte:umid: 0D12130000000000010444444484EEEE00E0188E130B"
11             type="IMX50" --
12             clipBegin="smpte-30=00:00:05:00" clipEnd="smpte-30=00:00:30:00 />
13           <audio src="urn:smpte:umid: 0D12130000000000010444444484EEEE00E0188E130B"
14             type="LPCM16" trackDst="CH1" --
15             clipBegin="smpte-30=00:00:05:00" clipEnd="smpte-30=00:00:30:00 />
16           <audio src="urn:smpte:umid: 0D12130000000000010444444484EEEE00E0188E130B "
17             type="LPCM16" trackDst="CH2" --
18             clipBegin="smpte-30=00:00:05:00" clipEnd="smpte-30=00:00:30:00 />
19         </par>
20       </switch>
21     </par>
22   </body>
23 </smil>
```

FIG. 49

```
1  <?xml version="1.0" encoding="UTF-8"?>
2  <indexFile xmlns="urn:schemas-professionalDisc:index"
3    proavId="0123456789ABCDEF0123456789ABCDEF">
4    <clipTable path="/PROAV/CLPR/"/>
5    <!-- Normal Clip -->
6    <clip clipId="C0001" umid="0D1213000000000000010444444484EEEE00E0188E130B"
7      file="C0001C01.SMI" fps="59.94i" dur="750" ch="2" aspectRatio="4:3">
8      <video umid="0D1213000000000000010444444484EEEE00E0188E130B"
9        file="C0001C01.MXF" type="DV25_411" header="65536"  begin="smpte-30=00:00:00:00"
10       clipBegin="smpte-30=00:00:05:00" clipEnd="smpte-30=00:00:30:00"/>
11     <audio umid="0D1213000000000000010444444484EEEE00E0188E130B"
12       file="C0001A01.MXF" type="LPCM16" header="65536" trackDst="CH1"     begin="smpte-30=00:00:00:00"
13       clipBegin="smpte-30=00:00:05:00" clipEnd="smpte-30=00:00:30:00"/>
14     <audio umid="0D1213000000000000010444444484EEEE00E0188E130B"
15       file="C0001A02.MXF" type="LPCM16" header="65536" trackDst="CH2"     begin="smpte-30=00:00:00:00"
16       clipBegin="smpte-30=00:00:05:00" clipEnd="smpte-30=00:00:30:00"/>
17   </clip>
18   <!-- Normal Clip -->
19   <clip clipId="C0002" umid="0D1213000000000000010444444484EEEE00E0188E130C"
20     file="C0002C01.SMI" fps="59.94i" dur="690" ch="2" aspectRatio="4:3">
```

FIG. 50

```
1
2   <video umid="0D1213000000000000010444444484EEEEE00E0188E130C"
3    file="C0002C01.MXF" type="DV25_411" header="65536" begin="smpte-30=00:00:25:00"
4    clipBegin="smpte-30=00:00:10:00" clipEnd="smpte-30=00:00:53:00"/>
5   <audio umid="0D1213000000000000010444444484EEEEE00E0188E130C"
6    file="C0002A01.MXF" type="LPCM16" header="65536" trackDst="CH1" begin="smpte-30=00:00:25:00"
7    clipBegin="smpte-30=00:00:10:00" clipEnd="smpte-30=00:00:53:00"/>
8   <audio umid="0D1213000000000000010444444484EEEEE00E0188E130C"
9    file="C0002A02.MXF" type="LPCM16" header="65536" trackDst="CH2" begin="smpte-30=00:00:25:00"
10   clipBegin="smpte-30=00:00:10:00" clipEnd="smpte-30=00:00:53:00"/>
11    </clip>
12   </clipTable path>
     </indexFile>
```

FIG. 55

```
1   <?xml version="1.0" encoding="UTF-8"?>
2   <smil xmlns="urn:schemas-professionalDisc:edl:editList">
3     <head>
4       <metadata type="Meta">
5         <!-- nonrealtime meta -->
6         <NRMeta xmlns="urn:schemas:professionalDisc:nrt">
7           <ref src="E0002M01.XML"/>
8         </NRMeta>
9       </metadata>
10    </head>
11    <body>
12      <par>
13        <!-- Clip1 -->
14        <ref
15  src="urn:smpte:umid:060A2B340101010501010D1213000000FEDCBA9876543210FEDCBA9876543210"
16  type="edlDoc" begin="smpte-30=00:00:00:00" clipBegin="smpte-30=00:00:05:00" clipEnd="smpte-
17  30=00:00:30:00"/>
18        <!-- Clip2 -->
19        <ref
20  src="urn:smpte:umid:060A2B340101010501010D1213000000EDCBA9876543210FEDCBA9876543210F"
21  type="edlDoc" begin="smpte-30=00:00:25:00" clipBegin="smpte-30=00:00:10:00" clipEnd="smpte-
22  30=00:00:53:00"/>
23      </par>
24    </body>
25  </smil>
```

FIG. 57

```
1   <?xml version="1.0" encoding="UTF-8"?>
2   <smil xmlns="urn:schemas-professionalDisc:edl:editList" >
3     <head>
4       <metadata type="Meta">
5         <!-- nonrealtime meta -->
6         <NRMeta xmlns="urn:schemas:professionalDisc:nrt">
7           <ref src="E0004M01.XML"/>
8         </NRMeta>
9       </metadata>
10    </head>
11    <body>
12      <par>
13        <!-- Clip1 -->
14        <video src="urn:smpte:umid:060A2B340101010501010D1213000000FEDCBA9876543210FEDCBA9876543210"
15          type="IMX50" begin="smpte-30=00:00:00:00" clipBegin="smpte-30=00:01:00:00" clipEnd="smpte-30=00:05:00:00"/>
16        <audio src="urn:smpte:umid:060A2B340101010501010D1213000000FEDCBA9876543210FEDCBA9876543210"
17          type="LPCM16" begin="smpte-30=00:00:00:00" clipBegin="smpte-30=00:01:00:00" clipEnd="smpte-30=00:04:59:28"/>
18        <!-- Clip2 -->
19        <video src="urn:smpte:umid:060A2B340101010501010D1213000000EDCBA9876543210FEDCBA9876543210F"
20          type="IMX50" clipBegin="smpte-30=00:02:00:00" clipEnd="smpte-30=00:03:30:00" begin="smpte-30=00:04:00:00"/>
21        <audio src="urn:smpte:umid:060A2B340101010501010D1213000000EDCBA9876543210FEDCBA9876543210F"
22          type="LPCM16" clipBegin="smpte-30=00:01:59:28" clipEnd="smpte-30=00:03:30:00" begin="smpte-30=00:03:59:28"/>
23      </par>
24    </body>
25  </smil>
```

DATA PROCESSING UNIT AND METHOD, AND PROGRAM

TECHNICAL FIELD

The present invention relates to data processing apparatuses and methods, and programs, and more particularly, to a data processing apparatus and method, and a program that allow a user to record desired video images (sound) more reliably.

BACKGROUND ART

Hitherto, a video image recording apparatus, for example, a camcorder (registered), starts recording images (moving pictures) or sound on a recording medium in response to an instruction to start recording input from a user, and finishes recording images or sound on the recording medium in response to an instruction to finish recording input from the user. Upon completing image-capturing processing by the video image recording apparatus, the user is able to edit images or sound by extracting desired zones from the images or sound recorded on the recording medium and splicing the extracted zones by using an editing device (may be the video image recording apparatus if the video image recording apparatus is provided with an editing function).

When editing images captured by a video image recording apparatus, however, the user cannot use the images temporally before the recording start point since they are not recorded on the recording medium. Similarly, the user cannot use the images temporally after the recording end point since they are not recorded on the recording medium.

In particular, when a user who captures images (hereinafter such a user is sometimes referred to as an "image capturer") and a user who edits the captured images (hereinafter such a user is sometimes referred to as an "editor") are not the same user, the images required by the image capturer and the images required by the editor are, in many cases, not completely the same. There are many cases in which the editor wishes to use (check) the images before and after the images recorded on the recording medium. However, the editor is unable to do so.

DISCLOSURE OF INVENTION

The present invention has been made in view of the above-described background, and it is an object of the present invention to record required images (sound) more reliably.

A data processing apparatus of the present invention includes: control means for generating a control signal based on instruction information from a user; and recording means for recording data on a recording medium based on the control signal. The control means controls the recording means to continue recording the data on the recording medium from an instructed recording end time at which an instruction to finish recording is received as the instruction information while the data is being recorded on the recording medium by said recording means to a real recording end time determined by a predetermined condition, and to finish recording the data on the recording medium at the real recording end time.

In addition to the data for an instructed recording period from an instructed recording start time at which an instruction to start recording is received as the instruction information to the instructed recording end time at which an instruction to finish recording is received as the instruction information, the control means may control the recording means to record on the recording medium the data for a first period from a time before the instructed recording start time, which is determined by a first condition in accordance with the instructed recording start time, to the instructed recording start time, and the control means may manage as a clip the instructed recording period and at least one of the data for the first period and the data for a second period from the instructed recording end time to the real recording end time, and may generate management information for managing the instructed recording period and the data for at least one of the first period and the second period as an extended clip.

The management information may be generated for each of the extended clips, and may contain clip information for specifying a head and an end of each of the extended clips and for specifying a head and an end of each of the clips.

At least one of the information for specifying the head of the clip and the information for specifying the end of the clip may be changeable within a range between the head and the end of the extended clip.

The control means may play back the clips according to clip-playable information when an instruction to playback the clips in the order in which the chips are recorded is given.

The management information may include an edit list which contains information for specifying a playback start point and a playback end point of each of the extended clips so as to play back at least part of the data of at least one of the extended clips.

At least one of the playback start point and the playback end point of each of the extended clips in the edit list may be changeable.

When at least one of the playback start point and the playback end point of each of the extended clips in the edit list is changed, the control means may automatically change information for specifying the head and the end of the corresponding clip information when the changed playback start point or playback end point is outside the range specified by the head and the end of the clip information.

The control means may control the recording means to record the management information on the recording medium.

The control means may make the management information for managing the extended clip invisible to a user in a normal mode, and may allow the user to see the management information for managing the extended clip.

The control means may play back the clips in the order in which the clips are recorded based on an index, contained in the management information, for managing at least one of the clips recorded on the recording medium.

The index may contain information for specifying the head and the end of each of the clips, and, when the clips are played back in the order in which the clips are recorded, the control means may play back from the head to the end of each of the clips based on the information for specifying the head and the end.

The data processing apparatus may further include: capturing means for capturing the data; and storage means for temporarily storing the data captured by the capturing means. The recording means may read the data stored in the storage means and record the data on the recording medium.

The data processing apparatus may further include: generation means for generating time codes; and formation means for forming management information containing a first time code generated by the generation means at a time at which an instruction to start recording is given and a second time code generated by the generation means at a time at which an instruction to finish recording is given.

The data processing apparatus may further include playback means for playing back the data between the first time code and the second time code based on the management information.

The control means may control the recording means to repeatedly overwrite the data in a predetermined zone of the recording medium until an instruction to start recording the data is given.

A data processing method of the present invention includes: a detection step of detecting a real recording end time determined by a predetermined condition after an instructed recording end time at which an instruction to finish recording is given as instruction information from a user while data is being recorded on a recording medium; and a control step of continuing recording the data on the recording medium from the instructed recording end time to the real recording end time, and of finishing recording the data on the recording medium at the real recording end time.

In the processing of the control step, in addition to the data for an instructed recording period from an instructed recording start time at which an instruction to start recording is received as the instruction information to the instructed recording end time at which an instruction to finish recording is received as the instruction information, the data for a first period from a time before the instructed recording start time, which is determined by a first condition in accordance with the instructed recording start time, to the instructed recording start time may be controlled to be recorded. The data processing method may further include a generation step of managing as a clip the instructed recording period and at least one of the data for the first period and the data for a second period from the instructed recording end time to the real recording end time, and of generating management information for managing the instructed recording period and the data for at least one of the first period and the second period as an extended clip.

The management information may be generated for each of the extended clips, and may contain clip information for specifying a head and an end of each of the extended clips and for specifying a head and end of each of the clips.

At least one of the information for specifying the head of the clip and the information for specifying the end of the clip may be changeable within a range between the head and the end of the extended clip.

The management information may include an edit list which contains information for specifying a playback start point and a playback end point of each of the extended clips so as to play back at least part of the data of at least one of the extended clips.

At least one of the playback start point and the playback end point of each of the extended clips in the edit list may be changeable.

The data processing method may further include a changing step of, when at least one of the playback start point and the playback end point of each of the extended clips in the edit list is changed, automatically changing information for specifying the head and the end of the corresponding clip information when the changed playback start point or playback end point is outside the range specified by the head and the end of the clip information.

A program of the present invention allows a computer to execute a data processing method which includes: a detection step of detecting a real recording end time determined by a predetermined condition after an instructed recording end time at which an instruction to finish recording is given as instruction information from a user while data is being recorded on a recording medium; and a control step of continuing recording the data on the recording medium from the instructed recording end time to the real recording end time, and of finishing recording the data on the recording medium at the real recording end time.

According to the data processing apparatus and method, and the program of the present invention, data is recorded on a recording medium based on a control signal generated based on instruction information from a user. The data continues to be recorded from an instructed recording end time at which an instruction to finish recording is given as the instruction information while the data is being recorded on the recording medium to a real recording end time determined by a predetermined condition, and the recording of the data on the recording medium is finished at the real recording end time.

The data recording apparatus may be an independent device or a block performing recording processing (or playback processing) of a recording/playback apparatus. The data processing apparatus is applicable to, for example, a video image recording device.

BRIEF DESCRIPTION OF THE DRAWINGS

FIG. 31 illustrates an example of the program of an index file.

FIG. 32 illustrates the program of the index file continued from the program of FIG. 31.

FIG. 33 illustrates the program of the index file continued from the program of FIG. 32.

FIG. 34 illustrates the program of the index file continued from the program of FIG. 33.

FIG. 41 illustrates an example of the program of a clip information file.

FIG. 44 illustrates an example of the program of a clip information file.

FIG. 49 illustrates an example of the program of an index file.

FIG. 50 illustrates the program continued from the program of FIG. 49.

FIG. 55 illustrates an example of the program of an edit list file.

FIG. 57 illustrates an example of the program of an edit list file.

BEST MODE FOR CARRYING OUT THE INVENTION

Figure 1:
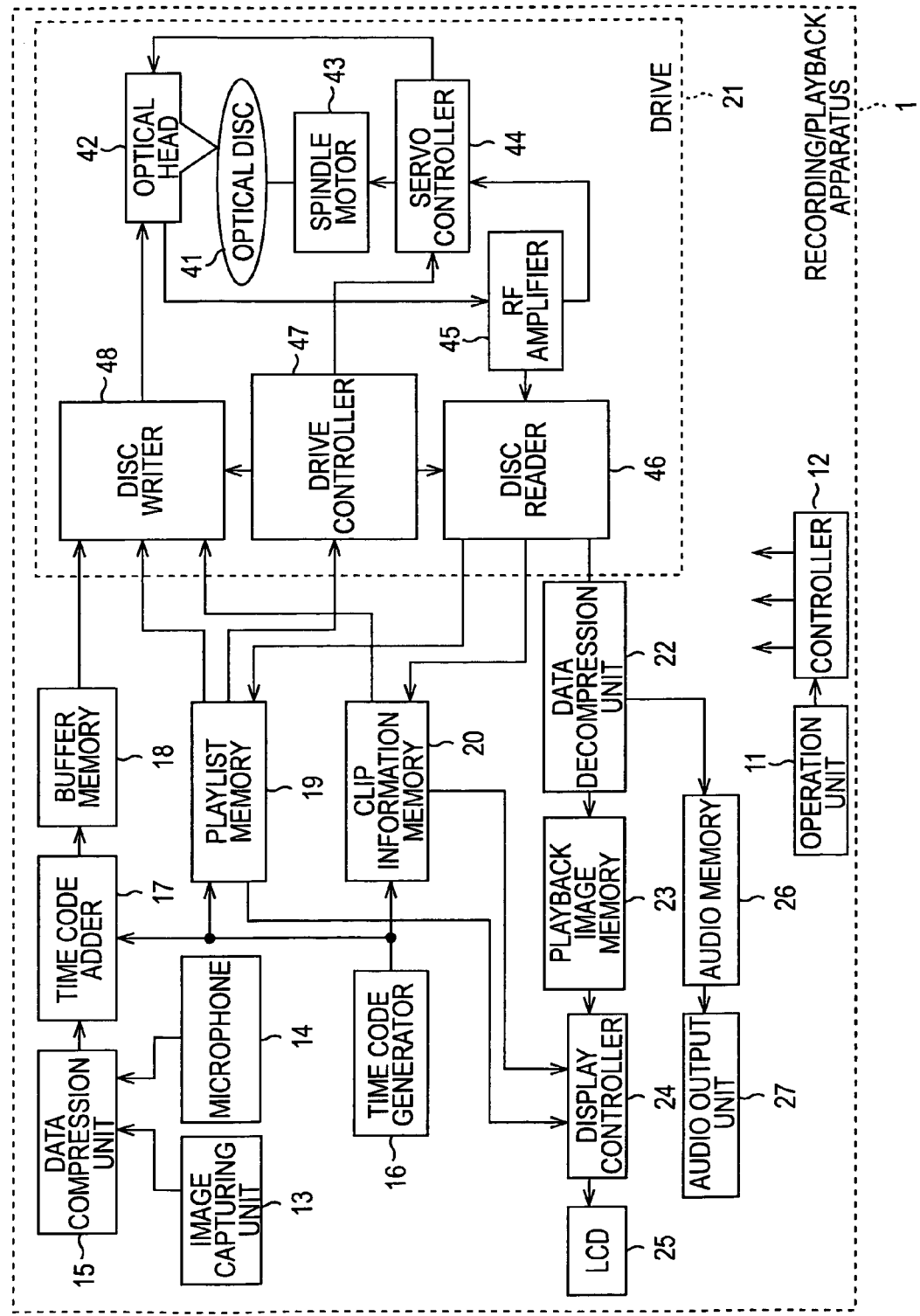
FIG. 1 is a block diagram illustrating an example of the configuration of a recording/playback apparatus to which the present invention is applied.

FIG. 1 illustrates an example of the configuration of a recording/playback apparatus 1 as a video image recording apparatus to which a data processing apparatus of the present invention is applied.

An operation unit 11 includes a plurality of buttons. Upon receiving the input of an operation from a user, the operation unit 11 reports operation information concerning the input operation to a controller 12.

The controller 12 controls the individual elements of the recording/playback apparatus 1 according to a preset program and the operation information reported from the operation unit 11, and executes processing such as recording, playback, and editing, which are described below.

An image capturing unit 13 is formed of, for example, an image capturing device such as a CCD (Charged Coupled Device). A microphone 14 collects sound around the recording/playback apparatus 1. A data compression unit 15 compresses image (moving picture) signals captured by the image capturing unit 13 and audio signals supplied from the microphone 14 according to a method, for example, MPEG (Moving Picture Experts Group)1, MPEG2, MPEG4, JPEG (Joint Photographic Experts Group), or JPEG2000, so as to generate compressed data, and supplies it to a time code adder 17. Data such as video data and audio data contained in the compressed data is sometimes referred to as "material data". It is not essential that the material data be compressed.

Under the control of the controller 12, a time code generator 16 generates a time code and supplies it to the time code adder 17, a playlist memory 19, and a clip information memory 20. The time code adder 17 adds a time code to the compressed data from the data compression unit 15, and supplies the compressed data to a buffer memory 18. The buffer memory 18 temporarily stores the compressed data provided with the time code supplied from the time code adder 17, and supplies the compressed data to a disc writer 48 when necessary. The buffer memory 18 overwrites the oldest compressed data by the latest compressed data supplied from the time code adder 17 after storing the compressed data up to the maximum storage capacity, and details thereof are given below.

The playlist memory 19 stores therein a time code from the time code generator 16 generated at a time when an instruction to start recording is input into the operation unit 11 from the user, and also stores therein a time code from the time code generator 16 generated at a time when an instruction to finish recording is input from the user as playlist information. The playlist memory 19 then supplies these time codes to the disc writer 48. Upon receiving playlist information from a disc reader 46, the playlist memory 19 stores the playlist information and supplies it to a display controller 24. The playlist memory 19 also stores a new playlist created by editing processing, and supplies the playlist to the disc writer 48.

The clip information memory 20 stores a recording start position on which an image (moving picture) is recorded on the optical disc 41, the time code of a recording start point, and the time code of a recording end point as clip information, and supplies them to the disc writer 48. The clip information memory 20 also stores clip information supplied from the disc reader 46 and supplies it to the display controller 24.

A drive 21 includes an optical head 42, a spindle motor 43, a serve controller 44, an RF amplifier 45, the disc reader 46, a drive controller 47, and the disc writer 48. When the optical disc 41 is loaded into the drive 21, the drive 21 records or reads data on and from the optical disc 41. The configuration of the drive 21 is as follows.

The optical head 42 controls an output of laser light based on a recording signal supplied from the disc writer 48 so as to record the recording signal on the optical disc 41. The optical head 42 also converges laser light into the optical disc 41, photoelectrically converts light reflected by the optical disc 41 so as to generate a current signal, and supplies the current signal to the RF amplifier 45. The position of the laser light applied to the optical disc 41 is controlled by a servo signal supplied from the serve controller 44 to the optical head 42.

The spindle motor 43 drives the rotation of the optical disc 41 at, for example, CLV (Constant Linear Velocity) or CAV (Constant Angular Velocity), based on a spindle motor drive signal from the serve controller 44.

The servo controller 44 performs a focus servo operation or a tracking servo operation. More specifically, the servo controller 44 generates a focus servo signal or a tracking servo signal based on a focus error signal or a tracking error signal, respectively, from the RF amplifier 45, and supplies the corresponding signal to an actuator (not shown) of the optical head 42. The servo controller 44 also generates a spindle motor drive signal for driving the spindle motor 43 so as to perform a spindle servo operation for controlling the optical disc 41 to rotate at a desired rotational speed.

The servo controller 44 also performs sled control to change the position at which laser light is applied to the optical disc 41 by moving the optical head 42 in the radial direction of the optical disc 41. The position of the optical disc 41 from which a signal is read is set by the drive controller 47, and the drive controller 47 controls the position of the optical head 42 so that the signal can be read from the corresponding position.

The RF amplifier 45 generates a focus error signal, a tracking error signal, and a playback signal based on a current signal from the optical head 42, and supplies the tracking error signal and the focus error signal to the servo controller 44 and also supplies the playback signal to the disc reader 46.

The disc reader 46 demodulates the playback signal supplied from the RF amplifier 45 so as to generate playback data and detects errors. The disc reader 46 then temporarily stores the playback data in a built-in memory, and supplies the playback data to a data decompression unit 22 when necessary. If the demodulated playback signal supplied from the RF amplifier 45 is playlist data, the disc reader 46 supplies the playlist data to the playlist memory 19. If the demodulated playback data supplied from the RF amplifier 45 is clip information data, the disc reader 46 supplies the clip information to the clip information memory 20.

The drive controller 47 controls the disc writer 48 and the servo controller 44 to record data on the optical disc 41. More specifically, the drive controller 47 controls the disc writer 48 to modulate the data and to supply a generated recording signal to the optical head 42. The drive controller 47 sends a control signal for controlling a recording position of the recording signal on the optical disc 41 to the servo controller 44.

The drive controller 47 also controls the disc reader 46 and the servo controller 44 based on a playlist supplied from the playlist memory 19 to play back data from the optical disc 41. More specifically, the drive controller 47 sends a control signal for controlling a reading position of the playback signal from the optical disc 41 to the servo controller 44, and also controls the disc reader 46 to demodulate the playback signal from the RF amplifier 45.

The disc writer 48 adds an ECC (Error Correcting Code) to compressed data provided with a time code supplied from the buffer memory 18, modulates the compressed data so as to generate a recording signal, and supplies the recording signal to the optical head 42. The disc writer 48 also adds an ECC to playlist information supplied from the playlist memory 19, modulates the playlist information so as to generate a recording signal, and supplies the recording signal to the optical head 42. The disc writer 48 also adds an ECC to clip information supplied from the clip information memory 20, modulates the clip information so as to generate a recording signal, and supplies the recording signal to the optical head 42.

Although it is not shown, the drive 21 is also provided with a disc loading/unloading motor to be driven when the optical disc 41 is loaded or unloaded. A description of the internal configuration of the drive 21 has been given above, and a description of the internal configuration of the recording/playback apparatus 1 is continued below.

The data decompression unit 22 decompresses playback data (compressed data) supplied from the disc reader 46, and supplies the video data contained in the playback data to a playback image memory 23, and supplies the audio data contained in the playback data to an audio memory 26. The playback image memory 23 temporarily stores the video data supplied from the data decompression unit 22, and supplies the video data to the display controller 24. Under the control of the controller 12, the display controller 24 reads the video data from the playback image memory 23, and supplies it to an LCD (Liquid Crystal Display) 25 and displays it on the LCD 25. The display controller 24 also displays a playlist from the playlist memory 19 or clip information from the clip information memory 20 on the LCD 25.

The audio memory 26 temporarily stores audio data supplied from the data decompression unit 22, and supplies the audio data to an audio output unit 27 at a predetermined timing. The audio output unit 27 is formed of, for example, a speaker, and outputs sound corresponding to the audio data supplied from the audio memory 26.

An overview of an embodiment of the present invention is described below with reference to FIG. 2.

When recording video data and audio data (hereinafter also referred to as "AV data" in the following description) on the optical disc 41, the recording/playback apparatus 1 also records on the optical disc 41 AV data for a predetermined time period immediately before the user gives an instruction to start recording and AV data for a predetermined time period immediately after the user gives an instruction to finish recording. FIG. 2 illustrates AV data for one cut (hereinafter "cut" is a synonym of "clip") recorded on the optical disc 41. The AV data recorded on the optical disc 41 is compressed data generated by being compressed in the data compression unit 15, by adding a time code to the AV data in the time code adder 17, and by adding an ECC to the AV data in the disc writer 48. In the following description, it is assumed that AV data recorded on the optical disc 41 is compressed data provided with a time code and an ECC unless otherwise stated. Although in this embodiment AV data is recorded on the optical disc 41 by being compressed, it does not have to be compressed (may be recorded on the optical disc 41 without being compressed).

Figure 2:
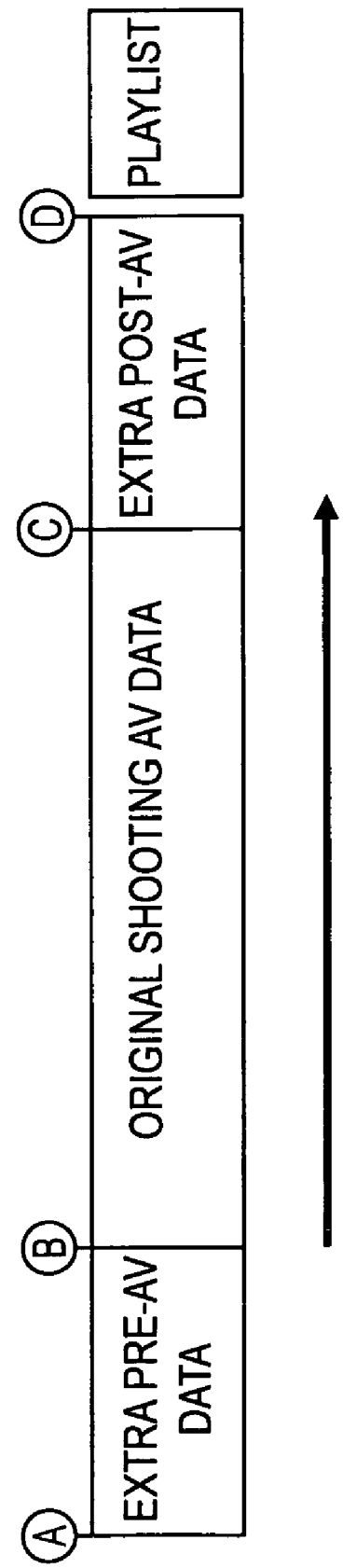
FIG. 2 illustrates an overview of the present invention.

In FIG. 2, an instructed recording start point B indicates a recording position of AV data when the user operates the operation unit 11 to give an instruction to start recording, and an instructed recording end point C indicates a recording position of the AV data when the user operates the operation unit 11 to give an instruction to finish recording. In the following description, the AV data captured from the instructed recording start point B to the instructed recording end point C is referred to as "original shooting AV data". The original shooting AV data is AV data which the user has intended to record.

According to the recording processing performed by a known recording/playback apparatus, only the original shooting AV data is recorded on an optical disc. In contrast, in the recording/playback apparatus 1 of this embodiment, AV data for a predetermined time period or a predetermined amount of data temporally before the instructed recording start point B of the original shooting AV data is recorded on the optical disc 41. In the following description, AV data temporally before the original shooting AV data is referred to as "extra pre-AV data". In FIG. 2, the AV data from a recording start point A to the instructed recording start point B is extra pre-AV data.

Figure 5:
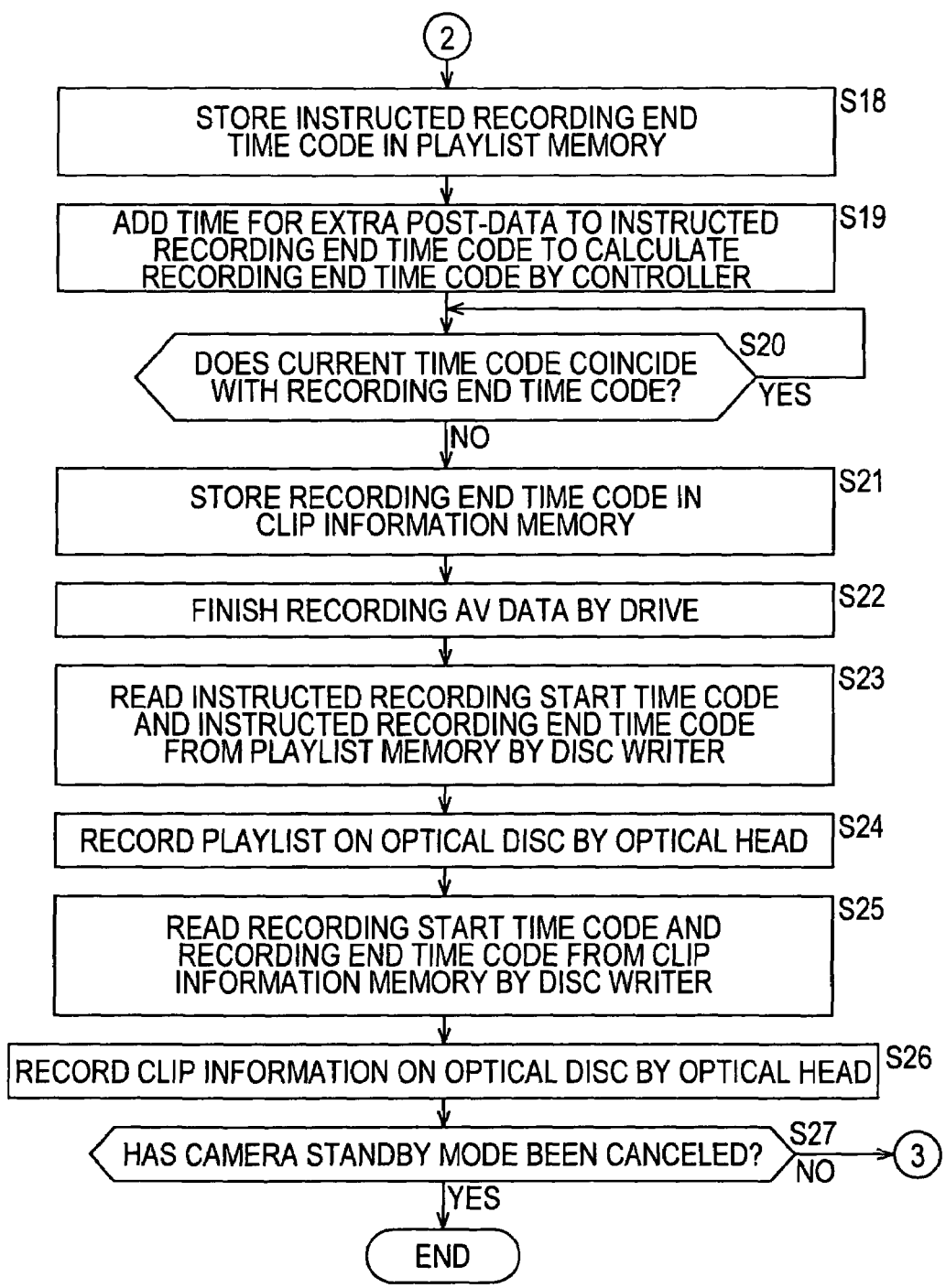
FIG. 5 is a flowchart continued from the flowchart of FIG. 4 illustrating the recording processing performed by the recording/playback apparatus shown in FIG. 1.

In the recording/playback apparatus 1 of this embodiment, AV data for a predetermined time period or a predetermined amount of data after the instructed recording end point C of the original shooting AV data is recorded on the optical disc 41. In the following description, the AV data after the instructed recording end point C of the original shooting AV data is referred to as "extra post-AV data". In FIG. 5, the AV data from the instructed recording end point C to a recording end point D is extra post-AV data.

The time length of AV data recorded as the extra pre-AV data and the time length of AV data recorded as extra post-AV data may be the same or different. The recording length of the extra pre-AV data or the extra post-AV data may be defined as the time length from the instructed recording start point or the amount of data from the instructed recording start point. Data from the instructed recording start point B to the instructed recording end point C is also referred to as a "clip" (clip has a different meaning) and data from the recording start point A to the recording end point D is also referred to as a "extended clip".

The recording/playback apparatus 1 also records, as shown in FIG. 2, the extra pre-AV data before the user gives an instruction to start recording and the extra post-AV data after the user gives an instruction to finish recording on the optical disc 41. Accordingly, when editing the AV data recorded on the optical disc 41, the user is able to use the extra pre-AV data before the recording is started and the extra post-AV data after the recording is finished.

As a result, the user can record required images (sound) more reliably, and thus, the possibility of the user missing such images (sound) is decreased.

In the example shown in FIG. 2, a playlist is recorded after the extra post-AV data. The playlist is information containing the time code of the instructed recording start point B and the time code of the instructed recording end point C of the AV data. The playlist does not have to be recorded after the extra post-AV data. Clip information, which is information containing the time code of the recording start point A and the time code of the recording end point D, is also recorded on the optical disc 41. Instead of recording the time codes of the recording start point A and the recording end point D, the clip information may contain the recording start point A and the recording length from the recording start point A to the recording end point D, or the recording end point D and the recording length from the recording start point A to the recording end point D. Details of such information are given below.

The recording operation performed by the recording/playback apparatus 1 is described below with reference to the flowcharts of FIGS. 3 through 5.

Figure 3:
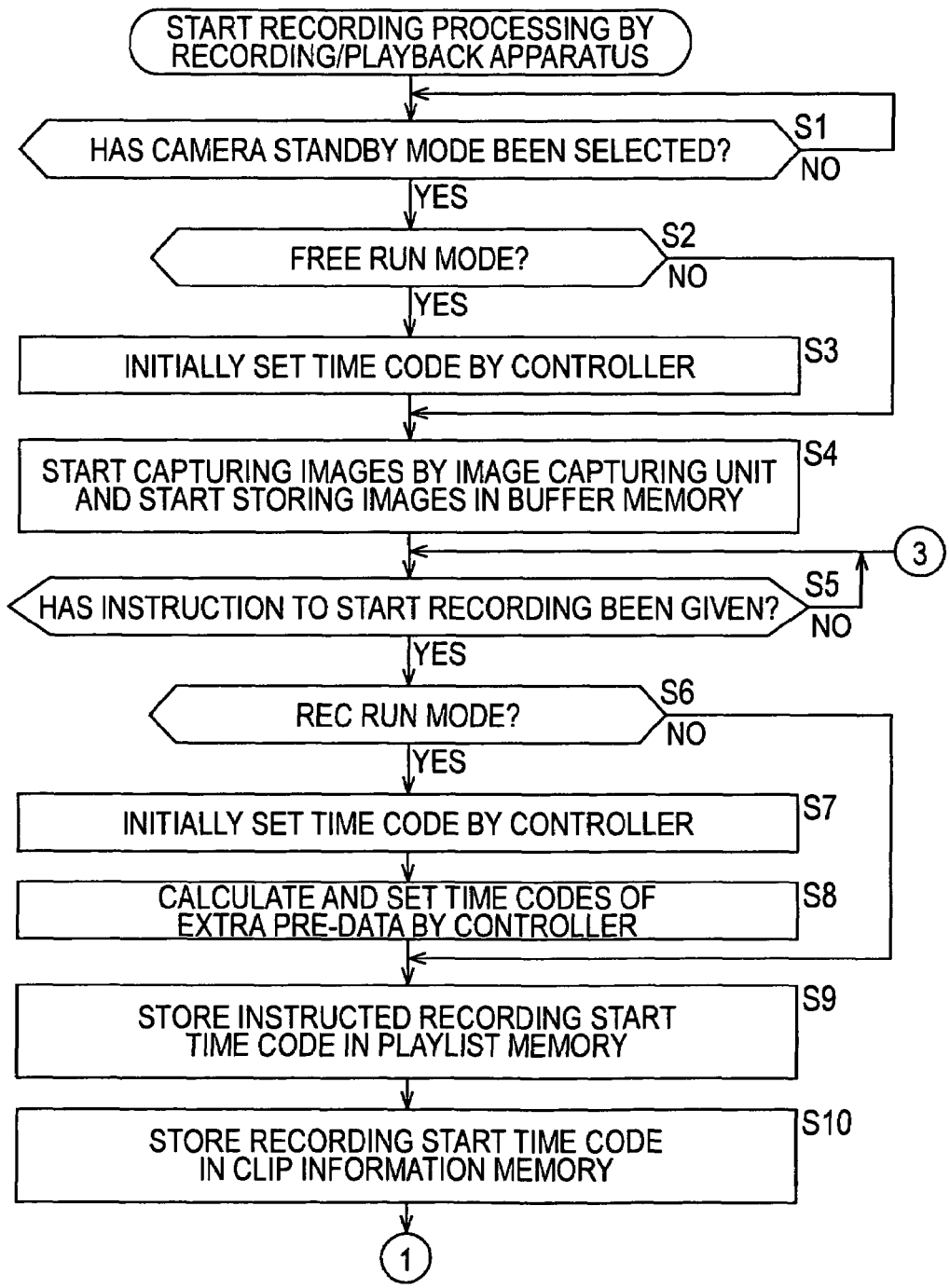
FIG. 3 is a flowchart illustrating recording processing performed by the recording/playback apparatus shown in FIG. 1.

In step S1 of FIG. 3, the controller 12 determines whether an operation for selecting a camera standby mode has been input based on operation information from the operation unit 11, and waits until the operation for selecting the camera standby mode is input. If the operation for selecting the camera standby mode is input from the operation unit 11, the controller 12 determines in step S1 that the operation for selecting the camera standby mode is input, and the process proceeds to step S2. The operation unit 11 may be a remote commander separately provided from the main unit of the recording/playback apparatus 1.

There are two modes such as a free run mode and an REC run mode for the recording modes of time codes. The controller 12 determines in step S2 whether the recording mode of the time code is the free run mode. The recording modes of the time codes are as follows. The time code is represented by the hour, the minute, the second, and 1/60 second. That is, if the time code is "01:02:03:04", "01" at the left is the hour, "02" second from the left is the minute, "03" third from the left is the second, and "04" at the right is 1/60 seconds.

The free run mode is the mode in which the time code is set to be "00:00:00:00" when the camera standby mode is selected. Accordingly, the time code recorded on the optical disc 41 indicates a lapse of time after the camera standby mode is selected. The REC run mode is the mode in which the time code is set to be "00:00:00:00" when an instruction to start recording is input from the operation unit 11. Accordingly, the time code is recorded on the optical disc 41 such that the time code of the AV data recorded at the instructed recording start point B shown in FIG. 2 indicates "00:00:00:00".

That is, in the REC run mode, the time code after the instructed recording start point B (time code recorded together with the original shooting AV data and the extra post-AV data) indicates a lapse of time after the instructed recording start point B. As the time code before the instructed recording start point B (time code recorded together with the extra pre-AV data), time codes calculated backward from the instructed recording start point B, such as "23:59:59:59" "23:59:59:58", and "23:59:59:57", are recorded. For example, the time code of the AV data one minute before the instructed recording start point B is "23:59:00:00".

Referring back to FIG. 3, if the controller 12 determines in step S2 that the recording mode of the time code is the free run mode, the process proceeds to step S3.

In step S3, the controller 12 instructs the time code generator 16 to initially set the time code. The time code generator 16 initially sets the time code in response to an instruction from the controller 12, and more specifically, the time code generator 16 sets the time code to be "00:00:00:00". After setting the time code to be "00:00:00:00", the time code generator 16 generates time codes so that it counts up the time code every 1/60 seconds to, for example, "00:00:00:01", "00:

"00:00:02", and "00:00:00:03". After the processing of step S3, the process proceeds to step S4.

If the controller 12 determines in step S2 that the recording mode of the time code is not the free run mode, namely, it is the REC run mode, the processing of step S3 is skipped, and the process proceeds to step S4.

In step S4, the controller 12 controls the image capturing unit 13, the microphone 14, the data compression unit 15, the time code adder 17, and the buffer memory 18 to start capturing and storing images. The capturing and storage of images are specifically described below.

The image capturing unit 13 captures an image and supplies a captured image (moving picture) to the data compression unit 15. The microphone 14 generates an audio signal corresponding to sound around the recording/playback apparatus 1, and supplies the audio signal to the data compression unit 15. The data compression unit 15 compresses the captured image supplied from the image capturing unit 13 and the audio signal supplied from the microphone 14, and supplies the compressed data (AV data) to the time code adder 17. The time code adder 17 adds a time code generated by the time code generator 16 at the corresponding time to the compressed data supplied from the data compression unit 15, and supplies the compressed data to the buffer memory 18. The buffer memory 18 stores the compressed data (AV data) provided with the time code supplied from the time code adder 17.

Figure 6:
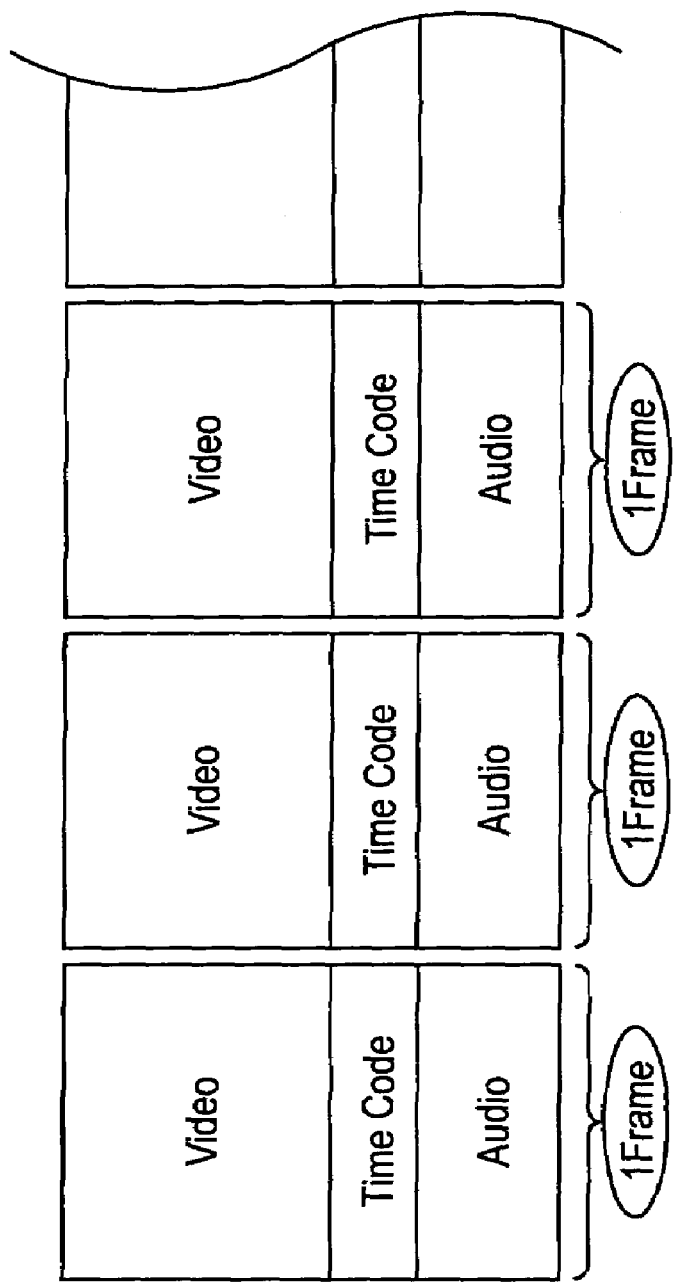
FIG. 6 illustrates AV data recorded on an optical disc.

After step S4, compressed data provided with a time code are sequentially stored in the buffer memory 18. FIG. 6 illustrates an example of the compressed data stored in the buffer memory 18. In the example shown in FIG. 6, video data (Video) is stored in the buffer memory 18 together with the corresponding time code and audio data (Audio) in units of frames. As indicated by a plurality of frames of compressed data shown in FIG. 6, compressed data are sequentially supplied in units of frames from the time code adder 17 to the buffer memory 18 and are stored in the buffer memory 18.

When the recording mode of the time code is the REC run mode, the time codes stored together with the video data and the audio data before an instruction to start recording is input from the operation unit 11 are temporary time codes. These time codes are overwritten by the processing of step S8, which is described below.

In step S5, the controller 12 determines based on the operation information from the operation unit 11 whether an instruction to start recording has been input from the user, and waits until such an instruction is input. In the meantime, the storage of the compressed data into the buffer memory 18 is continued. The storage capacity of the buffer memory 18 is limited. Accordingly, the compressed data is stored up to the maximum storage capacity of the buffer memory 18 while the storage of the compressed data into the buffer memory 18 is continued.

In this case, the buffer memory 18 overwrites the oldest compressed data stored in the buffer memory 18 by the latest compressed data supplied from the time code adder 17. Thus, the latest compressed data for a predetermined time period is always stored in the buffer memory 18. The predetermined time period is determined by the storage capacity of the buffer memory 18 (for example, three minutes).

If an instruction to start recording has been input from the operation unit 11 in step S5, the controller 12 determines that the start of the recording operation is instructed, and the process proceeds to step S6.

In step S6, the controller 12 determines whether the recording mode of the time code is the REC run mode. If the recording mode of the time code is the REC run mode, the process proceeds to step S7.

In step S7, the controller 12 instructs the time code generator 16 to initially set the time code. The time code generator 16 initially sets the time code to be "00:00:00:00" in response to an instruction from the controller 12. After setting the time code to be "00:00:00:00" in step S7, the time code generator 16 generates time codes such that it counts up the time code every 1/60 seconds, for example, to "00:00:00:01", "00:00:00:02", and "00:00:00:03". After the processing of step S7, the process proceeds to step S8.

In step S8, the controller 12 calculates the time codes of the extra pre-AV data, and substitutes the time codes of the extra pre-AV data stored in the buffer memory 18 by the calculated time codes. That is, as described above, in the REC run mode, the time codes calculated backward from the instructed recording start point B, such as "23:59:59:59" "23:59:59:58", and "23:59:59:57", are recorded in the extra pre-AV data. Thus, the controller 12 specifies all the frames of the extra pre-AV data from the AV data stored in the buffer memory 18 shown in FIG. 6, and overwrites the time codes stored together with the specified AV data by the calculated time codes.

Accordingly, the time code of the AV data ten seconds before the instructed recording point B is "23:59:50:00", the time code of the AV data thirty seconds before the instructed recording point B is "23:59:30:00", and the time code of the AV data one minute before the instructed recording point B is "23:59:00:00".

If all the frames are recorded by adding the time codes thereto, the time codes of all the extra pre-AV data frames are overwritten. However, only the time code of the head frame of the AV data may be recorded, or only the time codes of discontinuous frames, i.e., when the time codes are not temporally continuous, may be recorded, in which case, only the time codes of the corresponding frames can be overwritten.

After the processing of step S8, the process proceeds to step S9.

If the controller 12 determines in step S6 that the recording mode of the time code is not the REC run mode (if the controller 12 determines that the recording mode of the time code is the free run mode), steps S7 and S8 are skipped, and the process proceeds to step S9.

In step S9, the controller 12 instructs the playlist memory 19 to store the time code of the instructed recording start point B. In response to the instruction from the controller 12, the playlist memory 19 stores the time code generated by the time code generator 16 as the time code at the instructed recording start point B.

After step S9, in step S10, the controller 12 instructs the clip information memory 20 to store the time code at the recording start point A. The clip information memory 20 stores the time code at the recording start point A in response to the instruction from the controller 12. In this case, the controller 12 obtains information concerning the recording start position (address) of the AV data on the optical disc 41 (hereinafter referred to as the "recording start positional information"), and stores it in the clip information memory 20. After the processing of step S10, the process proceeds to step S11 of FIG. 4.

In step S11, the controller 12 specifies the current write address in the buffer memory 18. That is, after step S4 in FIG. 3, the compressed AV data is continuously stored in the buffer memory 18. Then, in step S11, the controller 12 specifies the address in the buffer memory 18 at which the latest AV data is recorded. A description is given of the addresses in the buffer memory 18 with reference to FIG. 7.

Figure 7:
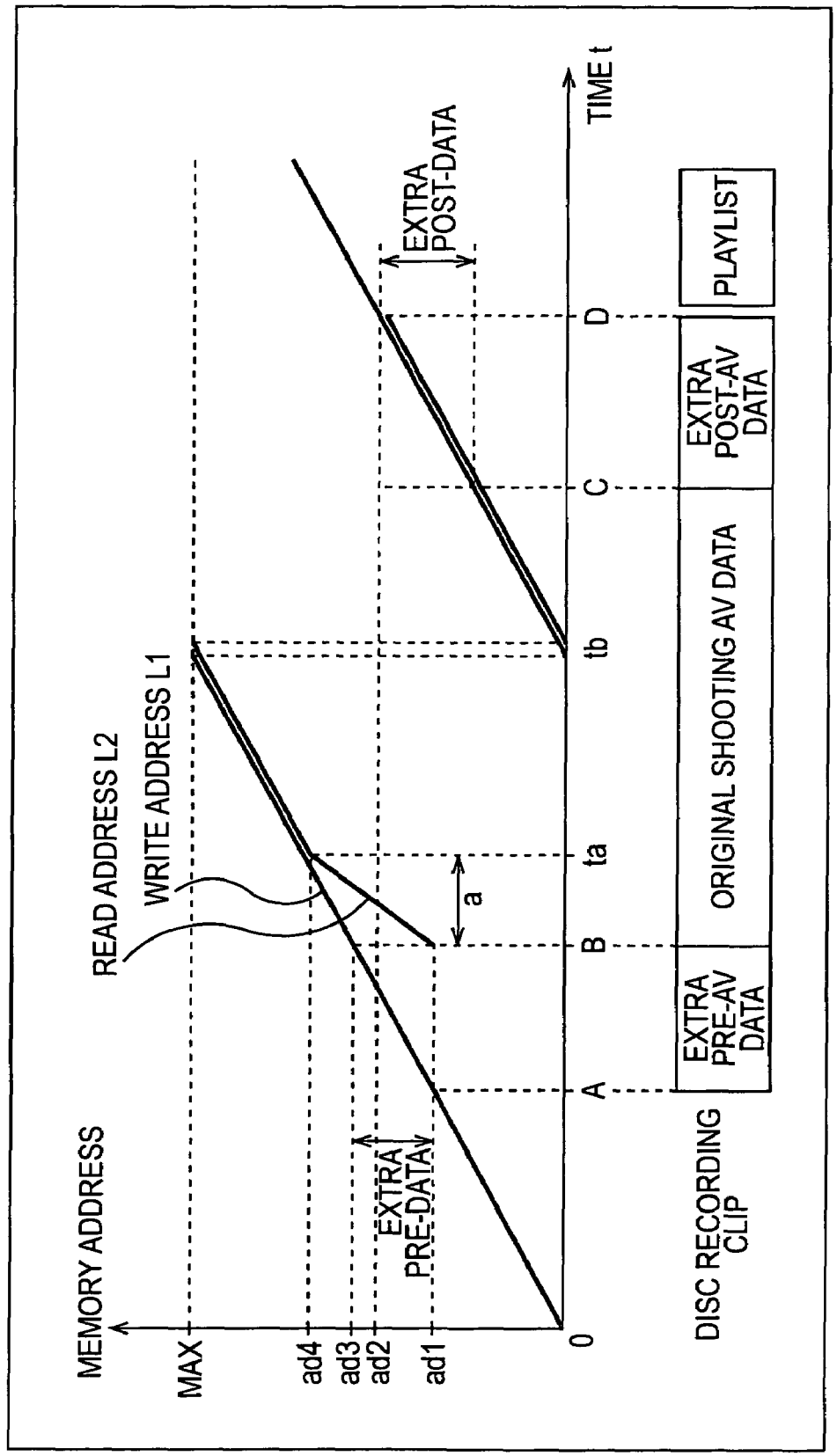
FIG. 7 illustrates a read address and a write address of a buffer memory.

The read address and the write address at time t are indicated in the graph of FIG. 7. The write address is the address in the buffer memory 18 at which the compressed data (AV data) supplied from the time code adder 17 is stored. The read address is the address in the buffer memory 18 from which the disc writer 48 reads the compressed data (AV data) after step S12.

In FIG. 7, the horizontal axis represents time t, and the vertical axis designates the address of the buffer memory 18. In the horizontal axis, time A indicates the time at which the compressed data (AV data) corresponding to the recording start point A is recorded on the buffer memory 18. Time B indicates the time at which an instruction to start recording is received. Time C designates the time at which an instruction to finish recording is received. Time D designates the time at which the compressed data (AV data) corresponding to the recording end point D is recorded.

The sign "MAX" is indicated in the vertical axis of FIG. 7, and addresses in the buffer memory 18 are allocated in the range from 0 to "MAX". Time t when the recording of the compressed data (AV data) into the buffer memory 18 is started (step S4 of FIG. 3) is set to be 0. Attention is now focused on the line indicating the write address (the line indicated by write address L1 in FIG. 7). The storage of the compressed data (AV data) is started from the address at the position "0" in the buffer memory 18 in step S4, and the write address gradually approaches "MAX" over the lapse of time t. Immediately after the write address reaches "MAX" (time tb in FIG. 7), it returns to "0" (indicated by the broken line after the straight line indicated by the write address L1 in FIG. 7), and again gradually approaches "MAX" over the lapse of time t. The compressed data (AV data) to be stored after the write address returns to "0" overwrites the compressed data (AV data) previously stored at the same address.

In this manner, the oldest compressed data (AV data) stored in the buffer memory 18 is overwritten by the latest compressed data (AV data). Although it is not shown in FIG. 7, when the write address once again reaches "MAX", it returns to "0", and again gradually approaches "MAX" over the lapse of time t. Accordingly, the write address repeats shifting between "0" and "MAX".

In step S11, the controller 12 specifies the write address in the buffer memory 18 at time B when an instruction to start recording is received, i.e., at the address ad3 shown in FIG. 7.

After step S1, in step S12, the controller 12 instructs the drive controller 47 to read the compressed data (AV data) at high speed from the address (address ad1 in FIG. 7) returned backward from the address specified in step S11 for the amount of extra pre-AV data and to record the read compressed data on the optical disc 41. In response to the instruction from the controller 12, the drive controller 47 controls the disc writer 48 to start reading the compressed data (AV data) at high speed from the address ad1 in FIG. 7. At time B in FIG. 7, the disc writer 48 starts reading the compressed data (AV data) at high speed from the address ad1 toward the address "MAX". The disc writer 48 adds an ECC to the read compressed data and modulates the recording signal. The speed at which the disc writer 48 reads the compressed data (AV data) is higher than the speed at which the compressed data (AV data) from the time code adder 17 is stored in the buffer memory 18.

In step S13, the drive controller 47 controls the optical head 42 via the servo controller 44 to start high-speed recording on the optical disc 41 of the compressed data (AV data) which is read from the buffer memory 18, provided with the ECC and modulated by the disc writer 48 in step S48. The speed at which the disc writer 48 reads the compressed data (AV data) from the buffer memory 18 in step S12 and the speed at which the optical head 42 records the compressed data (AV data) on the optical disc 41 in step S13 are desirably as high as possible as the performance permits.

After the processing of step S5, steps S6 through S13 are executed in a very short period of time.

In step S14, the controller 12 determines whether the read address has reached the write address, and controls the disc writer 48 to read the AV data at high speed and controls the optical head 42 to record the AV data at high speed on the optical disc 41 until the read address has reached the write address. When the controller 12 determines that the read address has reached the write address (time ta in FIG. 7), the process proceeds to step S15. In actuality, the controller 12 determines that the read address has reached the write address in the buffer memory 18 slightly before the read address has becomes the same address as the write address.

In step S15, the controller 12 instructs the drive controller 47 to change the speed at which the compressed data (AV data) is read from the buffer memory 18 and the speed at which the compressed data is recorded on the optical disc 41 to ×1. In response to the instruction from the controller 12, the drive controller 47 controls the disc writer 48 to change the reading speed of the compressed data (AV data) from the buffer memory 18 to be ×1. The disc writer 48 then changes the reading speed of the compressed data (AV data) from the buffer memory 18 to be ×1. Then, in step S16, the drive controller 47 changes the recording speed of the compressed data (AV data) on the optical disc 41 by the optical head 42 to be ×1.

In FIG. 7, in a zone indicated by the arrows a of the read address L2, the AV data is read at high speed, and in a zone of the read address L2 after time tb, the compressed data (AV data) is read at ×1. FIG. 7 shows that the read address moves along the write address in the zone in which the compressed data (AV data) is read at ×1. This means that the speed at which the compressed data (AV data) from the time code adder 17 is recorded on the buffer memory 18 is the same speed at which the compressed data (AV data) is read from the buffer memory 18 by the disc writer 48.

Although the recording speed of the compressed data on the optical disc 41 is changed to ×1, this is an example only. For example, when the physical recording position on the optical disc 41 is changed while the compressed data is being recorded on the optical disc 41, the optical head 42 needs a seek time, and during this seek time, the compressed data cannot be recorded on the optical disc 41. Accordingly, after a seek time, the recording speed of the compressed data on the optical disc 41 may become higher than ×1. In another case, the recording-speed may become higher than ×1 when the compressed data is not continuously recorded, i.e., when it is intermittently recorded. In this case, even if the read address has reached the write address in the buffer memory 18, the recording speed of the compressed data on the optical disc 41 does not become ×1.

The process then proceeds to step S17. In step S17, the controller 12 determines whether an instruction to finish recording has been input into the operation unit 11 based on the operation information from the operation unit 11, and waits until such an instruction is input into the operation unit 11. During the processing of step S17, the compressed data (AV data) is supplied from the time code adder 17 to the buffer memory 18, the compressed data (AV data) is read from the buffer memory 18 by the disc writer 48, and the compressed data (AV data) is recorded on the optical disc 41.

When the controller 12 determines in step S17 that an instruction to finish recording has been input into the operation unit 11, the process proceeds to step S18 of FIG. 5.

In step S18, the controller 12 instructs the playlist memory 19 to store the time code at the instructed recording end point C. When receiving the instruction from the controller 12, the playlist memory 19 stores the time code obtained from the time code generator 16 as the time code at the instructed recording end point C.

In step S19, the controller 12 adds a time period corresponding to extra post-AV data (for example, one minute) to the time code at the instructed recording end time C so as to calculate the time code at the recording end point D.

After step S19, in step S20, the controller 12 monitors the time code generator 16, and determines whether the time code generated by the time code generator 16 coincides with the time code at the recording end point D calculated in step S19. The controller 12 waits until the time code generated by the time code generator 16 coincides with the time code at the recording end point D calculated in step S19. If the controller 12 determines in step S20 that the time code generated by the time code generator 16 coincides with the time code at the recording end point D calculated in step S19, the process proceeds to step S21. In FIG. 7, when the read address L2 has reached the address ad2, the time code generated by the time code generator 16 coincides with the time code at the recording end point D calculated in step S19.

In step S21, the controller 12 instructs the clip information memory 20 to store the time code at the recording end point D. In response to the instruction from the controller 12, the clip information memory 20 stores the time code when the controller 12 determines in step S20 that the time code generated by the time code generator 16 coincides with the time code at the recording end point D calculated in step S19.

After step S21, in step S22, the controller 12 instructs the drive controller 47 to finish recording the compressed data (AV data). In response to the instruction from the controller 12, the drive controller 47 controls the disc writer 48 and the optical head 42 to finish recording the compressed data (AV data) on the optical disc 41.

After step S22, in step S23, the controller 12 instructs the drive controller 47 to record a playlist on the optical disc 41. In response to the instruction from the controller 12, the drive controller 47 instructs the disc writer 48 to read the time code at the instructed recording start point B and the time code at the instructed recording end point C from the playlist memory 19. The disc writer 48 then reads the time code at the instructed recording start point B and the time code at the instructed recording end point C from the playlist memory 19, adds an ECC to the time codes, and modulates them. The time code at the instructed recording start point B and the time code at the instructed recording end point C are combined to form a playlist. The playlist may be formed by, for example, the time code at the instructed recording start point B and the recording length from the instructed recording start point B to the instructed recording end point C or the time code at the instructed recording end point C and the recording length from the instructed recording start point B to the instructed recording end point C.

In step S24, the drive controller 47 controls the optical head 42 to record the playlist read from the playlist memory 19, provided with the ECC and modulated by the disc writer 48 in step S23 on the optical disc 41. In the example shown in FIG. 2, the playlist is recorded immediately after the AV data of the corresponding cut.

After step S24, in step S25, the controller 12 instructs the drive controller 47 to record clip information on the optical disc 41. In response to the instruction from the controller 12, the drive controller 47 instructs the disc writer 48 to read the recording start position information indicating the recording start position (address) of the AV data on the optical disc 41, the time code at the recording start point A, and the time code at the recording end point D from the clip information memory 20. The disc writer 48 reads the recording start position information, the time code at the recording start point A, and the time code at the recording end point D from the clip information memory 20, adds an ECC to the read information and time codes, and modulates them. The recording start position information, the time code at the recording start point A, and the time code at the recording end point D form clip information.

In step S26, the drive controller 47 controls the optical head 42 to record the clip information read from the clip information memory 20, provided with an ECC, and modulated by the disc writer 47 in step S25 on the optical disc 41. The whole cut (clip) of the clip information may be recorded on a predetermined recording position of the optical disc 41, or the clip information may be recorded by being distributed on the optical disc 41.

In step S27, the controller 12 determines whether the camera standby mode has been canceled based on operation information from the operation unit 11. If the camera standby mode is not canceled, the process returns to step S5 of FIG. 3, and step S5 and the subsequent steps are repeated. If the controller 12 determines in step S27 that the camera standby mode has been canceled, the recording processing is completed.

A description of the recording processing by the recording/playback apparatus 1 has been given. By repeating the above-described recording processing, the recording/playback apparatus 1 is able to record a plurality of cuts of AV data, playlist, and clip information on the optical disc 41.

Figure 4:
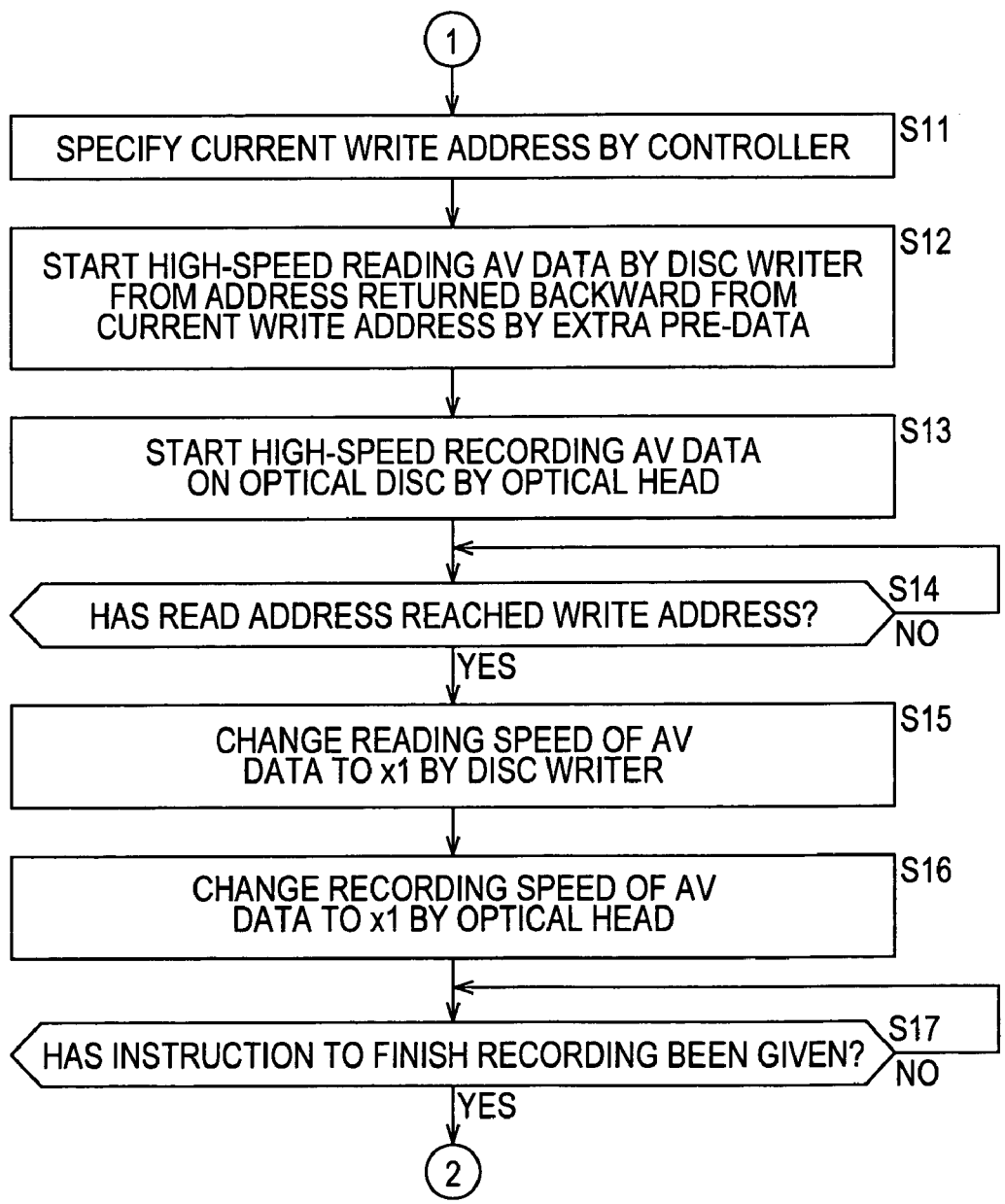
FIG. 4 is a flowchart continued from the flowchart of FIG. 3 illustrating the recording processing performed by the recording/playback apparatus shown in FIG. 1.

In the processing shown in FIGS. 3 through 5, AV data for a predetermined time period after an instruction to finish recording is input is recorded on the optical head 41 as extra post-AV data. Alternatively, AV data for a predetermined amount of data (hereinafter referred to as "data amount A") stored in the buffer memory 18 after an instruction to finish recording is input may be recorded on the optical disc 41 as extra post-AV data. In this case, the data amount A can be set by the user within the storage capacity of the buffer memory 18.

In the processing shown in FIGS. 3 through 5, AV data for a predetermined time period before an instruction to start recording is input is recorded on the optical disc 41 as extra pre-AV data. Alternatively, AV data for a predetermined amount of data (hereinafter referred to as "data amount B") stored in the buffer memory 18 before an instruction to start recording is input may be recorded on the optical disc 41 as extra pre-AV data. In this case, the data amount B can be set by the user within the storage capacity of the buffer memory 18.

The time length of AV data recorded on the optical disc 41 as extra pre-AV data can be set by the user within the time that can be stored in the buffer memory 18. In contrast, the time length of AV data recorded on the optical disc 41 as extra post-AV data can be set by the user regardless of the time that can be stored in the buffer memory 18 (the time length of AV data recorded as extra post-AV data may be longer than the time that can be stored in the buffer memory 18). The time length of AV data recorded on the optical disc 41 as extra pre-AV data is longer as the storage capacity of the buffer memory 18 is larger.

When playing back AV data recorded on the optical disc 41 as described above, the recording/playback apparatus 1 first reads the time code at the instructed recording start point and the time code at the instructed recording end point recorded as playlist, and plays back the AV data during the period from the time code at the instructed recording start point to the time code at the instructed recording end point. In the following description, the "playback start point" means the "instructed recording start point", and the "playback end point" means the "instructed recording end point".

Figure 8:
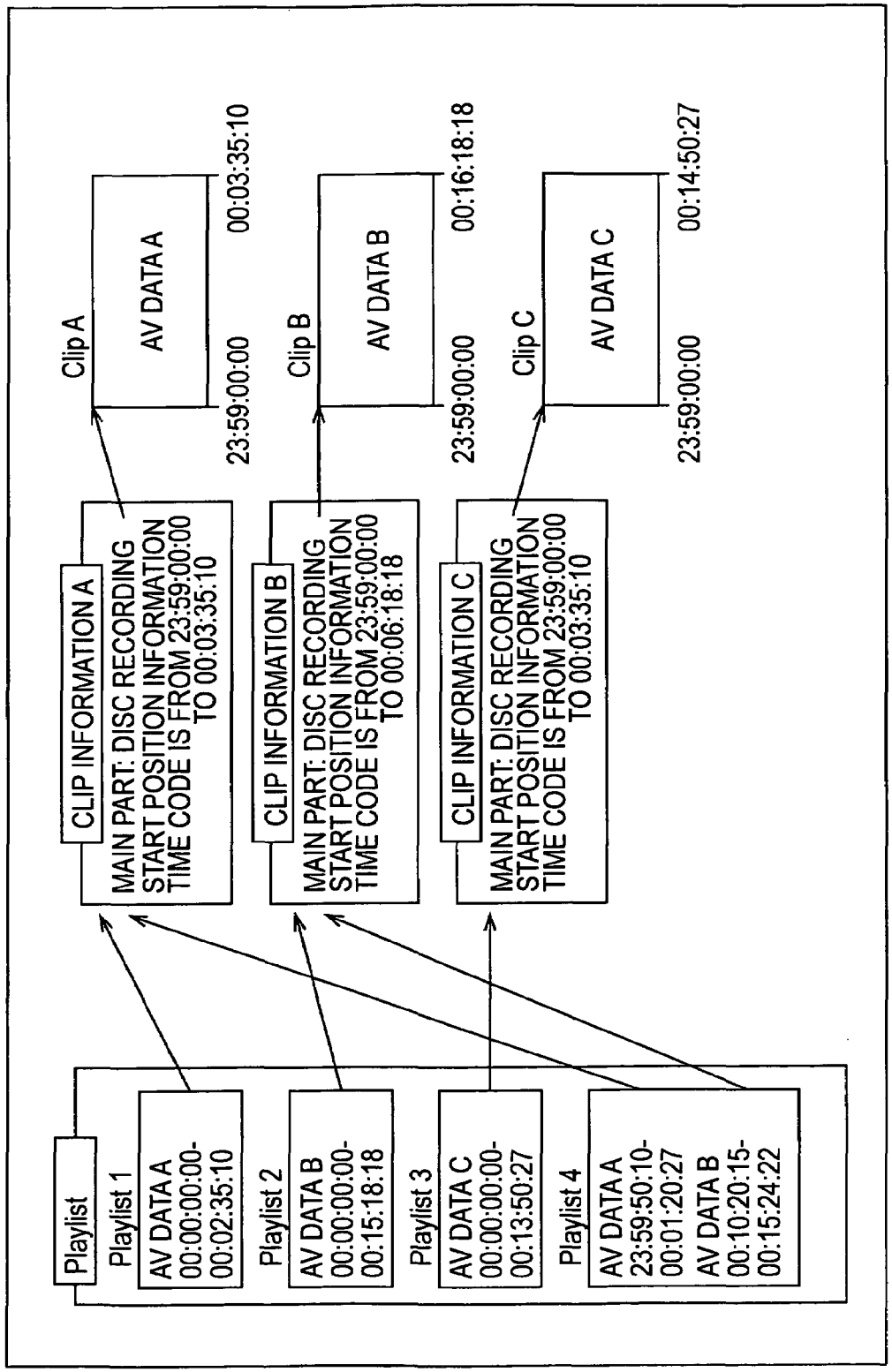
FIG. 8 illustrates clip information and playlists.

The relationship between the playlist and clip information recorded on the optical disc 41 as described above is shown in FIG. 8. In FIG. 8, the recording mode of the time code is the REC mode by way of example. At the right side of FIG. 8, three cuts of AV data, i.e., AV data A, AV data B, and AV data C, recorded on the optical disc 41 are indicated.

For AV data A, the time code at the recording start point is "23:59:00:00" and the time code at the recording end point is "00:03:35:10". The time code at the playback start point is "00:00:00:00" and the time code at the playback end point is "00:02:35:10".

In this case, clip information A corresponding to AV data A (indicated at the left side of AV data A in FIG. 8) contains recording start position information indicating the recording start position of AV data A on the optical disc 41, and the time code at the recording start point "23:59:00:00" and the time code at the recording end point "00:03:35:10". Playlist 1 corresponding to AV data A (playlist 1 at the left side in FIG. 8) contains the time code at the playback start point "00:00:00:00" and the time code at the playback end point "00:02:35:10". There is one minute difference between the time code at the recording start point "23:59:00:00" and the time code at the playback start point "00:00:00:00", and this difference corresponds to extra pre-AV data. There is also one minute difference between the time code at the playback end point "00:02:35:10" and the time code at the recording end point "00:03:35:10", and this difference corresponds to extra post-AV data.

Similarly, for AV data B, the time code at the recording start point is "23:59:00:00" and the time code at the recording end point is "00:16:18:18". The time code at the playback start point is "00:00:00:00", and the time code at the playback end point is "00:15:18:18".

In this case, clip information B (indicated at the left side of AV data B in FIG. 8) associated with AV data B contains recording start position information indicating the recording start position of AV data B on the optical disc 41, and the time code at the recording start point "23:59:00:00" and the time code at the recording end point "00:16:18:18". Playlist 2 (playlist 2 indicated at the left side of FIG. 8) associated with AV data B contains the time code at the playback start point "00:00:00:00" and the time code at the playback end point "00:15:18:18". There is one minute difference between the time code at the recording start point "23:59:00:00" and the time code at the playback start point "00:00:00:00", and this difference corresponds to extra pre-AV data. There is also one minute difference between the time code at the playback end point "00:15:18:18" and the time code at the recording end point "00:16:18:18", and this difference corresponds to extra post-AV data.

Similarly, for AV data C, the time code at the recording start point "23:59:00:00" and the time code at the recording end point is "00:14:50:27". The time code at the playback start point is "00:00:00:00" and the time code at the playback end point is "00:13:50:27".

In this case, clip information C (indicated at the left side of AV data C in FIG. 8) associated with AV data C contains recording start position information indicating the recording start position of AV data C on the optical disc 41, and the time code at the recording start point "23:59:00:00" and the time code at the recording end point "00:14:50:27". Playlist 3 (playlist 3 indicated at the left side of FIG. 8) associated with AV data C contains the time code at the playback start point "00:00:00:00" and the time code at the playback end point "00:13:50:27". There is one minute difference between the time code at the recording start point "23:59:00:00" and the time code at the playback start point "00:00:00:00", and this difference corresponds to extra pre-AV data. There is also one minute difference between the time code at the playback end point "00:13:50:27" and the time code at the recording end point "00:14:50:27", and this difference corresponds to extra post-AV data.

At the bottom left of FIG. 8, playlist 4 is indicated. The recording/playback apparatus 1 is able to perform editing by extracting only desired images (sound) from AV data A, AV data B, and AV data C recorded on the optical disc 41 and by splicing them. Playlist 4 is a playlist obtained by splicing part of images (sound) of AV data A and AV data B. Playlist 4 contains the time code at the playback start point "23:59:50:10" of AV data A and the time code at the playback end point "00:01:20:27" of AV data A, and the time code at the playback start point "00:10:20:15" of AV data B and the time code at the playback end point "00:15:24:22" of AV data B. When playing back AV data based on playlist 4, the recording/playback apparatus 1 first plays back AV data A from the playback start point "23:59:50:10" to the playback end point "00:01:20:27", and sequentially plays back AV data B from the playback start point "00:10:20:15" to the playback end point "00:15:24:22". In playlist 4, the time codes of the playback start point and the playback end point are changed from "00:00:00:00". Details of editing processing for changing the time codes of the playback start point and the playback end point are given below.

Playback processing performed by the recording/playback apparatus 1 is described below with reference to the flowchart of FIG. 9.

In step S101, the controller 12 determines based on operation information from the operation unit 11 whether an operation for selecting the playback mode has been input from the operation unit 11, and waits until such an operation is input. When the operation for selecting the playback mode is input from the operation unit 11, the process proceeds to step S102.

In step S102, the controller 12 instructs the drive controller 47 to read all the playlists recorded on the optical disc 41. The drive controller 47 controls the servo controller 44 to instruct the optical head 42 to read the playlists from the optical disc 41. The read playlists are demodulated and subjected to error detection in the disc reader 46, and are stored in the playlist memory 19.

In step S103, the controller 12 instructs the display controller 24 to display the playlists on the LCD 25. In response to the instruction from the controller 12, the display controller 24 reads all the playlists stored in the playlist memory 19 in step S102, and displays them on the LCD 25. If, for example, playlist 1 through playlist 4 are recorded on the optical disc 41, as shown in FIG. 8, they are displayed on the LCD 25. The display controller 24 also displays a message for instructing the user to select one of the playlists.

In step S104, the controller 12 receives the designation of one playlist based on operation information from the operation unit 11.

In step S105, the controller 12 determines based on operation information from the operation unit 11 whether an operation for giving a playback instruction has been input from the operation unit 11, and waits until such an operation is input.

When an operation for giving a playback instruction is input from the operation unit 11, the process proceeds to step S106.

In step S106, the controller 12 instructs the drive controller 47 to read clip information of AV data to be played back from the optical disc 41 based on the playlist selected in step S104. If, for example, playlist 1 shown in FIG. 8 is selected in step S104, the controller 12 instructs the drive controller 47 to read clip information of AV data A, i.e., clip information A, recorded on playlist 1. The drive controller 47 controls the servo controller 44 to instruct the optical head 42 to read the clip information from the optical disc 41. The read clip information is demodulated in the disc reader 46, and is stored in the clip information memory 20.

If the playlist selected in step S104 contains a plurality of items of AV data to be played back, such as playlist 4 shown in FIG. 8 (AV data A and AV data B in FIG. 8), the drive controller 47 controls the servo controller 44 to instruct the optical head 42 to first read only clip information A according to the playback order.

After the processing of step S106, in step S107, the controller 12 specifies the playback start position of the AV data on the optical disc 41 based on the time code at the playback start point contained in the playlist selected in step S104, and the recording start position information of the AV data on the optical disc 41 and the time code at the recording start point contained in the clip information read in step S106. That is, the controller 12 calculates a distance d between the recording start point and the playback start point on the optical disc 41 according to the difference between the time code at the recording start point and the time code at the playback start point. The controller 12 then adds the distance d to the recording start position of the AV data on the optical disc 41 so as to specify the playback start position of the AV data on the optical disc 41.

A description has been given above, assuming that AV data is physically continuously recorded on the optical disc 41. Thus, the playback start position of the AV data on the optical disc 41 can be specified by adding the distance d to the recording start position. However, AV data does not have to be physically continuously recorded, and it may be recorded by being divided as long as the AV data can be identified as continuous data. In this case, the playback start position can be specified from the recording start position based on the distance determined from the logical address.

After step S107, in step S108, the controller 12 instructs the drive controller 47 to read the AV data at the recording position on the optical disc 41 corresponding to the playback start point specified in step S107. In response to the instruction from the controller 12, the drive controller 47 controls the servo controller 44 to instruct the optical head 42 to read the AV data from the playback start position of the optical disc 41. The read AV data is demodulated in the disc reader 46 and is decompressed in the data decompression unit 22, and then, the video data is stored in the playback image memory 23 and the audio data is stored in the audio memory 26.

The video data stored in the playback image memory 23 is read by the display controller 24 and is displayed on the LCD 25. The audio data stored in the audio memory 26 is read by the audio output unit 27, and sound corresponding to the audio data is output. Accordingly, the display of images and the output of sound associated with the playlist selected in step S104 are started.

In step S109, while the optical head 42 is monitoring the time code of the AV data which is being read, the controller 12 determines whether the time code of the AV data which is being read by the optical head 42 coincides with the time code at the playback end point contained in the playlist selected in step S104. The controller 12 waits until the time code of the AV data which is being read by the optical head 42 coincides with the time code at the playback end point contained in the playlist selected in step S104. When the controller 12 determines that the time code of the AV data which is being read by the optical head 42 coincides with the time code at the playback end point contained in the playlist selected in step S104, the process proceeds to step S110.

In step S110, the controller 12 determines based on the playlist selected in step S104 whether there is another AV data to be sequentially played back. If there is another AV data to be sequentially played back, the process returns to step S106, and step S106 and the subsequent steps are repeated. If the controller 12 determines in step S110 that there is no AV data to be sequentially played back, the controller 12 completes the playback processing.

For example, if the playlist selected in step S104 is playlist 4 shown in FIG. 8, the AV data to be played back includes AV data A and AV data B. Then, the controller 12 controls the drive controller 47 to read clip information A in step S106 and to read AV data A from the optical disc 41 in steps S107 through S109. Upon completing the reading of AV data A, the controller 12 determines in step S110 that there is AV data B to be sequentially played back, and returns to step S106. Then, the controller 12 controls the drive controller 47 to read clip information B in step S106 and to read AV data B from the optical disc 41 in steps S107 through S109. Upon completing the reading of AV data B, the controller 12 determines in step S110 that there is no AV data to be sequentially played back, and completes the playback processing.

Figure 9:
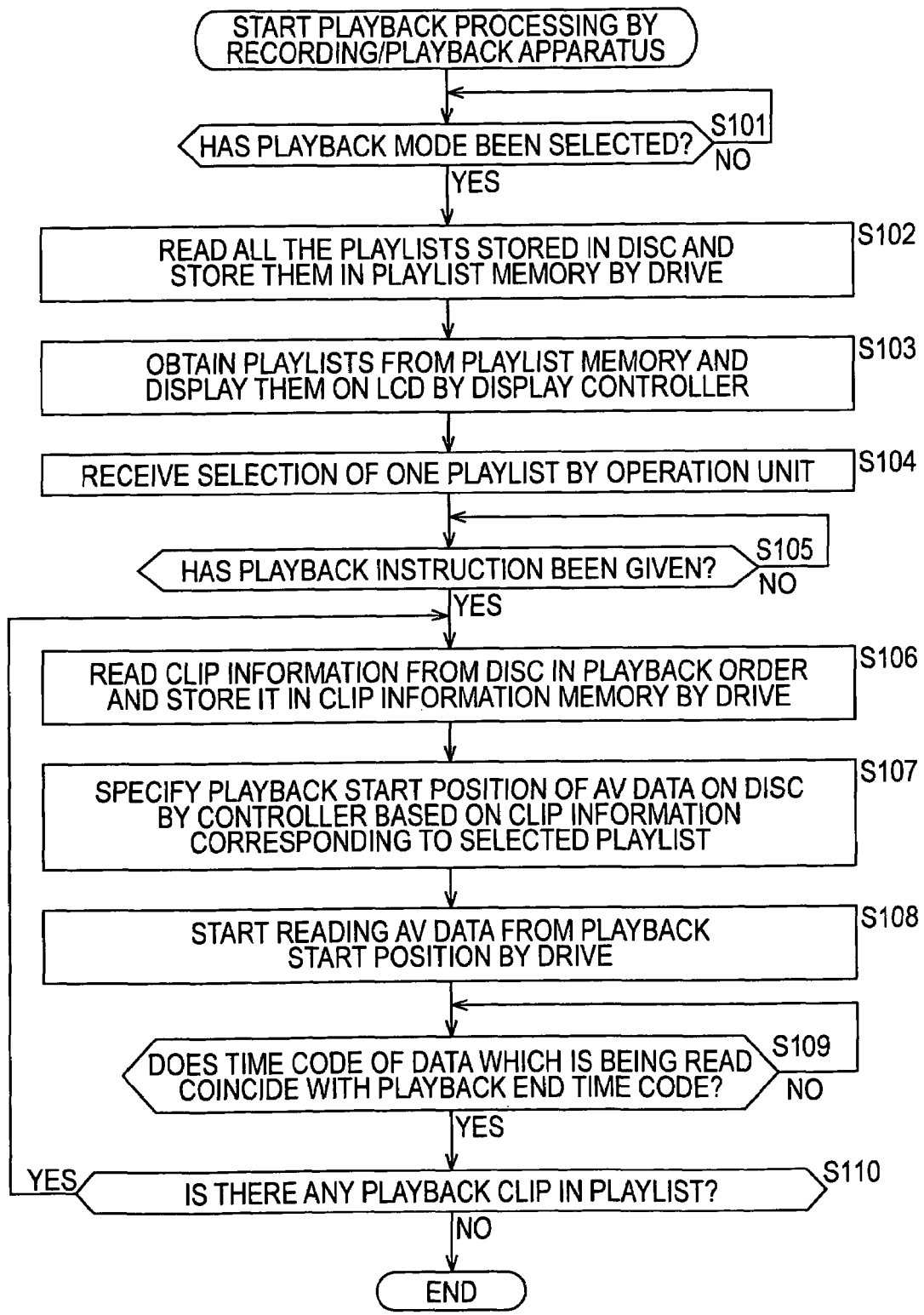
FIG. 9 is a flowchart illustrating playback processing performed by the recording/playback apparatus.

If an instruction to stop playback processing from the operation unit 11 while executing the playback processing shown in FIG. 9, the controller 12 interrupts the processing.

In the above-described example, the instructed recording start point and the playback start point are the same point. However, the playback start point may be displaced from the instructed recording start point. Also, in the above-described example, the instructed recording end point and the playback end point are the same point. However, the playback end point may be displaced from the instructed recording end point. An example in which the playback start point is displaced from the instructed recording start point and the playback end point is displaced from the instructed recording end point is shown in FIG. 10.

Figure 10:
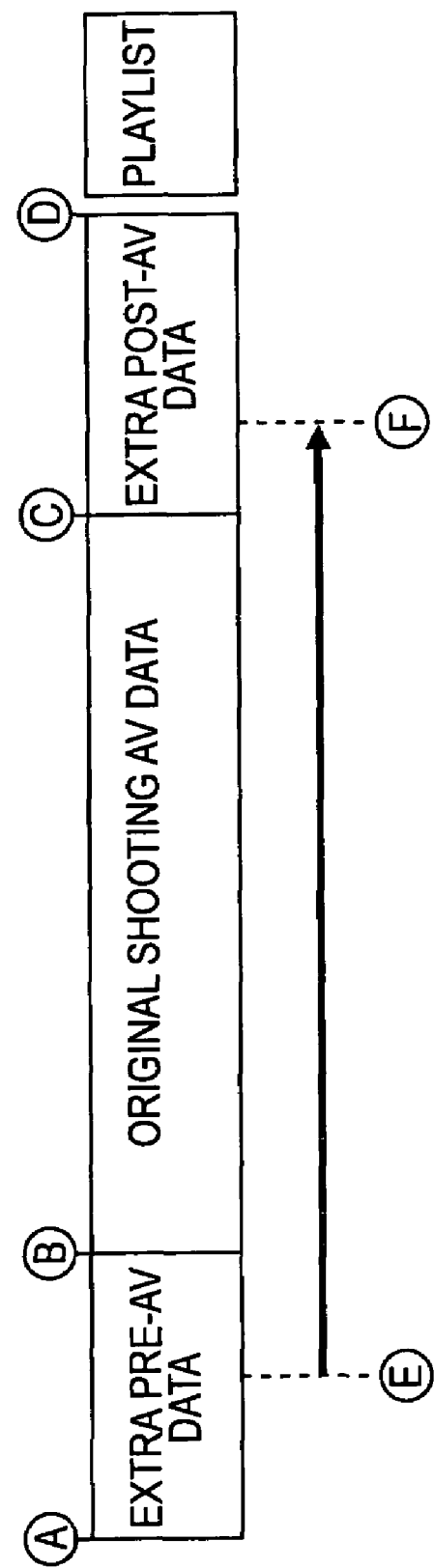
FIG. 10 illustrates an overview of editing processing.

As in FIG. 2, in FIG. 10, point A, B, C, and D indicate the recording start point, the instructed recording start point, the instructed recording end point, and the recording end point, respectively. When the recording processing is finished, the instructed recording start point B coincides with the playback start point, and the instructed recording end point C coincides with the playback end point. In contrast, in FIG. 10, point E is the playback start point, and point F is the playback end point. FIG. 10 shows that, unlike the instructed recording start point B, the playback start point E is located in the recording area of the extra pre-AV data, and unlike the instructed recording end point C, the playback end point F is located in the recording area of the extra post-AV data.

When the playback start point E and the playback end point F are set, as shown in FIG. 10, the time code at the playback start point E and the time code at the playback end point F are recorded as a playlist. Accordingly, when playback processing is performed according to the playlist, AV data in a zone (between E and F) indicated by the arrow shown in FIG. 10 is played back. The zone indicated by the arrow contains part of the extra pre-AV data and part of the extra post-AV data. The playback start point E and the playback end point F can be set as desired between the recording start point A and the recording end point D, though the playback start point E cannot be set after the playback end point F in terms of chronological order.

Figure 11:
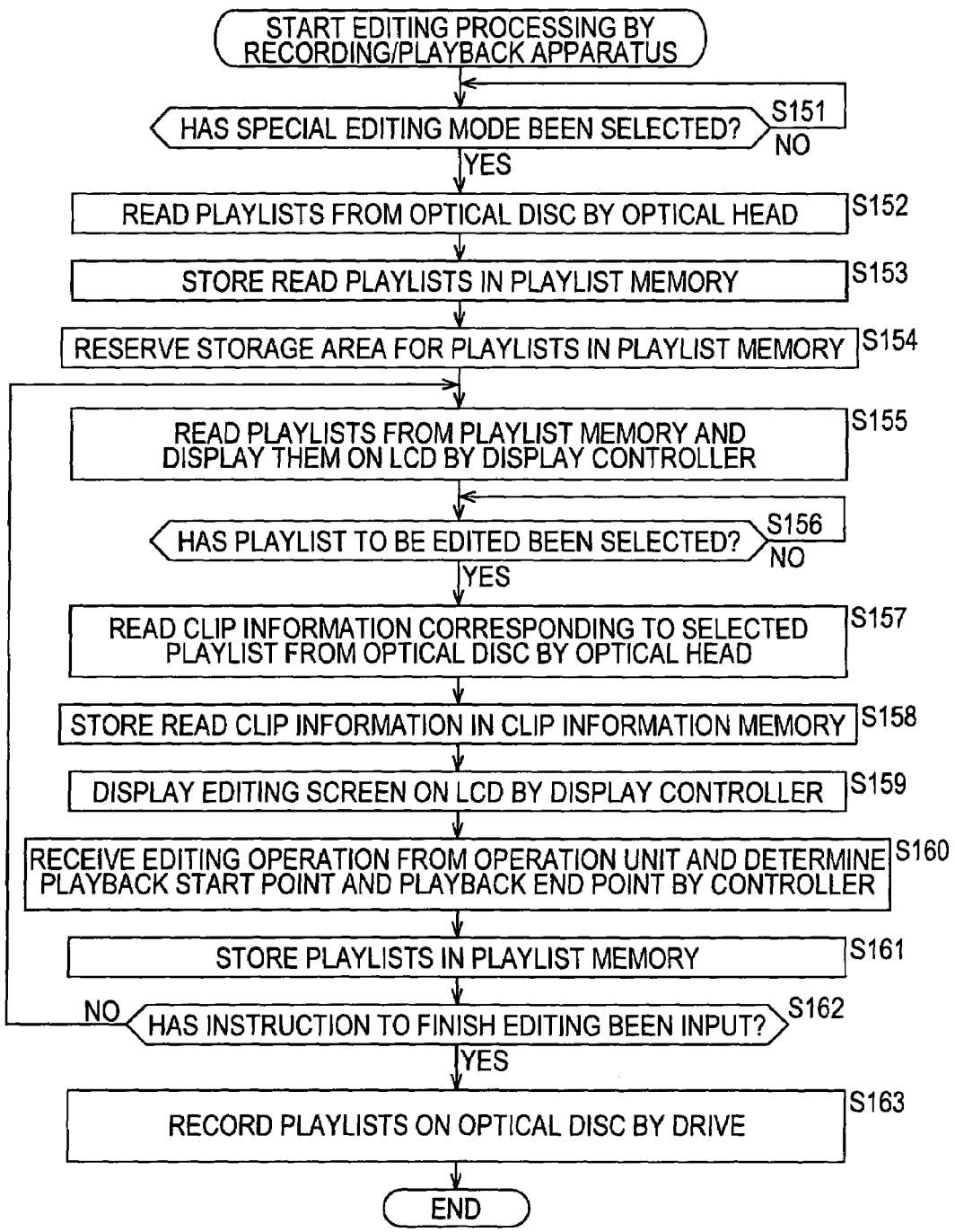
FIG. 11 is a flowchart illustrating the editing processing performed by the recording/playback apparatus.

A description is now given, with reference to the flowchart of FIG. 11, of editing processing when changing the playback start point E and the playback end point F.

In step S151, the controller 12 determines based on operation information from the operation unit 11 whether an operation for selecting a special editing mode has been input from the operation unit 11, and waits until such an operation is input. When an operation for selecting the special editing mode is input from the operation unit 11, the process proceeds to step S152. In addition to the special editing mode in which the extra zones can be changed, there is another mode, i.e., a normal mode in which the extra zones cannot be changed.

In step S152, the controller 12 instructs the drive controller 47 to read all the playlists recorded on the optical disc 41. The drive controller 47 then controls the servo controller 44 to instruct the optical head 42 to read the playlists from the optical disc 41. The read playlists are demodulated in the disc reader 46. In step S153, the controller 12 stores the playlists read in step S152 in the playlist memory 19.

In step S154, the controller 12 controls the playlist memory 19 to reserve a storage area to store new playlists.

In step S155, the controller 12 instructs the display controller 24 to display the playlists on the LCD 25. In response to the instruction from the controller 12, the display controller 24 reads all the playlists stored in the playlist memory 19 in step S153, and displays them on the LCD 25. For example, if playlist 1 through playlist 4 are recorded on the optical disc 41, as shown in FIG. 8, they are displayed on the LCD 25. The display controller 24 also displays a message for instructing the user to select one playlist.

In step S156, the controller 12 determines based on operation information from the operation unit 11 whether an operation for selecting one playlist to be edited has been input from the operation unit 11, and waits until such an operation is input. When an operation for selecting a playlist to be edited is input from the operation unit 11, the process proceeds to step S157.

In step S157, the controller 12 instructs the drive controller 47 to read clip information associated with the playlist selected in step S156 from the optical disc 41. For example, if playlist 1 shown in FIG. 8 is selected in step S156, the controller 12 instructs the drive controller 47 to read clip information of AV data A, i.e., clip information A, recorded on playlist 1. The drive controller 47 controls the servo controller 44 to instruct the optical head 42 to read clip information from the optical disc 41. The read clip information is demodulated in the disc reader 46. In step S158, the controller 12 stores the clip information read in step S157 in the clip information memory 20.

Figure 12:
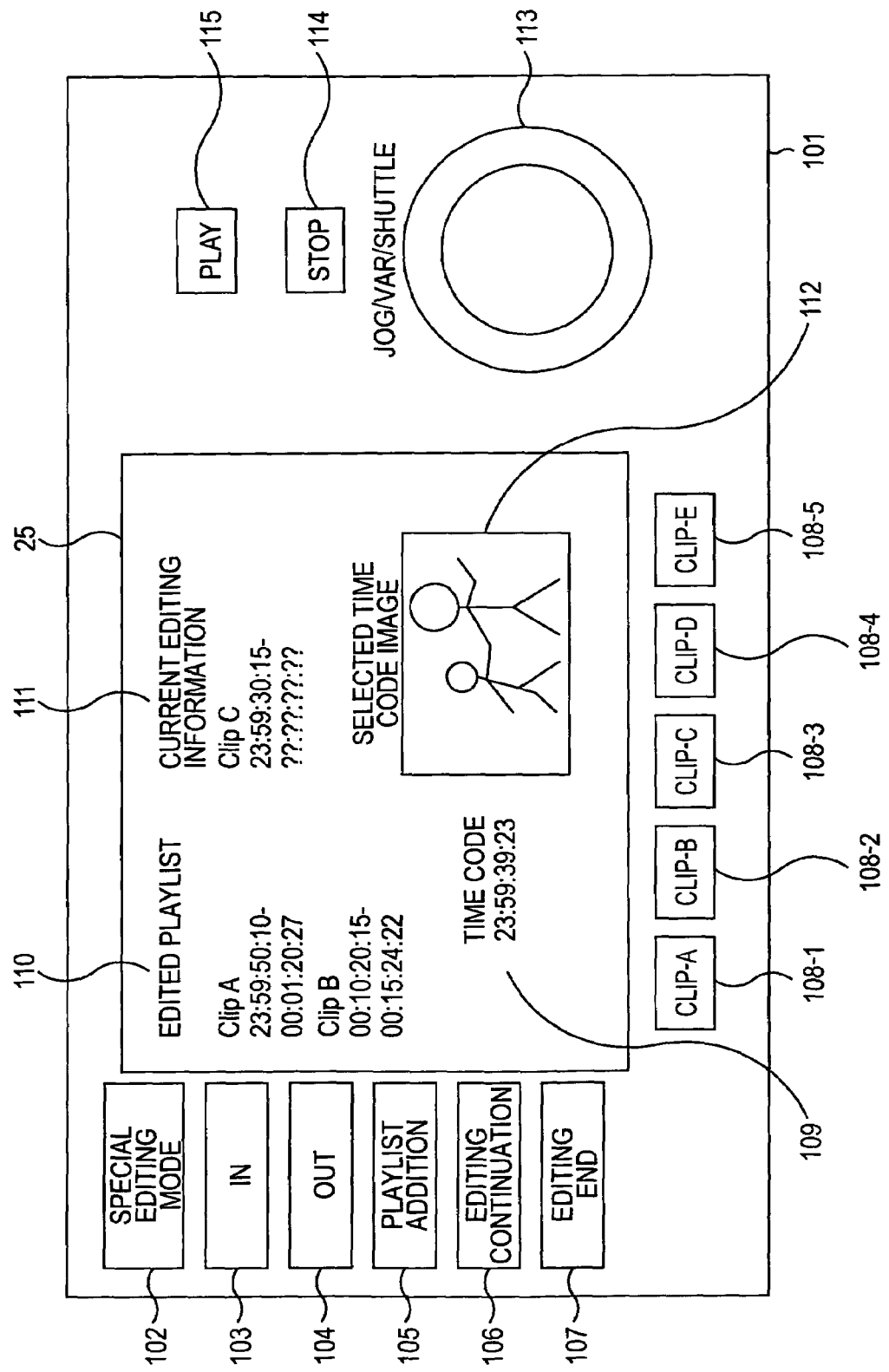
FIG. 12 illustrates an example of a user interface.

In step S159, the controller 12 instructs the display controller 24 to display an editing screen. After reading the playlists from the playlist memory 19 and the clip information from the clip information memory 20, the display controller 24 displays the editing screen on the LCD 25. FIG. 12 illustrates an example of the screen to be displayed on the LCD 25 in step S159. A user interface 101 containing part of the buttons and dials forming the operation unit 11 is shown in FIG. 12.

In the user interface 101 shown in FIG. 12, the operation unit 11 includes a special editing button 102 operated for selecting the special editing mode, an IN button 103 operated for specifying the playback start point, an OUT button 104 operated for specifying the playback end point, a playlist addition button 105 operated for adding a playlist, an editing continuation button 106 operated for continuing editing, an editing end button 107 operated for finishing editing, cut selection buttons 108-1 through 108-5 operated for selecting a cut to be edited, a playback button 115 operated for giving a playback instruction, a playback stop button 114 operated for giving a playback stop instruction, and a dial 113 receiving a jog or shuttle operation.

Also, a time code 109 of a currently editing cut, edited playlists 110 of edited cuts, current editing information 111 concerning a currently editing playlist, and a frame display area 112 in which a frame contained in currently editing AV data is displayed are displayed on the LCD 25.

In step S160, the controller 12 receives the determination of the playback start point and the playback end point according to operation information from the operation unit 11. More specifically, the user operates the dial 113 to change the frame to be displayed in the frame display area 112 forward and backward in chronological order. By operating the dial 113, the user is able to display all the frames of the extra pre-AV data, the original shooting AV data, and the extra post-AV data in the frame display area 112. When the user determines the frame at the playback start point, he/she operates the IN button 103 so as to specify the frame currently displayed in the frame display area 112 as the playback start point.

In this case, the controller 12 obtains the time code of the frame displayed in the frame display area 12 when the IN button 103 is operated as the time code at the playback start point.

When the user determines the frame at the playback end point, he/she operates the OUT button 104 to specify the frame currently displayed in the frame display area 112 as the playback end point. In this case, the controller 12 obtains the time code of the frame displayed in the frame display area 12 when the OUT button 104 is operated as the time code at the playback end point.

After the controller 12 obtains the time codes at the playback start point and the playback end point, the process proceeds to step S161.

In step S161, the controller 12 supplies the time codes at the playback start point and the playback end point obtained in step S160 to the playlist memory 19, and stores the time codes in the playlist memory 19 as a new playlist.

In step S162, the controller 12 determines based on operation information from the operation unit 11 whether an instruction to finish editing has been input from the operation unit 11. If such an instruction is not input from the operation unit 11, the process returns to step S155, and step S155 and the subsequent steps are repeated. If the controller 12 determines in step S162 that an instruction to finish editing has been input from the operation unit 11, the process proceeds to step S163.

In step S163, the controller 12 instructs the drive controller 47 to record the playlists stored in the playlist memory 19 in step S161 on the optical disc 41. The drive controller 47 then controls the disc writer 48 to read the playlists from the playlist memory 19, and controls the servo controller 44 to instruct the optical head 42 to record the playlists read by the disc writer 48 on the optical disc 41. In this case, the playlists read in step S152 may be overwritten by the playlists stored in step S161, or the playlists stored in step S161 may be recorded as different playlists without erasing the playlists read in step S152.

The editing processing is then completed.

Figure 13:
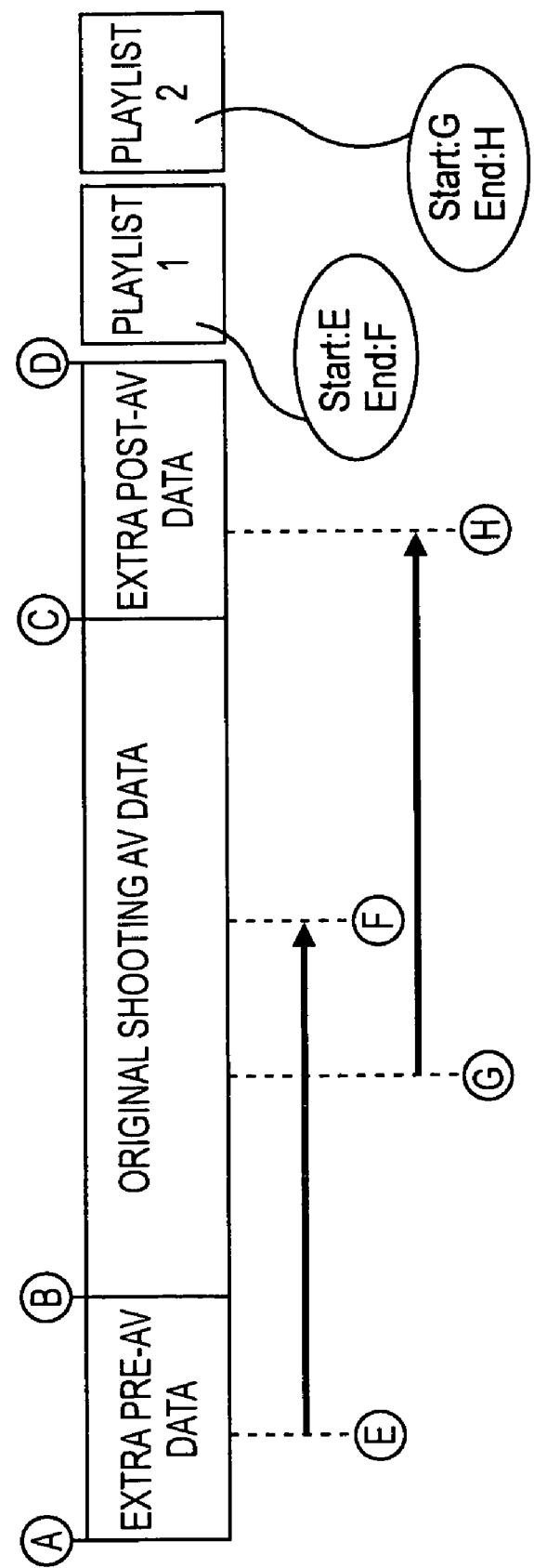
FIG. 13 illustrates another example of the overview of the editing processing.

The recording/playback apparatus 1 is able to, as shown in FIG. 13, create more than one playlist for the same AV data. In FIG. 13, playlist 1 containing the playback start point E and the playback end point F and playlist 2 containing the playback start point G and the playback end point H are provided together.

Figure 14:
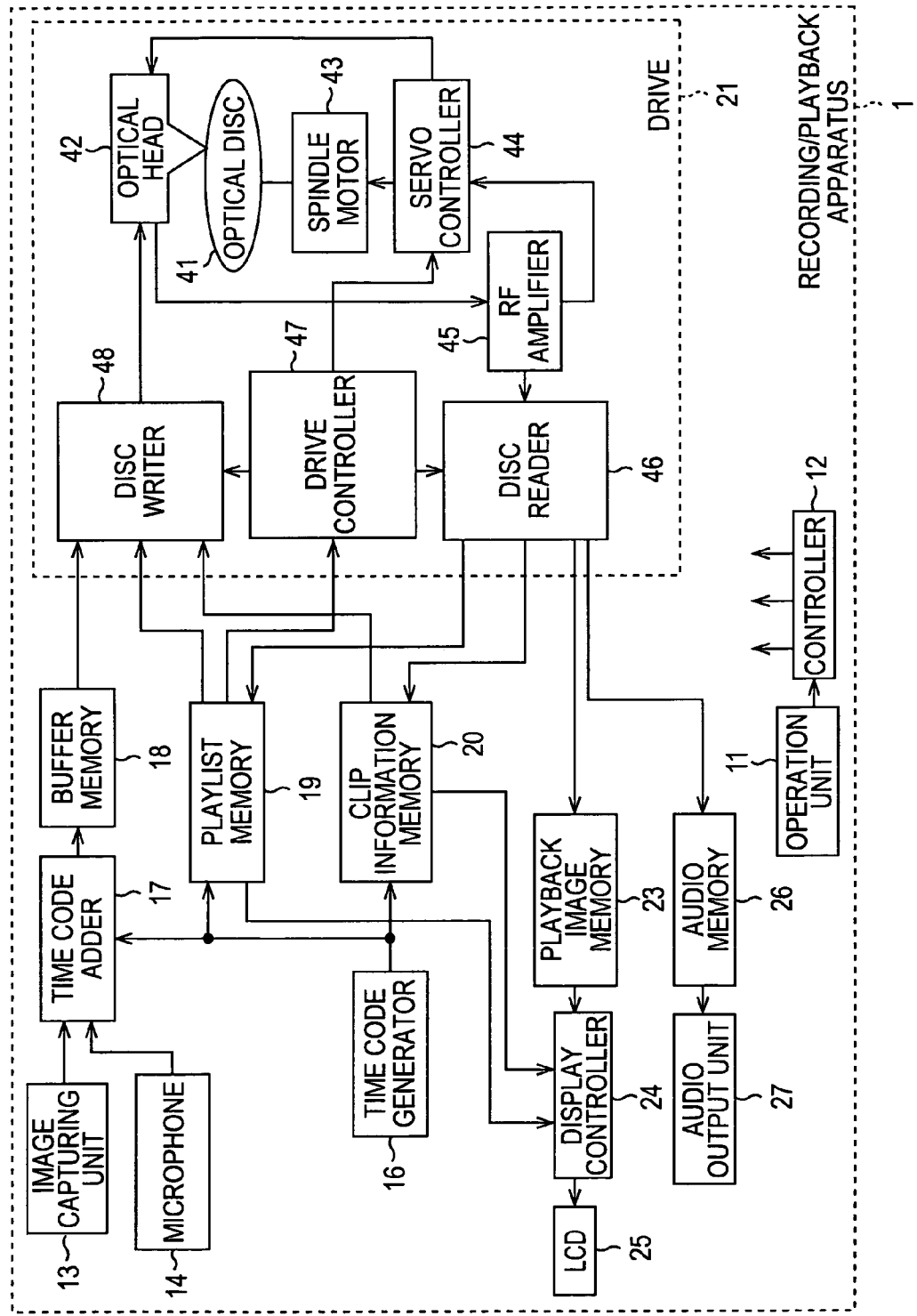
FIG. 14 is a block diagram illustrating another example of the configuration of a recording/playback apparatus different from that shown in FIG. 1 to which the present invention is applied.

The present invention is applicable to the recording/playback apparatus 1 shown in FIG. 14. The recording/playback apparatus 1 shown in FIG. 14 is equivalent to the configuration of the recording/playback apparatus 1 shown in FIG. 1 from which the data compression unit 15 and the data decompression unit 22 are removed, and the other elements are similar to those of the recording/playback apparatus 1 shown in FIG. 1. In the recording/playback apparatus 1 shown in FIG. 14, since AV data recorded on the optical disc 41 is not compressed, the recording time becomes shorter than the recording/playback apparatus 1 shown in FIG. 1. On the other hand, data compression can be omitted in the recording processing, and data decompression can be omitted in the playback processing.

Figure 15:
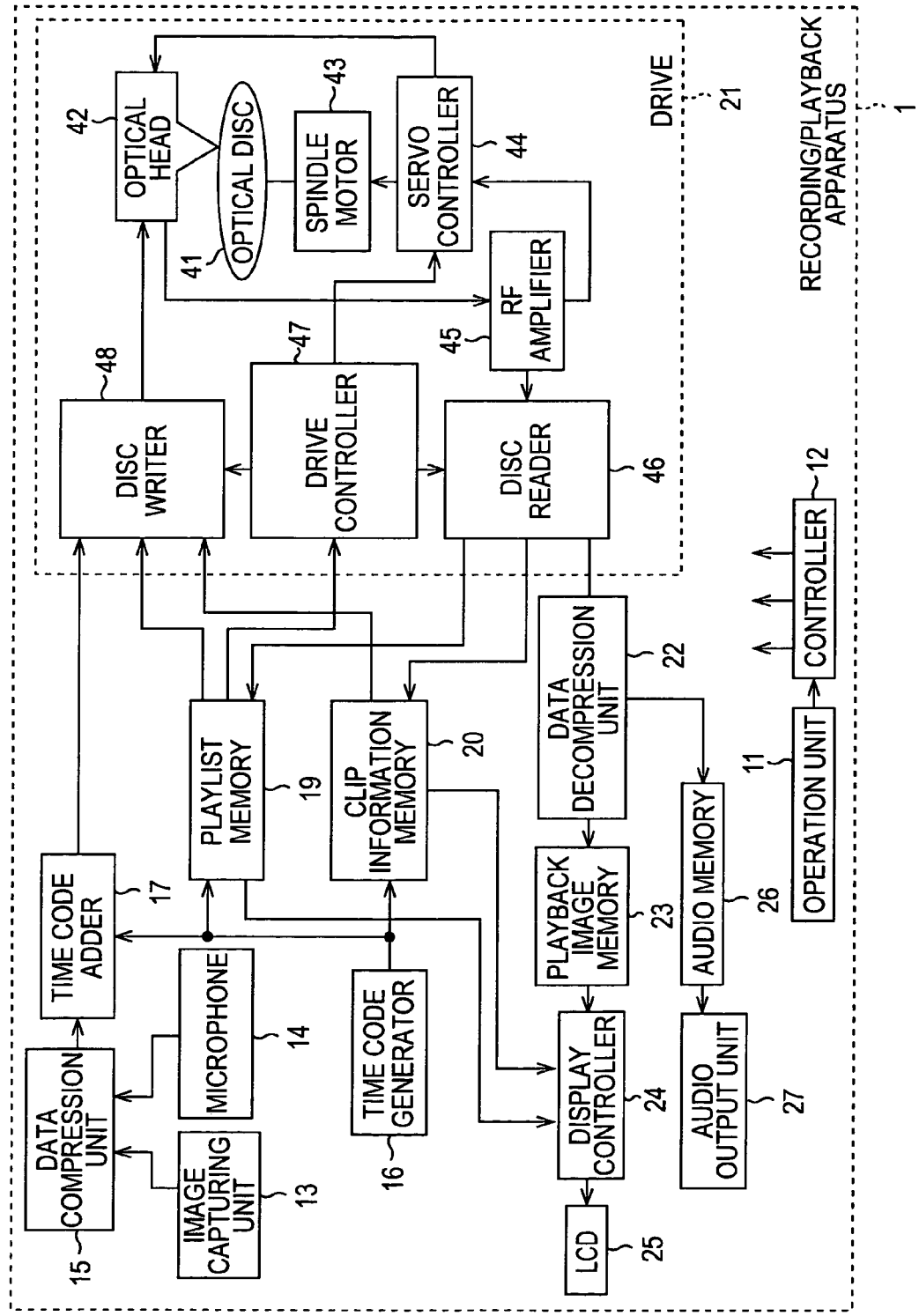
FIG. 15 is a block diagram illustrating another example of the configuration of a recording/playback apparatus different from that shown in FIG. 1 or 14 to which the present invention is applied.

An example of the recording/playback apparatus 1 different from the recording/playback apparatus 1 shown in FIG. 1 or 14 is shown in FIG. 15. The recording/playback apparatus 1 shown in FIG. 15 is equivalent to the configuration of the recording/playback apparatus 1 from which the buffer memory 18 is removed, and other elements are similar to those of the recording/playback apparatus 1 shown in FIG. 1. There is a great difference in the recording processing of the recording/playback apparatus 1 shown in FIG. 15 from that shown in FIG. 1.

The recording processing performed by the recording/playback apparatus 1 shown in FIG. 15 is described below with reference to the flowcharts of FIGS. 16 and 17.

In step S201, the controller 12 determines based on operation information from the operation unit 11 whether an operation for selecting the camera standby mode has been input, and waits until such an operation is input. When an operation for selecting the camera standby mode is input from the input unit 11, the controller 12 determines in step S201 that an operation for selecting the camera standby mode has been input, and the process proceeds to step S202.

In step S202, the controller 12 determines whether the recording mode of the time code is the free run mode. If the recording mode of the time code is the free run mode, the process proceeds to step S203.

In step S203, the controller 12 instructs the time code generator 16 to initially set the time code. In response to the instruction from the controller 12, the time code generator 16 initially sets the time code to be "00:00:00:00". After the processing of step S203, the process proceeds to step S204.

If the controller 12 determines in step S202 that the recording mode of the time code is not the free run mode, i.e., if the recording mode is the REC run mode, the processing of step S203 is skipped, and the process proceeds to step S204.

In step S204, the controller 12 controls the image capturing unit 13, the microphone 14, the data compression unit 15, and the time code adder 17 to start capturing images, collecting sound, and compressing data. The capturing and storage of images are specifically described below.

The image capturing unit 13 captures an image and supplies a captured image (moving picture) to the data compression unit 15. The microphone 14 generates an audio signal corresponding to the sound around the recording/playback apparatus 1 and supplies the audio signal to the data compression unit 15. The data compression unit 15 compresses the captured image supplied from the image capturing unit 13 and the audio signal supplied from the microphone 14 according to a predetermined compression technique, and supplies compressed data to the time code adder 17. The time code adder 17 adds a time code generated by the time code generator 16 at the corresponding timing to the compressed data supplied from the data compression unit 15. The compressed data provided with the time code is then supplied to the disc writer 48.

In step S205, the controller 12 instructs the drive controller 47 to execute extra pre-data recording processing. Details of the extra pre-data recording processing are given below with reference to the flowchart of FIG. 18.

Figure 18:
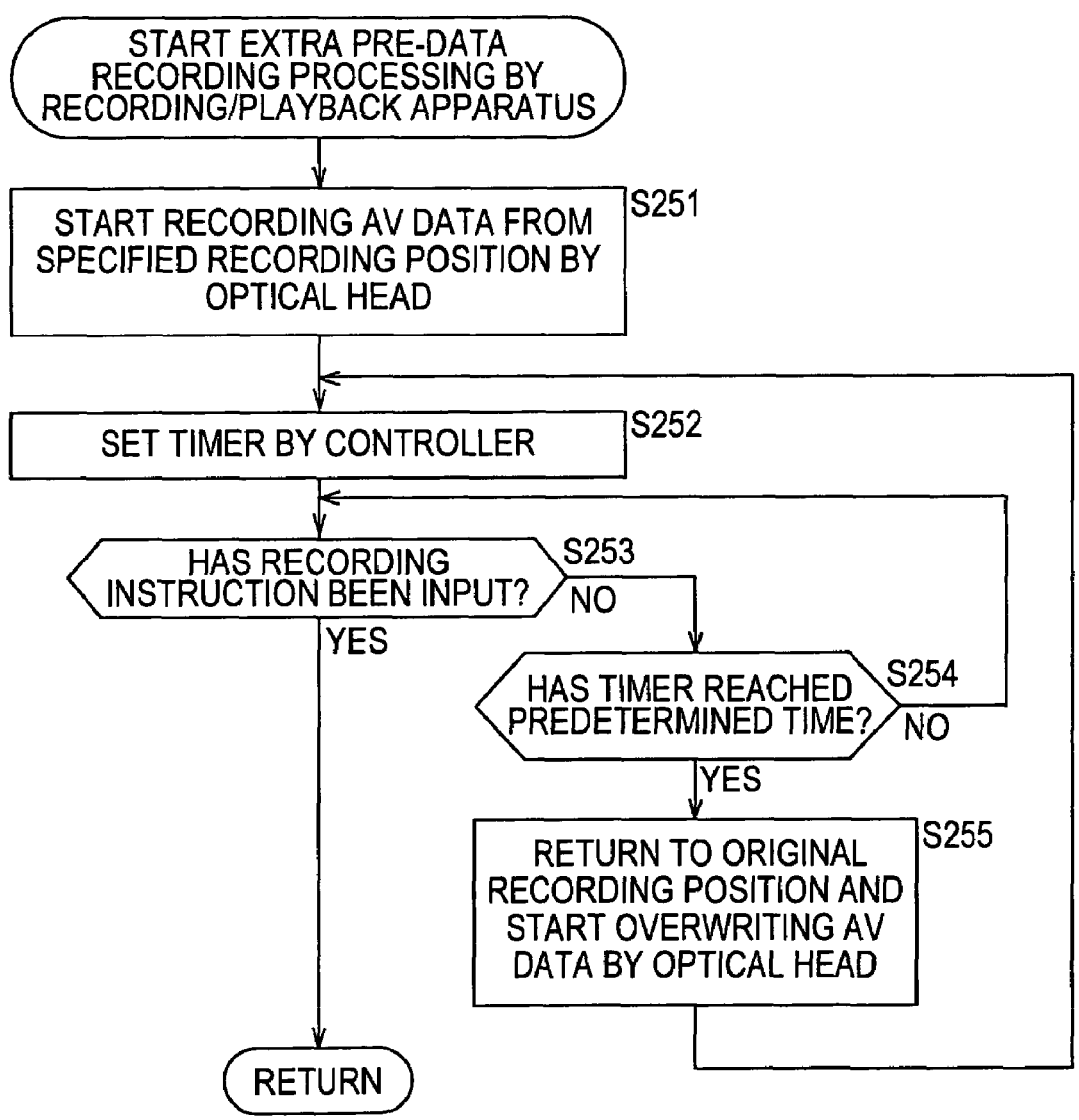
FIG. 18 is a flowchart illustrating details of step S205 of FIG. 16.
Figure 19:
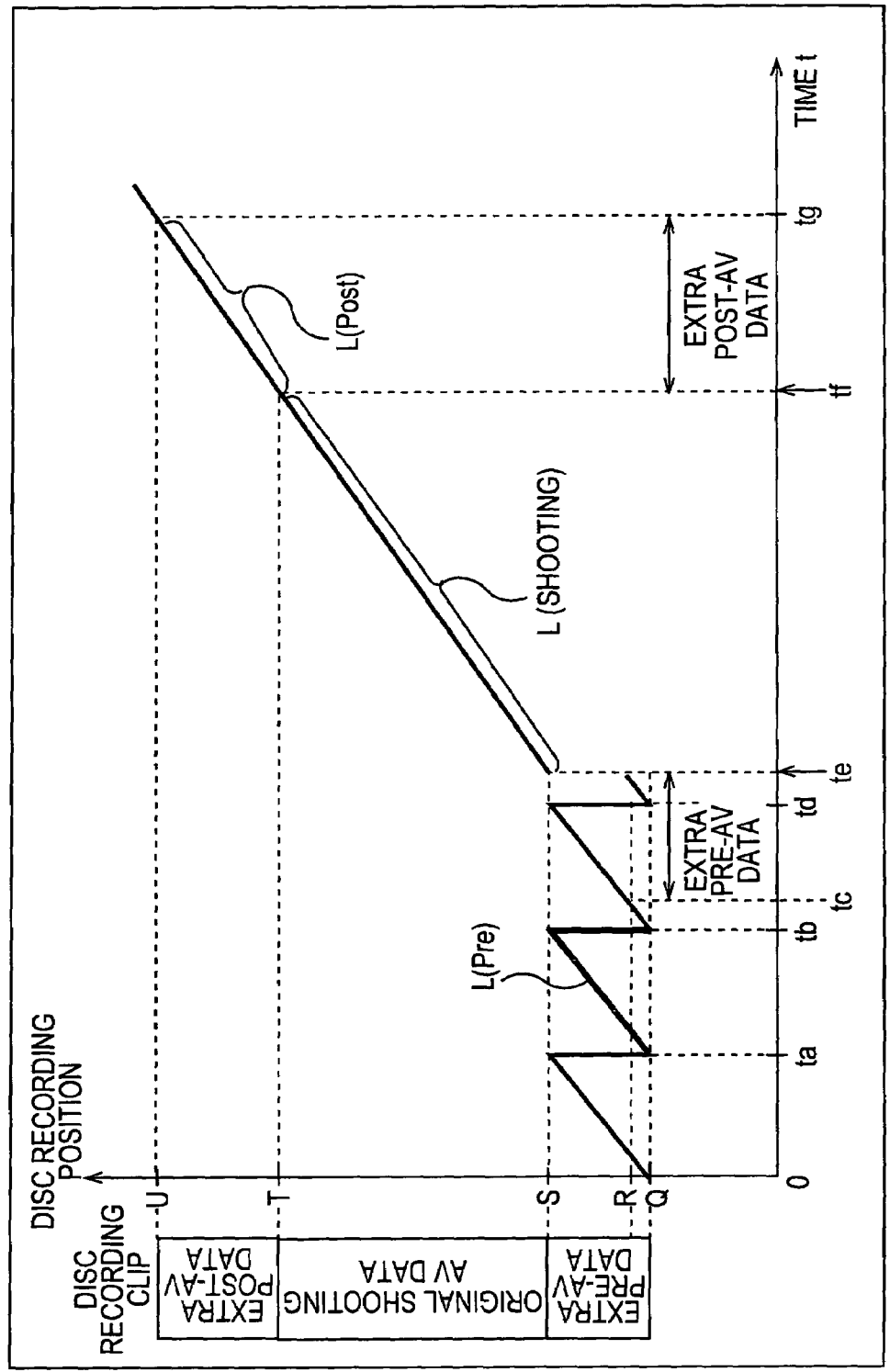
FIG. 19 illustrates recording positions of AV data on an optical disc.

In step S251 of FIG. 18, the drive controller 47 instructs the servo controller 44 to start recording compressed data (AV data) supplied from the time code adder 17 to the disc writer 48 on the optical disc 41. The recording position of AV data on the optical disc 41 after the camera standby mode is selected is shown in FIG. 19. In the graph of FIG. 19, the horizontal axis represents time t, and the vertical axis designates the recording position of the AV data on the optical disc 41. When the processing of step S251 is executed, time t is 0 in FIG. 19. The position Q of FIG. 19 is the recording start position at which the recording of the AV data is started in step S251. The recording position of the AV data on the optical disc 41 shifts from Q to S over time in FIG. 19.

In step S252, the controller 12 sets a built-in timer to be 0.

In step S253, the controller 12 determines based on operation information from the operation unit 11 whether a recording instruction has been input from the operation unit 11. If a recording instruction is not input from the operation unit 11, the process proceeds to step S254. In step S254, the controller 12 determines whether a predetermined time period (corresponding to the time of the extra pre-AV data recorded on the optical disc 41, for example, one minute) has elapsed in the timer set in step S252. If the timer has not reached the predetermined time period, the process returns to step S253, and step S253 and the subsequent steps are repeated.

If the controller 12 determines in step S254 that the timer has reached the predetermined time period, the process proceeds to step S255. In FIG. 19, at time ta, the controller 12 determines that the timer has reached the predetermined time period. In step S255, the controller 12 instructs the drive controller 47 to return to the recording position at which the recording of the AV data is started in step S251, and to overwrite the AV data. The drive controller 47 controls the optical head 42 to start overwriting the AV data at the recording start position at which the recording of the AV data is started in step S251. In FIG. 19, at time ta, the recording position returns from S to Q.

After step S255, the process returns to step S252, and step S252 and the subsequent steps are repeated.

The above-described processing is repeated until the controller 12 determines in step S253 that a recording instruction has been input from the operation unit 11. As a result, as indicated by line L(Pre) in FIG. 19, AV data is repeatedly recorded between the recording positions Q and S at predetermined time intervals. At time ta, tb, and td in FIG. 19, the controller 12 determines in step S254 that the timer has reached the predetermined time.

Figure 16:
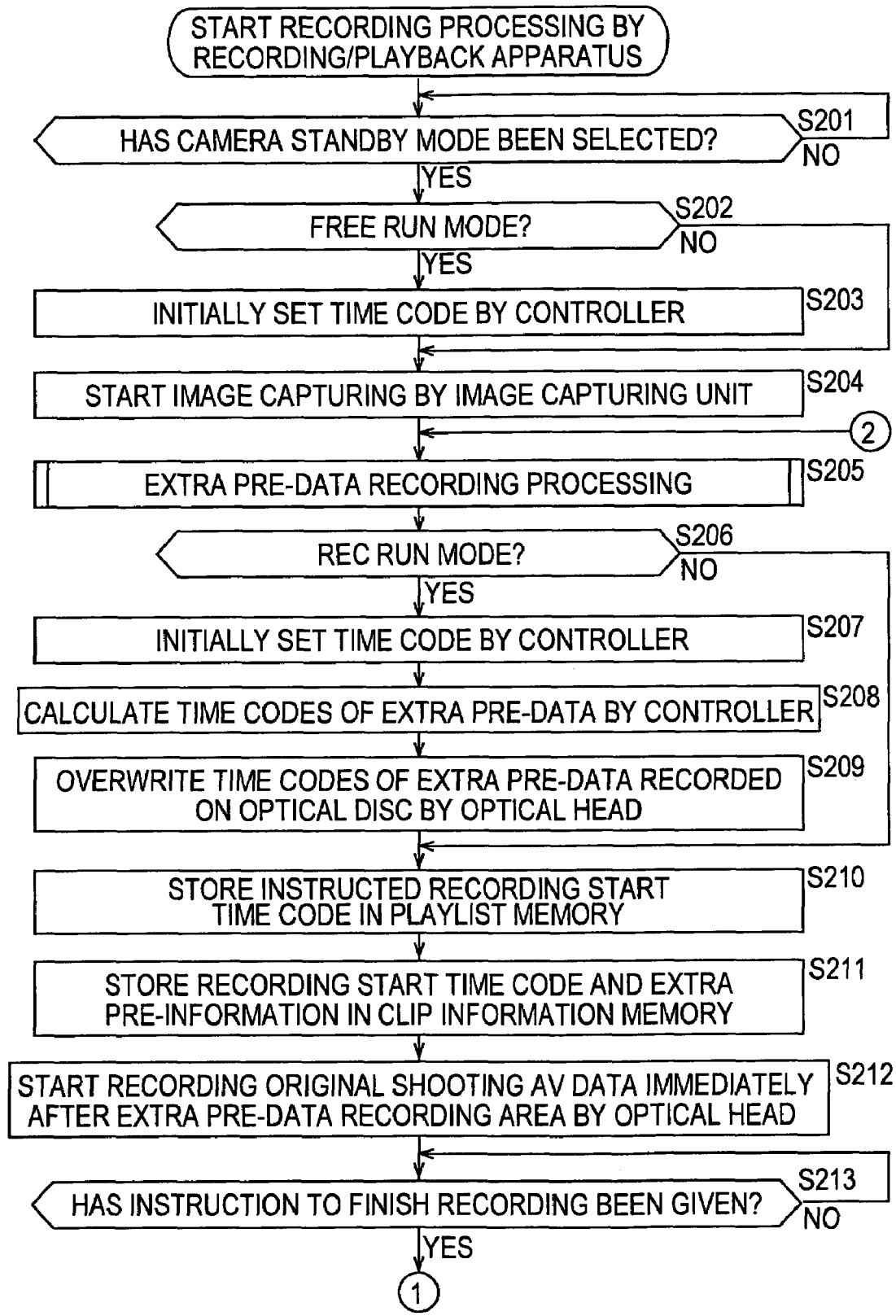
FIG. 16 is a flowchart illustrating recording processing performed by the recording/playback apparatus shown in FIG. 15.

If the controller 12 determines in step S253 that a recording instruction has been input from the operation unit 11, the extra pre-data recording processing shown in FIG. 18 is completed, and the process proceeds to step S206 of FIG. 16. At time te in FIG. 19, the controller 12 determines in step S253 that a recording instruction has been input from the input unit 11.

If the recording mode of the time code is the REC run mode, the time codes stored together with the video data and audio data are temporary time codes. These time codes are overwritten by the processing of step S209, which is described below.

In step S206, the controller 12 determines whether the recording mode of the time code is the REC run mode. If the recording mode of the time code is the REC run mode, the process proceeds to step S207.

In step S207, the controller 12 instructs the time code generator 16 to initially set the time code. The time code generator 16 initially sets the time code in response to an instruction from the controller 12, and more specifically, the time code generator 16 sets the time code to be "00:00:00: 00". After setting the time code to be "00:00:00:00" in step S207, the time code generator 16 generates time codes so that it counts up the time code every 1/60 seconds to, for example, "00:00:00:01", "00:00:00:02", and "00:00:00:03". After the processing of step S207, the process proceeds to step S208.

In step S208, the controller 12 calculates the time code of the extra pre-AV data. That is, in the REC run mode, time codes calculated backward from the instructed recording start point, such as "23:59:59:59" "23:59:59:58", and "23:59:59: 57", are recorded. The controller 12 then calculates backward the time codes recorded together with the extra pre-AV data recorded on the optical disc 41.

In step S209, the controller 12 instructs the drive controller 47 to overwrite the time codes of the extra pre-AV data by the time codes calculated in step S208. In response to the instruction from the controller 12, the drive controller 47 controls the disc writer 48 and the servo controller 44 to overwrite the time codes of the extra pre-AV data recorded on the optical disc 41 by the time codes calculated in step S208. After the processing of step S209, the process proceeds to step S210.

If all the frames are recorded by adding the time codes thereto, the time codes of all the extra pre-AV data frames are overwritten. However, only the time code of the head frame of the AV data may be recorded, or only the time codes of discontinuous frames, i.e., when the time codes are not temporally continuous, may be recorded, in which case, only the time codes of the corresponding frames can be overwritten.

If the controller 12 determines in step S206 that the recording mode of the time code is not the REC run mode (it is the free run mode), steps S207 through S209 are skipped, and the process proceeds to step S210.

In step S210, the controller 12 instructs the playlist memory 19 to store the time code at the instructed recording start point. The playlist memory 19 stores the time code at the instructed recording point in response to the instruction from the controller 12.

After step S210, in step S211, the controller 12 instructs the clip information memory 20 to store the time code at the recording start point. In response to the instruction from the controller 12, the clip information memory 20 stores the time code at the recording start point. In this case, the controller 12 obtains the recording start position information concerning the recording start position of the AV data on the optical disc 41, and stores the information in the clip information memory 20. The controller 12 also obtains information concerning the recording position R shown in FIG. 19 and stores the information in the clip information memory 20. After the processing of step S211, the process proceeds to step S212.

In step S212, the controller 12 instructs the drive controller 47 to start recording original shooting AV data immediately after the position at which the extra pre-AV data is recorded. In response to the instruction from the controller 12, the drive controller 47 starts recording the original shooting AV data immediately after the position at which the extra pre-AV data is recorded. The speed at which the AV data is recorded is ×1.

The process proceeds to step S213. In step S213, the controller 12 determines based on operation information from the operation unit 11 whether an instruction to finish recording has been input from the operation unit 11, and waits until such an instruction is input by repeating the processing of step S213. In the meantime, the supply of the AV data from the time code adder 17 to the disc writer 48 and the recording of the AV data supplied to the disc writer 48 on the optical disc 41 by the optical head 42 are continued.

Figure 17:
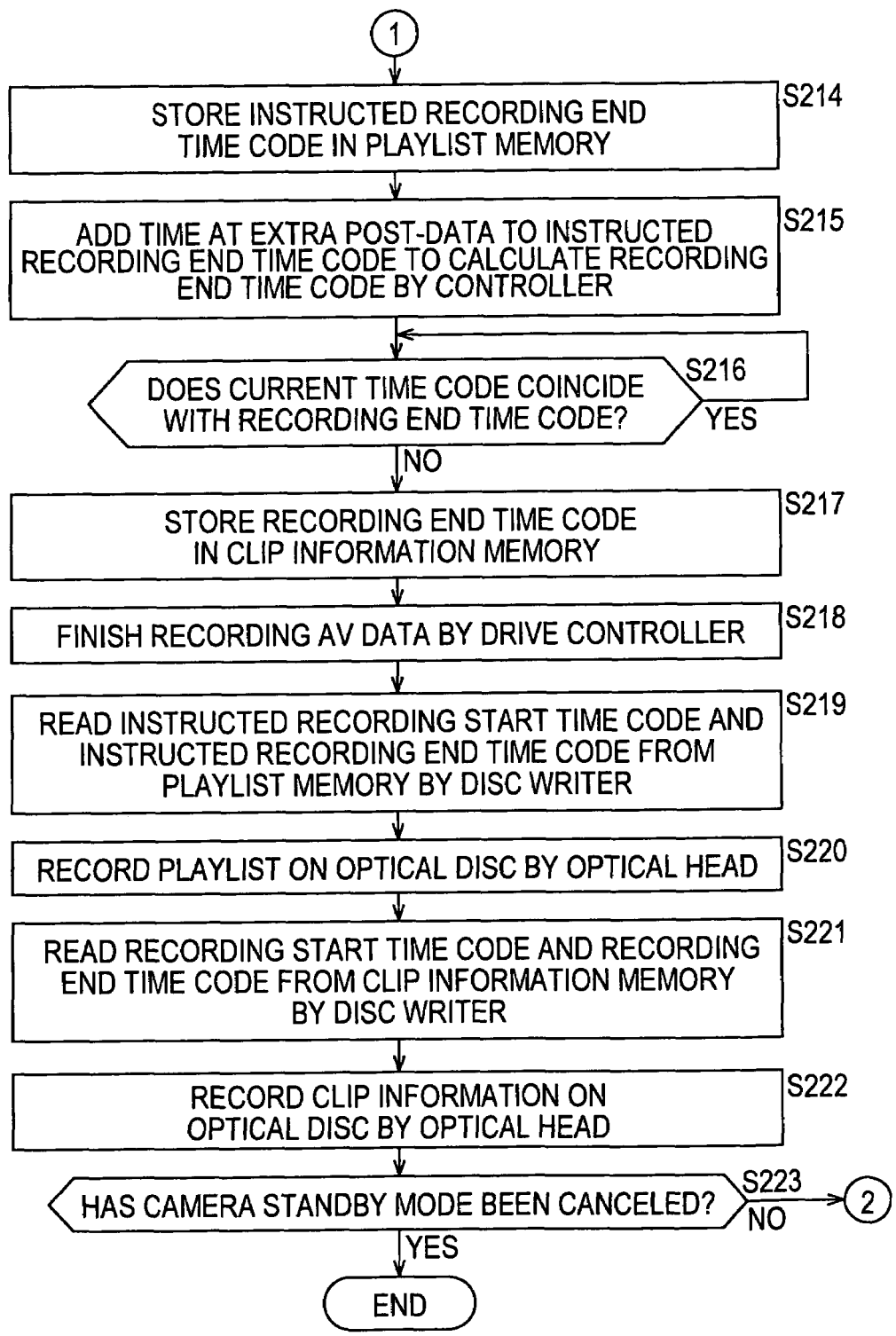
FIG. 17 is a flowchart continued from the flowchart of FIG. 16 illustrating the recording processing performed by the recording/playback apparatus shown in FIG. 15.

If the controller 12 determines in step S213 that an instruction to finish recording has been input from the operation unit 11, the process proceeds to step S214 of FIG. 17. At time tf in FIG. 19, an instruction to finish recording is input from the operation unit 11.

Steps S214 through S223 are substantially similar to steps S18 through S27, respectively, of FIG. 5, and only operations different from those of FIG. 5 are described in detail below, and the same operations are only simply explained.

In step S214, upon receiving an instruction from the controller 12, the playlist memory 19 stores the time code obtained from the time code generator 16 as the time code at the instructed recording end point. In step S215, the controller 12 adds the time (for example, one minute) for the extra post-AV data to the time code at the instructed recording end point so as to calculate the time code at the recording end point. In step S216, the controller 12 waits until the time code generated by the time code generator 16 coincides with the time code at the recording end point calculated in step S215, and when the time code generated by the time code generator 16 coincides with the time code at the recording end point calculated in step S215, the process proceeds to step S217. At time tg in FIG. 19, the time code generated by the time code generator 16 coincides with the time code at the recording end point calculated in step S215.

In step S217, in response to an instruction from the controller 12, the clip information memory 20 stores the time code when the time code generated by the time code generator 216 coincides in step S216 with the time code at the recording end point calculated in step S215 as the time code at the recording end point. In step S218, in response to an instruction from the controller 12, the drive controller 47 controls the disc writer 48 and the optical head 42 to finish recording the AV data on the optical disc 41.

In step S219, in response to an instruction from the controller 12, the disc writer 48 reads the time code at the instructed recording start point and the time code at the instructed recording end point from the playlist memory 19. In step S220, the drive controller 47 controls the optical head 42 to record the playlist (the time code at the instructed recording start point and the time code at the instructed recording end point) read from the playlist memory 19 by the disc writer 48 in step S219 on the optical disc 41. The playlist may be indicated by, for example, the time code at the instructed recording start point and the recording length from the instructed recording start point to the instructed recording end point, or the time code at the instructed recording start point and the recording length from the instructed recording start point to the instructed recording end point.

In step S221, the controller 12 instructs the disc writer 48 to read the recording start position information, the position information concerning the recording position R, the time code at the recording start point, and the time code at the recording end point from the clip information memory 20. In response to the instruction from the controller 12, the disc writer 48 reads the recording start position information, the position information concerning the recording position R, the time code at the recording start point, and the time code at the recording end point from the playlist memory 19. The recording start position information, the position information concerning the recording position R, the time code at the recording start point, and the time code at the recording end point form clip information.

Then, in step S222, the drive controller 47 controls the optical head 42 to record the clip information (the recording start position information, the position information concerning the recording position R, the time code at the recording start point, and the time code at the recording end point D) read from the clip information memory 20 by the disc writer 48 in step S221 on the optical disc 41.

In step S223, the controller 12 determines whether the camera standby mode has been canceled based on operation information from the operation unit 11. If the camera standby mode is not canceled, the process returns to step S205 of FIG. 16, and step S205 and the subsequent steps are repeated. If the controller 12 determines in step S223 that the camera standby mode has been canceled, the recording processing is completed.

A description of the recording processing performed by the recording/playback apparatus 1 shown in FIG. 15 has been completed.

In the above-described processing, AV data for a predetermined time length after an instruction to finish recording is input is recorded on the optical disc 41 as extra post-AV data. Alternatively, AV data for a predetermined amount of data after an instruction to finish recording is input may be recorded on the optical disc 41.

Figure 20:
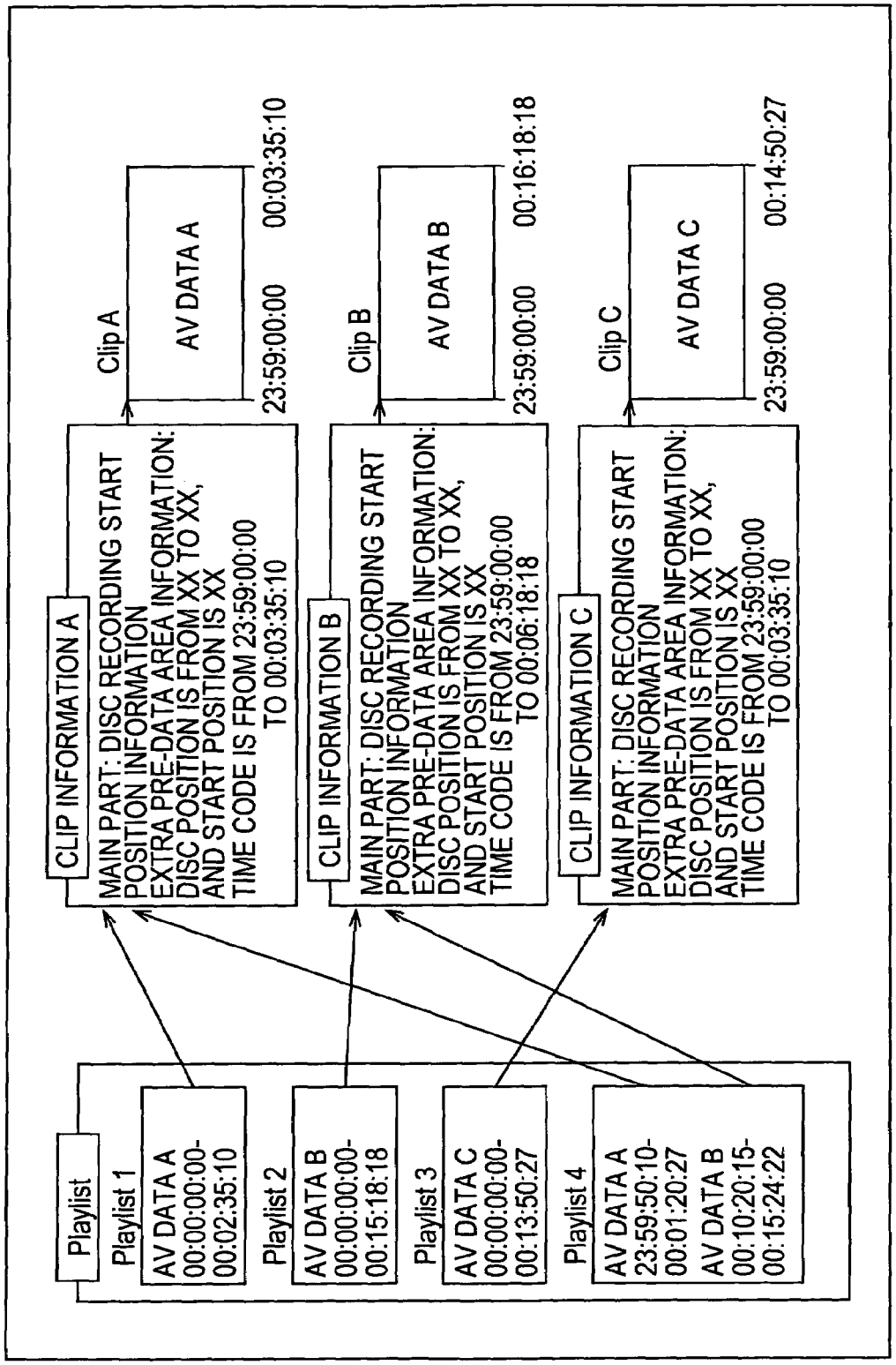
FIG. 20 illustrates clip information and playlists in the recording/playback apparatus shown in FIG. 15.

The difference between the clip information recorded on the optical disc 41 by the recording/playback apparatus 1 shown in FIG. 1 and the clip information recorded on the optical disc 41 by the recording/playback apparatus 1 shown in FIG. 15 is described below by comparing FIG. 8 and FIG. 20. FIG. 20 illustrates an example of the playlists and clip information recorded on the optical disc 41 as a result of performing the recording processing shown in FIGS. 16 and 17. The time codes at the instructed recording start points (playback start points) indicated in playlist 1 through playlist 4 shown in FIG. 20 are the same time codes at the instructed recording start points (playback start points) indicated in playlist 1 through playlist 4 shown in FIG. 8. The time codes at the instructed recording end points (playback end points) indicated in playlist 1 through playlist 4 shown in FIG. 20 are the same time codes at the instructed recording end points (playback end points) indicated in playlist 1 through playlist 4 shown in FIG. 8.

The time codes at the recording start points indicated in clip information A through clip information C shown in FIG. 20 are the same time codes at the recording start points indicated in clip information A through clip information C shown in FIG. 8. The time codes at the recording end points indicated in clip information A through clip information C shown in FIG. 20 are the same time codes at the recording end points indicated in clip information A through clip information C shown in FIG. 8.

Figure 21:
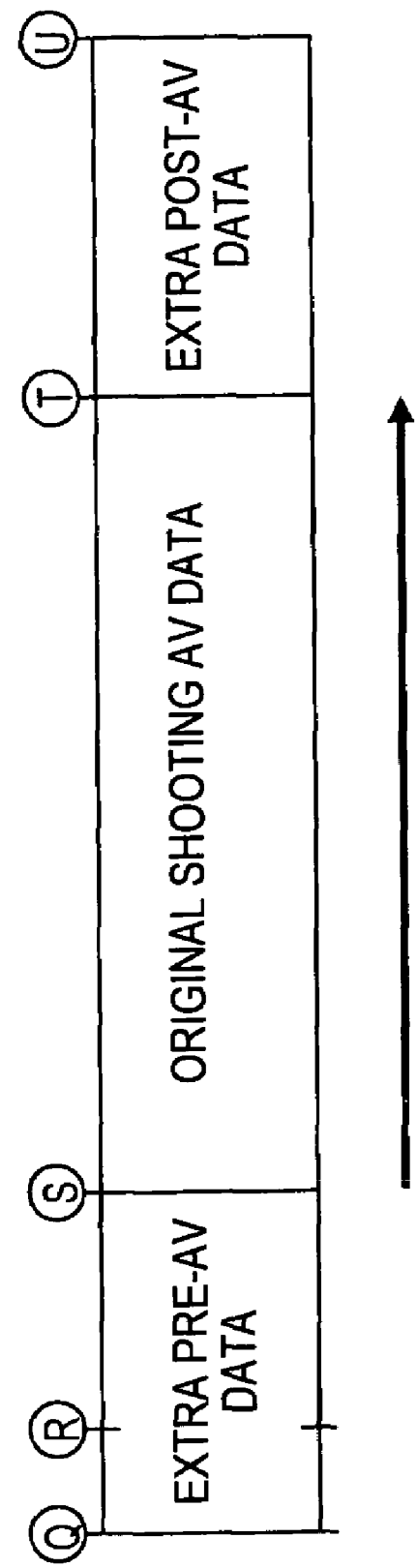
FIG. 21 illustrates an example of AV data recorded by the recording/playback apparatus shown in FIG. 15.

The clip information shown in FIG. 20 contains information which is not contained in the clip information shown in FIG. 8, i.e., information concerning the recording position R shown in FIG. 19. By recording the information concerning the recording position R on the clip information, the recording/playback apparatus 1 is able to play back AV data in chronological order. The reason is discussed below with reference to FIGS. 21 and 22. In FIG. 21, point Q is the recording start point of one cut of AV data recorded on the optical disc 41. Point R is the point at which the extra pre-AV data is recorded when an instruction to start recording is received. Point S is the point at which the recording of the original shooting AV data is started immediately after an instruction to start recording is received. Point T is the point at which original shooting AV data is recorded when an instruction to finish recording is received. Point U is the recording end point of one cut of AV data.

Attention is now focused on the area of the extra pre-AV data. When rearranging the captured items of the extra pre-AV data in chronological order, the AV data immediately after the point R is the oldest data, and the AV data gradually shifts toward the point S in chronological order. After reaching the point S, the data returns to the point Q and shifts from the point Q to the point R in chronological order.

Figure 22:
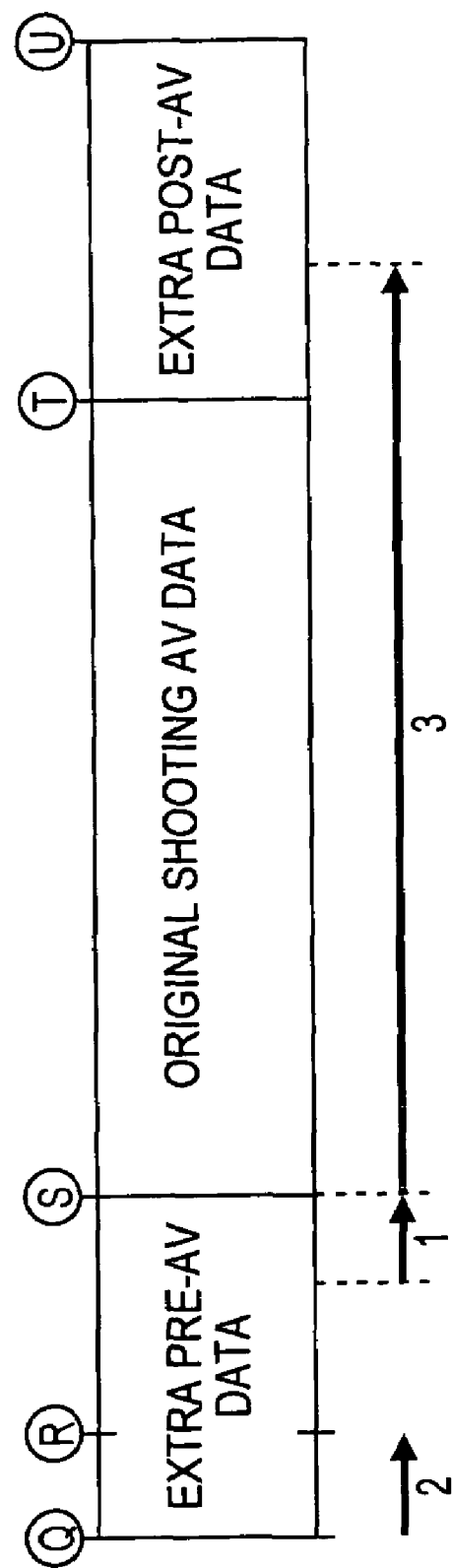
FIG. 22 illustrates an example of the playback order of AV data recorded by the recording/playback apparatus shown in FIG. 15.

Accordingly, when playing back this extra pre-AV data, the AV data from the point R to the point S is first played back, and then, the AV data from the point Q to the point R is played back so that the images can be played back in chronological order. Accordingly, for example, as shown in FIG. 22, AV data in the zone indicated by arrow 1 is played back, and then, AV data in the zone indicated by arrow 2 is played back, and finally, AV data in the zone indicated by arrow 3 is played back so that the images can be played back in chronological order.

To define the playback order, as described above, the information concerning the recording position R is recorded on the clip information.

As described above, according to the recording/playback apparatus 1, images (sound) for a predetermined time period before and after images (sound) which the user intends to record are also recorded. Thus, when the user wishes to view or listen to the images (sound) before (after) the original images or edit them after the recording operation, he/she is able to do so.

Even if the capturer and the editor are not the same person, the editor is able to use (or check) images.

If a playback operation is performed after the recording operation without performing editing, images (sound) to be played back contain images (sound) which the user has wished to record, as in a known recording/playback apparatus.

A description has been given above, assuming that AV data is physically continuously recorded on the optical disc 41. However, AV data does not have to be physically continuously recorded, and it may be recorded by being divided as long as the AV data can be identified as continuous data.

Another embodiment of the present invention is described below with reference to the drawings.

Figure 23:
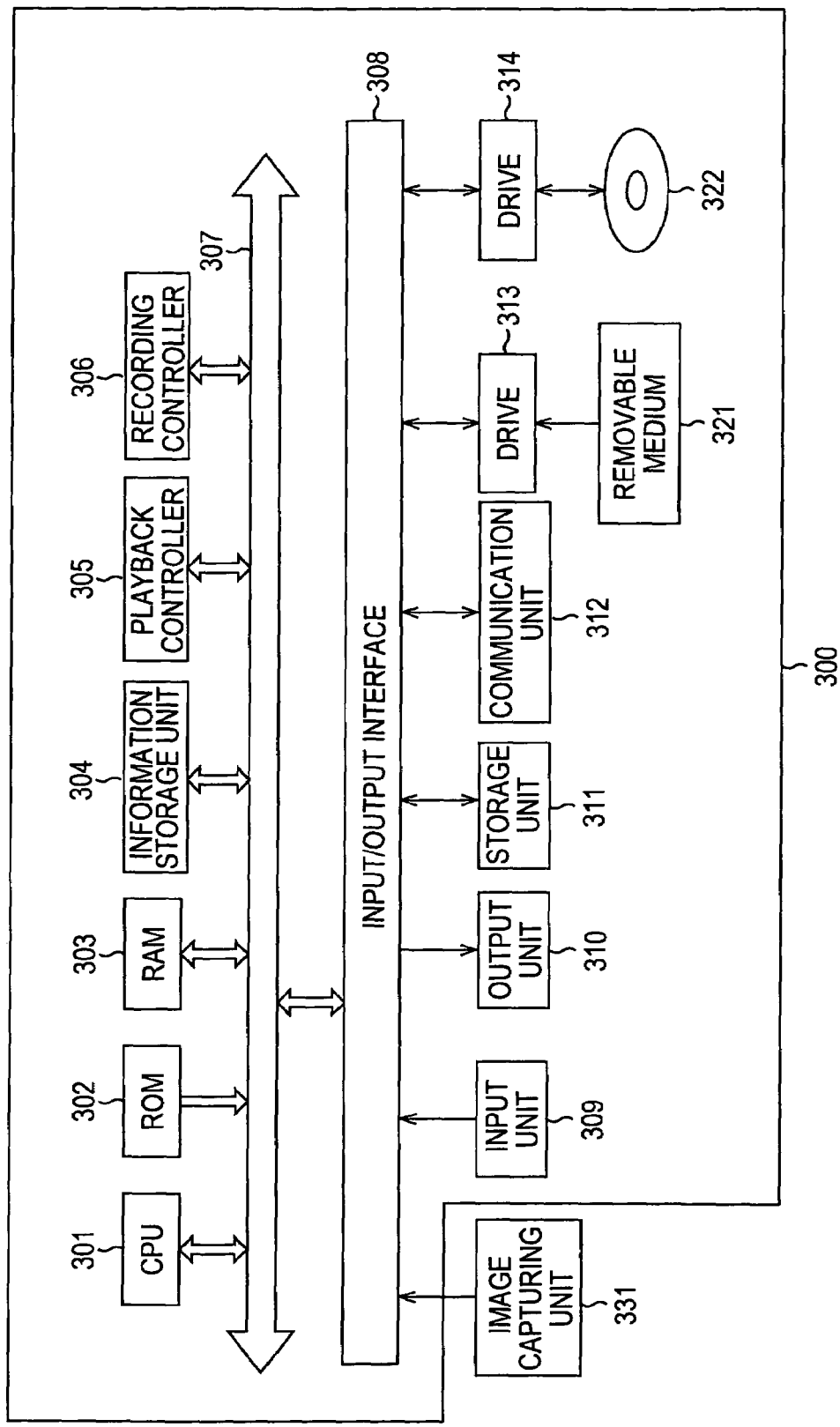
FIG. 23 is a block diagram illustrating an example of the configuration of a recording/playback apparatus to which the present invention is applied.

FIG. 23 is a block diagram illustrating an example of the configuration of a recording/playback apparatus to which the present invention is applied.

In FIG. 23, a CPU (Central Processing Unit) 301 of a recording/playback apparatus 300 executes various types of processing according to a program stored in a ROM (Read Only Memory) 302. Data and programs required for performing the processing by the CPU 301 are stored in a RAM (Random Access memory) 303.

An information storage unit 314, which is a storage device, for example, a semiconductor memory, for temporarily storing information, stores information concerning audio data or video data (hereinafter audio data, or video data, or low resolution data, for example, low-resolution video data or audio data, is also referred to as "material data") recorded on a disc 322, which is described below, and material data to be recorded on the disc 322. The information storage unit 314 also provides stored material data or information, or obtains new material data or information under the control of a playback controller 305 or a recording controller 306. The low resolution data has a resolution lower than that of the main data, for example, video data or audio data. Instead of the main data having a large amount of data, the low resolution data can be sent to an editor, and the editor can perform editing by using the low resolution data.

The playback controller 305 controls a drive 314 via a bus 307 and an input/output interface 308 to read various items of information from the disc 322 loaded in the drive 314. For example, the playback controller 305 controls the drive 314 to read information concerning the data recorded on the disc 322 and to supply the information to the information storage unit 304. A recording controller 306 controls the drive 314 via the bus 307 and the input/output interface 308 to write various items of information into the disc 322 loaded in the drive 314. For example, the recording controller 306 controls the drive 314 to record the data stored in the information storage unit 304 on the disc 322.

The CPU 301, the ROM 302, the RAM 303, the information storage unit 314, the playback controller 305, and the recording controller 306 are connected to each other via the bus 307. The input/output interface 308 is also connected to the bus 307.

An input unit 309 including a keyboard and a mouse is connected to the input/output interface 308, and outputs a signal input into the input unit 309 to the CPU 301. An output unit 310 including a display and a speaker is also connected to the input/output interface 308.

A storage unit 311 including a hard disk or an EEPROM (Electronically Erasable and Programmable Read Only Memory) and a communication unit 312 performing communication with other devices via a wired or wireless network are also connected to the input/output interface 308. A drive 313 is used for reading programs or data required for executing the programs or for writing data or programs from or into a removable medium 321, which is a recording medium, for example, a magnetic disk, an optical disc, or a semiconductor memory.

The drive 314 reads material data, for example, video data, audio data, or low resolution data from the disc 322 loaded in the drive 314, or writes material data into the disc 322 loaded in the drive 314.

The disc 322 is an optical disc that can record a large amount (for example, 27 gigabytes) of data with a recording density having a minimum mark length of 0.14 μm and a track pitch of 0.32 μm by using a blue-violet laser having a numerical aperture (NA) of 0.85 and a wavelength of 405 nm. The optical disc 322 may be another type of optical disc, for example, a DVD-RAM (Digital Versatile Disc-Random Access Memory), a DVD-R (DVD-Recordable), a DVD-RW (DVD-ReWritable), a DVD+R (DVD+Recordable), a DVD+RW (DVD+ReWritable), a CD-R (Compact Disc-Recordable), or a CD-RW (CD-ReWritable).

An image capturing unit 331 is also connected to the input/output interface 308, and material data, for example, video data or audio data, is supplied from the image capturing unit 331.

Figure 24:
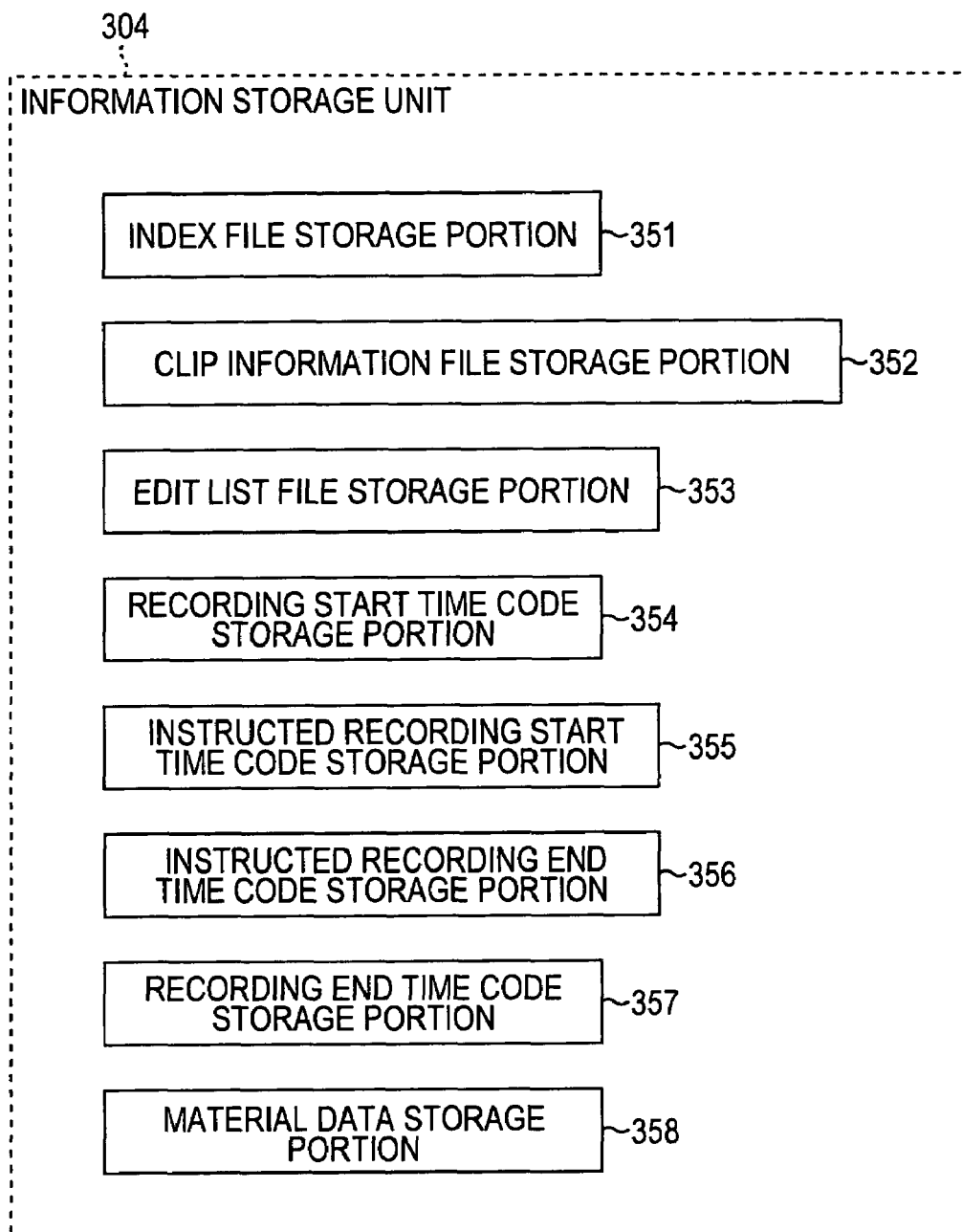
FIG. 24 is a block diagram illustrating an example of the detailed configuration of an information storage portion shown in FIG. 23.

FIG. 24 is a block diagram illustrating an example of the detailed configuration of the information storage unit 304 shown in FIG. 23. In FIG. 24, the information storage unit 304 includes an index file storage portion 351 for storing an index file that manages information recorded on the disc 322, a clip information file storage portion 352 for storing a clip information file that manages information recorded on the disc 322, an edit list file storage portion 353 for storing an edit list file that manages information recorded on the disc 322, a recording start time code storage portion 354 for storing a time code at the point when the recording of a clip on the disc 322 is started, an instructed recording start time code storage portion 355 for storing a time code when an instruction to record material data on the disc 322 is input, an instructed recording end time code storage portion 356 for storing a time code when an instruction to finish recording material data on the disc 322 is input, a recording end time code storage portion 357 for storing a time code at the point when the recording of material data on the disc 322 is finished, and a material data storage portion 358 for temporarily storing material data to be recorded on the disc 322. The material data storage portion 358 serves the function similar to that of the buffer memory 18 shown in FIG. 1. The information storage unit 304 may store information other than the above-described information.

Figure 25:
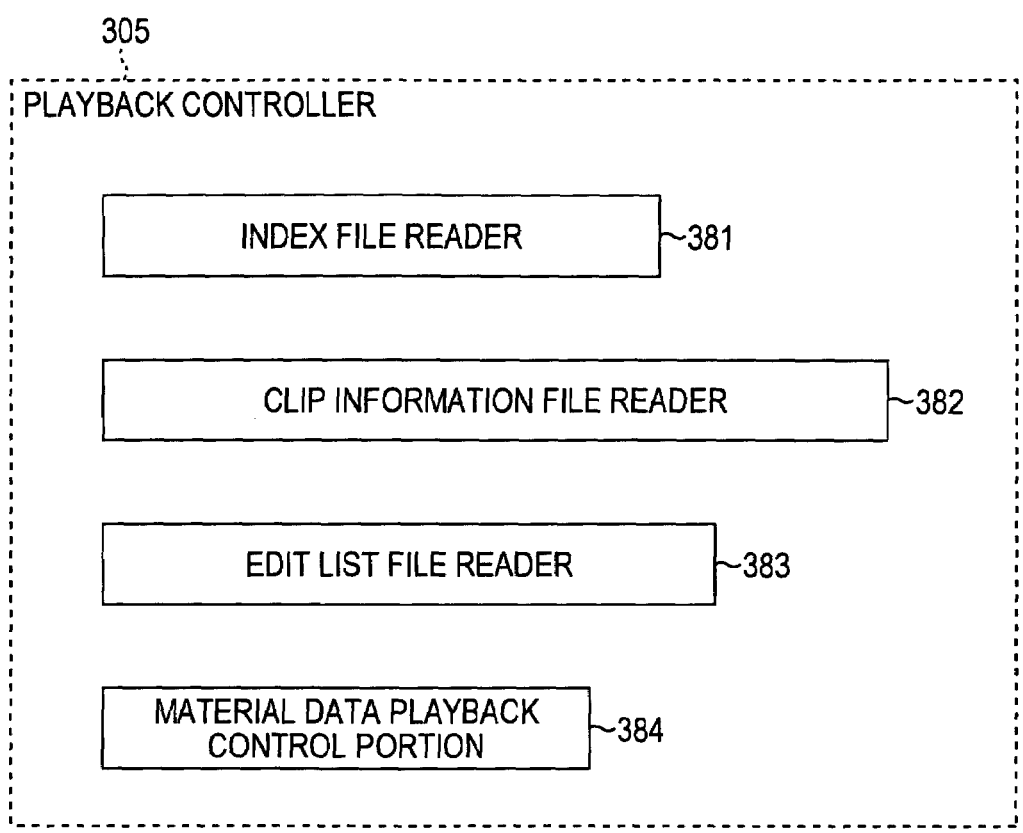
FIG. 25 is a block diagram illustrating an example of the detailed configuration of a playback controller shown in FIG. 23.

FIG. 25 is a block diagram illustrating an example of the detailed configuration of the playback controller 305 shown in FIG. 23. In FIG. 25, the playback controller 305 includes an index file reader 381 for reading an index file from the disc 322 loaded in the drive 314 and storing it in the index file storage portion 351 shown in FIG. 24, a clip information file reader 382 for reading the clip information file from the disc 322 loaded in the drive 314 and storing it in the clip information file storage portion 352 shown in FIG. 24, an edit list file reader 383 for reading an edit list file from the disc 322 loaded in the drive 314 and storing it in the edit list file storage portion 353 shown in FIG. 24, and a material data playback control portion 384 for reading material data from the disc 322 loaded in the drive 314 and playing it back. The playback controller 305 controls the drive 314 to read material data, for example, video data or audio data, from the disc 322 and to play it back by using the material data playback control portion 384. The playback controller 305 also reads data other than material data by using the index file reader 381, the clip information file reader 382, and the edit list file reader 383.

Figure 26:
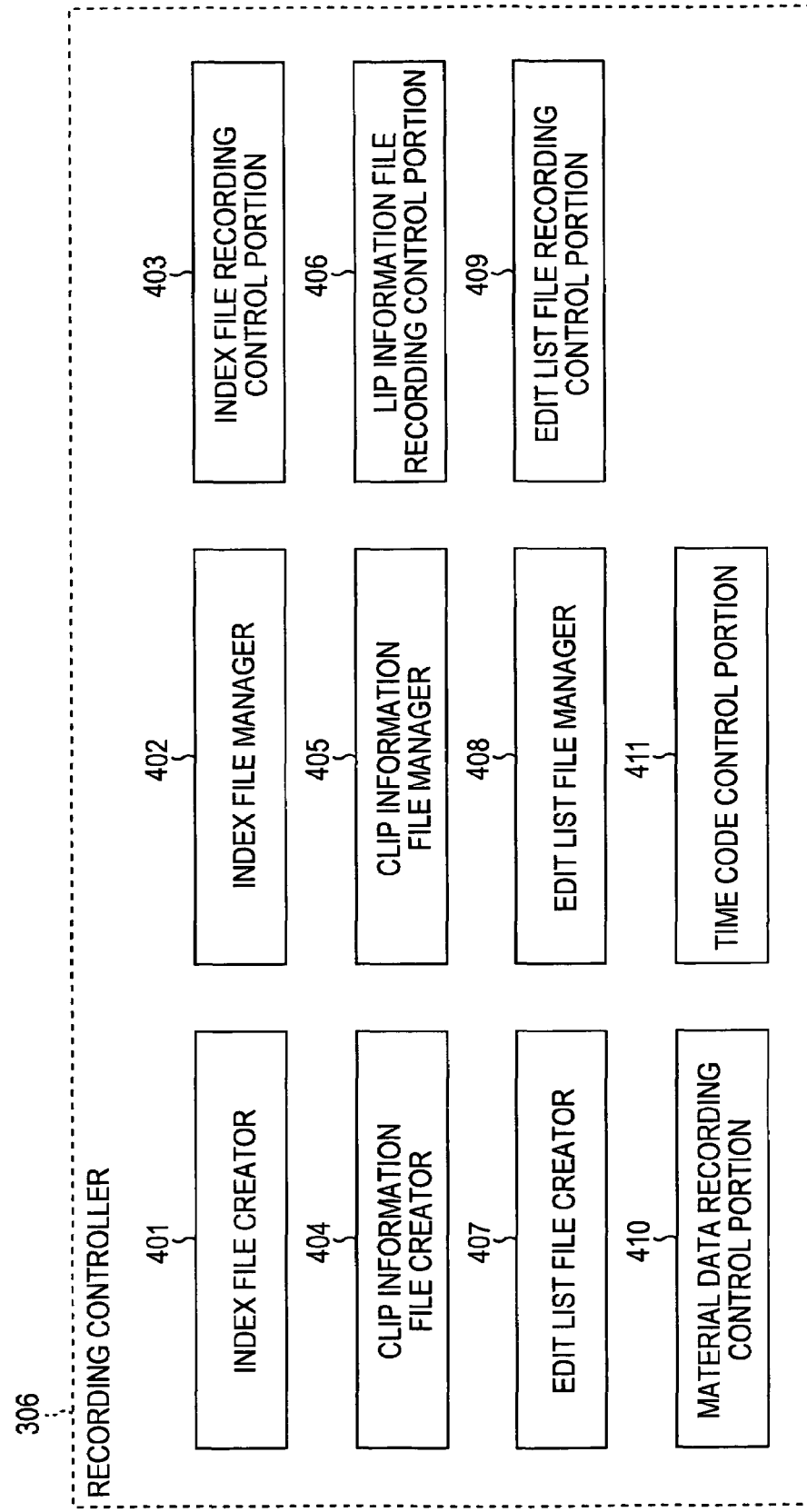
FIG. 26 is a block diagram illustrating an example of the detailed configuration of a recording controller shown in FIG. 23.

FIG. 26 is a block diagram illustrating an example of the detailed configuration of the recording controller 306 shown in FIG. 23. In FIG. 26, the recording controller 306 includes an index file creator 401 for creating an index file, an index file manager 402 for managing an index file stored in the index file storage portion 351, an index file recording control portion 403 for recording an index file stored in the index file storage portion 351 on the disc 322 loaded in the drive 314, a clip information file creator 404 for creating a clip information file and recording it on the clip information file storage portion 352, a clip information file manager 405 for managing a clip information file stored in the clip information file storage portion 352, a clip information file recording control portion 406 for recording a clip information file stored in the clip information file storage portion 352 on the disc 322 loaded in the drive 314, an edit list file creator 407 for creating an edit list file and storing it in the edit list file storage portion 353, an edit list file manager 408 for managing an edit list file stored in the edit list file storage portion 353, an edit list file recording control portion 409 for recording an edit list file stored in the edit list file storage portion 353 on the disc 322 loaded in the drive 314, a material data recording control portion 410 for temporarily storing material data, for example, video data, audio data, or low resolution data, in the material data storage portion 358 and for controlling the material data to be recorded on the disc 322, and a time code control portion 411 for, for example, generating a time code of material data to be recorded on the disc 322.

The recording controller 306 controls the drive 314 to record material data, for example, video data, audio data, or low resolution data, on the disc 322 loaded in the drive 314 by using the material data recording control portion 410. The recording controller 306 also creates an index file by using the index file creator 401, manages an index file stored in the index file storage portion 351 by using the index file manager 402, and records an index file stored in the index file storage portion 351 on the disc 322 via the drive 314 by using the index file recording control portion 403. The recording controller 306 also creates a clip information file by using the clip information file creator 404, manages a clip information file stored in the clip information file storage portion 352 by using the clip information file manager 404, and records a clip information file stored in the clip information file storage portion 352 on the disc 322 via the drive 314 by using the clip information file recording control portion 406. The recording controller 306 also creates an edit list file by using the edit list file creator 407, manages an edit list file stored in the edit list file storage portion 353 by using the edit list file manager 408, and records an edit list file stored in the edit list file storage portion 353 on the disc 322 via the drive 314 by using the edit list file recording control portion 409. The recording controller 306 also controls the time code control portion 411 to generate a time code.

The relationships between the functions of the individual elements described with reference to FIGS. 23 through 26 are described below with reference to the functional blocks of FIGS. 27 through 29.

Figure 27:
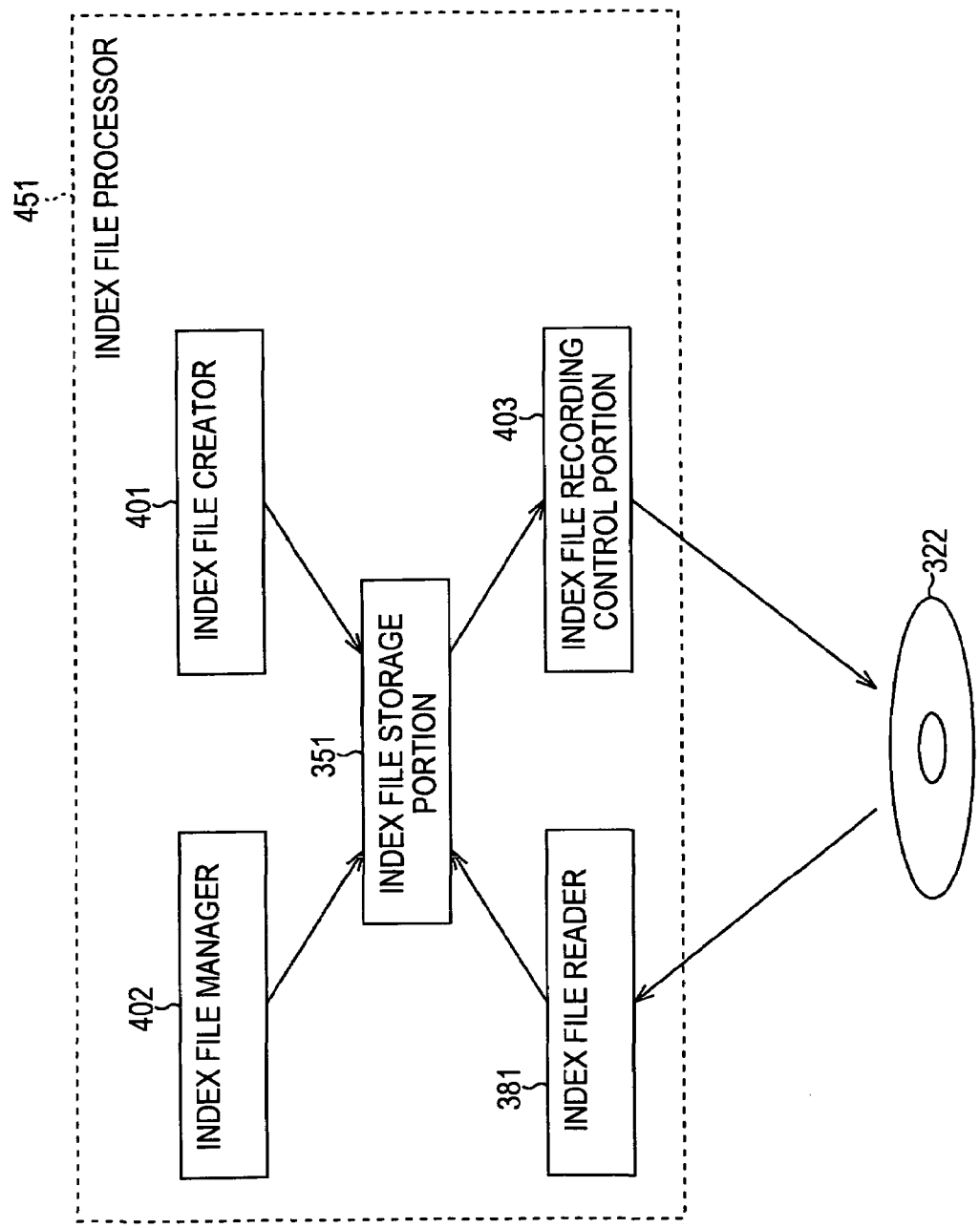
FIG. 27 is a functional block diagram illustrating an example of the configuration of an index file processor.

In FIG. 27, an index processor 451 for processing index files includes the index file storage portion 351, the index file reader 381, the index file creator 401, the index file manager 402, and the index file recording control portion 403.

The index processor 451 performs, for example, disc formatting to format the disc 322. When starting the disc formatting of the disc 322, the index file creator 401 creates an index file, which is management information concerning the files to be recorded on the disc 322. The created index file is supplied to the index file recording control portion 403 via the index file storage portion 351, and is recorded on the disc 322 loaded in the drive 314.

When the disc 322 on which material data, for example, video data, audio data, or low resolution data, is recorded is loaded in the drive 314, the index file reader 381 reads the index file from the disc 322 and stores it in the index file storage portion 351.

When clip edit list updating processing for updating video data, audio data, or low resolution data recorded on the disc 322 is performed, the index file manager 402 manages the index file stored in the index file storage portion 351 to update it according to the updating processing. The index file recording control portion 403 reads the updated index file from the index file storage portion 351, and records it on the disc 322.

Figure 28:
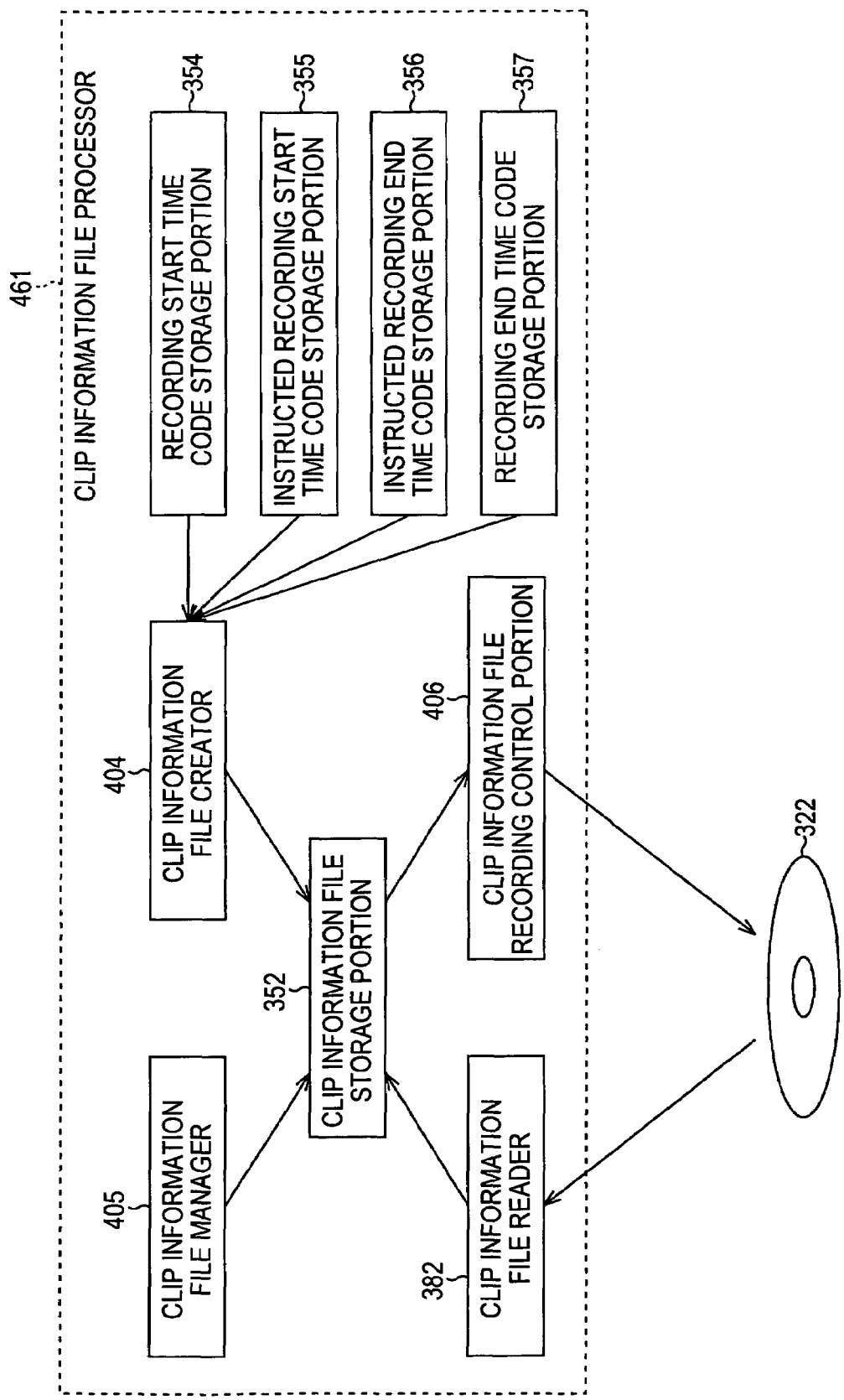
FIG. 28 is a functional block diagram illustrating an example of the configuration of a clip information file processor.

In FIG. 28, a clip information file processor 461 for processing clip information files includes the clip information file storage portion 352, the clip information file reader 382, the clip information file creator 404, the clip information file manager 405, the clip information file recording control portion 406, the recording start time code storage portion 354, the instructed recording start time code storage portion 355, the instructed recording end time code storage portion 356, and the recording end time code storage portion 357.

When material data, for example, video data or audio data, is recorded on the disc 322, the clip information file creator 404 creates a clip information file, which is management information concerning the files contained in one clip recorded on the disc 322, by using the time codes stored in the instructed recording start time code storage portion 355 and the instructed recording end time code storage portion 356. In this case, the time codes stored in the recording start time code storage portion 354 and the recording end time code storage portion 357 may also be used. The created clip information file is supplied to the index file recording control portion 406 via the clip information file storage portion 352, and is recorded on the disc 322 loaded in the drive 314.

When the disc 322 is loaded in the drive 314 of the recording/playback apparatus 300 or when power is supplied to the recording/playback apparatus 300 while the disc 322 is loaded in the drive 314, the clip information file reader 382 reads a clip information file recorded on the disc 322, and stores it in the clip information file storage portion 352.

When an extra portion of a clip is changed, the clip information file manager 405 manages a clip information file stored in the clip information file storage portion 352 to update it according to a change made in the extra portion. The clip information file recording control portion 406 reads the updated clip information file from the clip information file storage portion 352, and records it on the disc 322.

Figure 29:
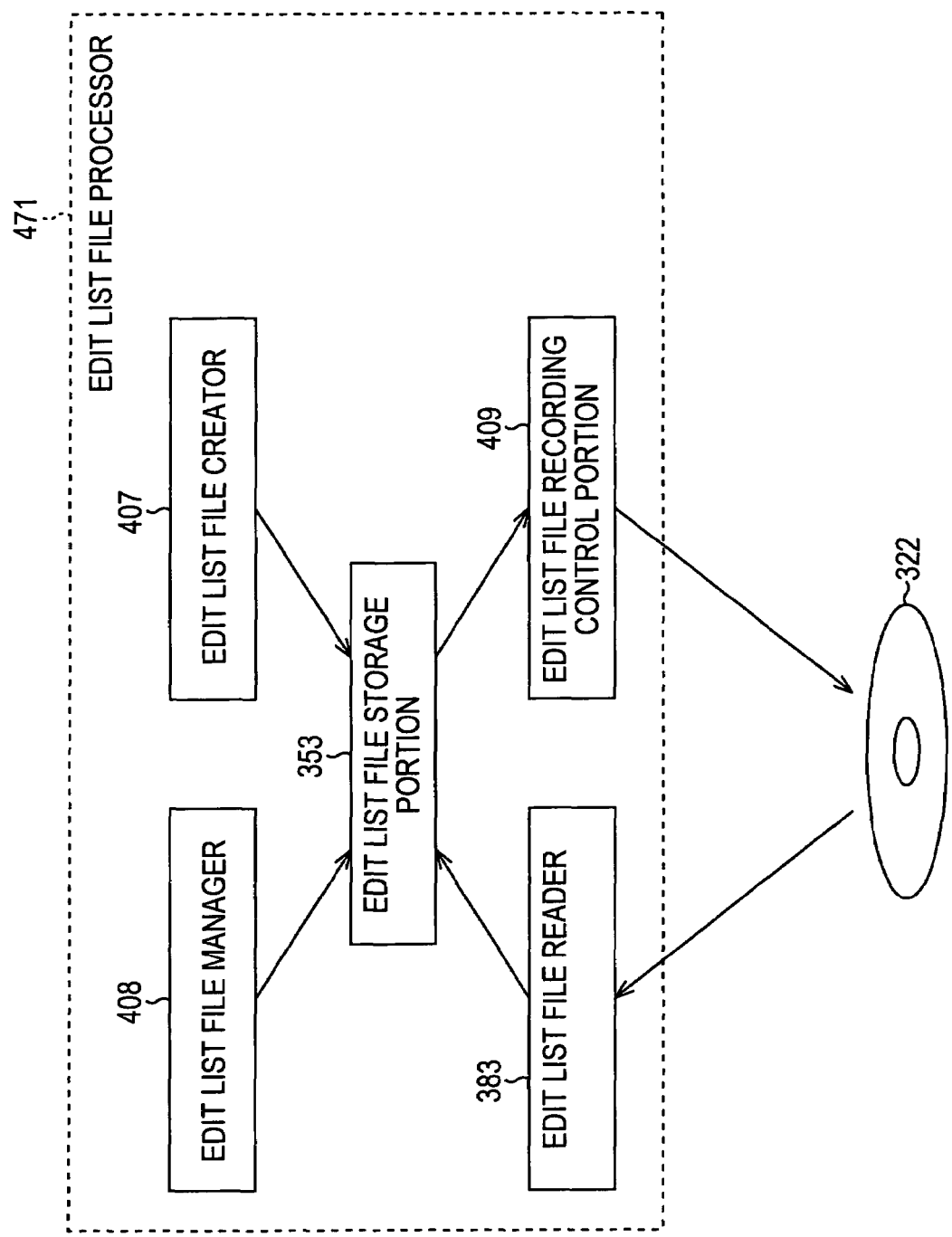
FIG. 29 is a functional block diagram illustrating an example of the configuration of an edit list file processor.

In FIG. 29, an edit list file processor 471 for processing edit list files includes the edit list file storage portion 353, the edit list file reader 383, the edit list file creator 407, the edit list file manager 408, and the edit list file recording control portion 409.

When, for example, editing processing for editing material data, is performed, the edit list file creator 407 creates an edit list file, which is management information concerning the editing result. The created edit list file is supplied to the edit list file recording control portion 409 via the edit list file storage portion 353, and is recorded on the disc 322 loaded in the drive 314.

When changing the editing result, the edit list file manager 408 manages the edit list file stored in the edit list file storage portion 353 to update it according to a change made in the editing result. Then, the edit list file recording control portion 409 reads the updated edit list file from the edit list file storage portion 353, and records it on the disc 322.

As described above, in response to an operation instruction, the elements related to the instruction perform processing in cooperation with each other so as to perform the specified instruction.

A specific flow of each of the above-described processes is as follows.

For example, in response to an instruction to perform format processing on the disc 322 loaded in the drive 314 by operating the input unit 309 by the user, the corresponding elements of the recording/playback apparatus 300 shown in FIG. 23 start format processing.

The disc format processing is described below with reference to the flowchart of FIG. 30.

In step S401, the recording controller 306 performs UDF (Universal Disc Format) processing on the disc 322 loaded in the drive 314 so as to execute UDF logical format processing. Then, the recording processor 306 proceeds to step S402. In step S402, the recording processor 306 creates a ProAV directory under the root directory based on the UDF in the disc 322, and records the directory on the disc 322. In step S403, the recording controller 306 creates a clip root directory containing files for material data, for example, video data, audio data, or low resolution data, and for information concerning the material data, under the ProAV directory, and records the clip root directory on the disc 322. In step S404, under the ProAV directory, the recording processor 306 creates an edit root directory containing editing results (editing information) obtained by non-destructive editing clips, which are file groups of the material data stored under the clip root directory, and records the edit root directory on the disc 322.

In step S405, the index file creator 401 of the recording controller 306 creates an index file by using XML (eXtensible Markup Language) and stores it in the index file storage portion 351. Then, the index file recording control portion 403 records the index file stored in the index file storage portion 351 on the disc 322, and the process proceeds to step S406.

In step S406, the recording controller 306 creates a disc information file for managing a playback history by using XML, and records it on the disc 322. The disc format processing is then completed.

FIGS. 31 through 34 illustrate a specific program of the index file. In FIGS. 31 through 34, the numbers at the head of the lines are added for the convenience of representation only, and are not part of the XML program.

Figure 30:
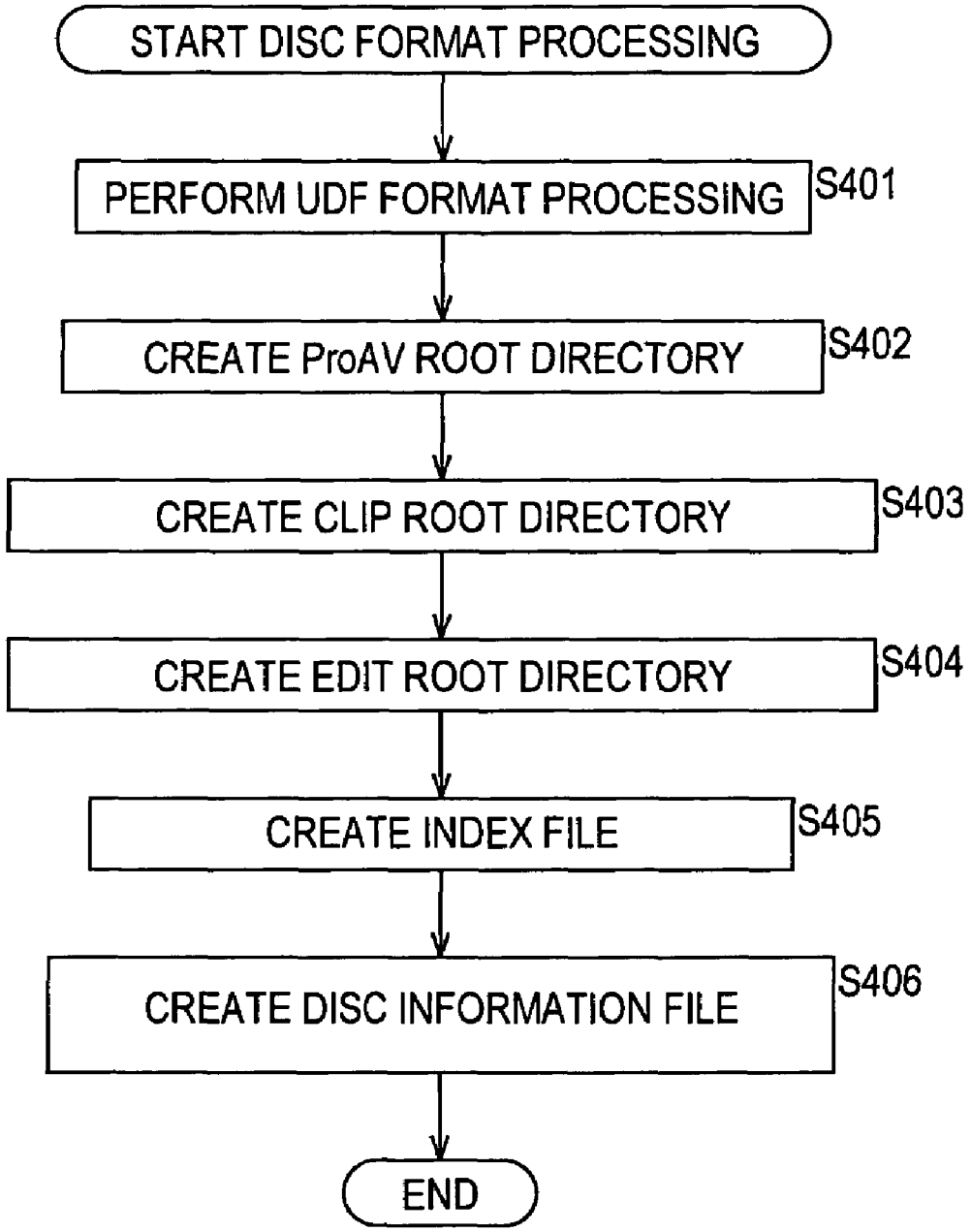
FIG. 30 is a flowchart illustrating disc format processing.

As stated above, the index file is a file for managing file information recorded on the disc 322, and more specifically, information concerning the files under the ProAV directory created in step S402 of FIG. 30. The file information is indicated from the start tag of the second line of FIG. 31 to the end tag of the 16th line of FIG. 34.

The clips stored under the clip root directory are indicated from the start tag of the fourth line of FIG. 31 to the end tag of the 24th line of FIG. 33 as a clip table. In this case, as shown in FIGS. 31 through 33, four clips are stored under the clip root directory: the first clip is indicated from the sixth line of FIG. 31 to the 23rd line of FIG. 31; the second clip is indicated from the 25th line of FIG. 31 to the 13th line of FIG. 32; the third clip is indicated from the 15th line of FIG. 32 to the third line of FIG. 33; and the fourth clip is indicated from the fifth line of FIG. 33 to the 23rd line of FIG. 33.

For example, in the sixth and seventh lines of FIG. 31, information concerning the overall first clip is indicated. In the eighth and ninth lines of FIG. 31, information concerning the video data of the first clip is indicated. In the tenth and eleventh lines of FIG. 31, information concerning audio data of each of the four channels is indicated.

In the 18th and 19th lines of FIG. 31, information concerning low resolution data (sub stream) of material data, for example, video data or audio data corresponding to the above-described main video data or audio data is indicated. In the 20th and 21st lines of FIG. 31, information concerning non-real-time meta data, which is meta data added to the clip, is indicated. In the 22nd line of FIG. 31, real-time meta data added to the video data of this clip in units of frames is indicated.

As in the above-described first clip, in the second, third, and fourth clips, information concerning each clip and information concerning files forming each clip are indicated, though an explanation thereof is not given.

In this manner, information concerning clips recorded on the disc 322 and information concerning files forming each clip are recorded on an index file as a clip table.

In the example of the index file shown in FIGS. 31 through 34, time codes for specifying the extra zones of each clip are not indicated. Accordingly, the extra zones cannot be specified even if the index file is checked.

The edit lists stored under the edit list root directory are indicated from the start tag of the 25th line of FIG. 33 to the end tag of the 15th line of FIG. 34 as an edit list table. In this case, as shown in FIGS. 33 and 34, four edit lists are stored under the edit list root directory: the first edit list is indicated from the 26th line of FIG. 33 to the first line of FIG. 34; the second edit list is indicated from the second line of FIG. 34 to the fifth line of FIG. 34; the third edit list is indicated from the sixth line of FIG. 34 to the ninth line of FIG. 34; and the fourth edit list is indicated from the tenth line of FIG. 34 to the 14th line of FIG. 34.

In this manner, information concerning the edit lists recorded on the disc 322 is recorded on the index file as an edit list table.

By executing the processing of step S405 of FIG. 30, an index file indicated in XML, such as that shown in FIGS. 31 through 34, is generated, and is recorded on the disc 322. When the processing of step S405 is executed, clips and edit lists are not yet recorded on the disc 322, and thus, information concerning the clips or edit lists shown in FIGS. 31 through 34 does not exist. After recording the clips and edit lists on the disc 322, the recording/playback apparatus 300 shown in FIG. 23 can read the index file from the disc 322 so as to obtain information concerning the clips and edit lists recorded on the disc 322.

A description is now given of a file system for managing data recorded on the disc 322 and the directory structure and files in the file system.

The data recorded on the disc 322 is managed by a file system, for example, UDF. The file system is not restricted to UDF, and may be any file system compatible with the recording/playback apparatus 300, for example, ISO9660 (International Organization for Standardization 9660). If a magnetic disk, for example, a hard disk, is used instead of the disc 322, FAT (File Allocation Tables), NTFS (New Technology File System), HFS (Hierarchical File System), or UFS (Unix (registered) System) may be used as a file system. Alternatively, a dedicated file system may be used.

Figure 35:
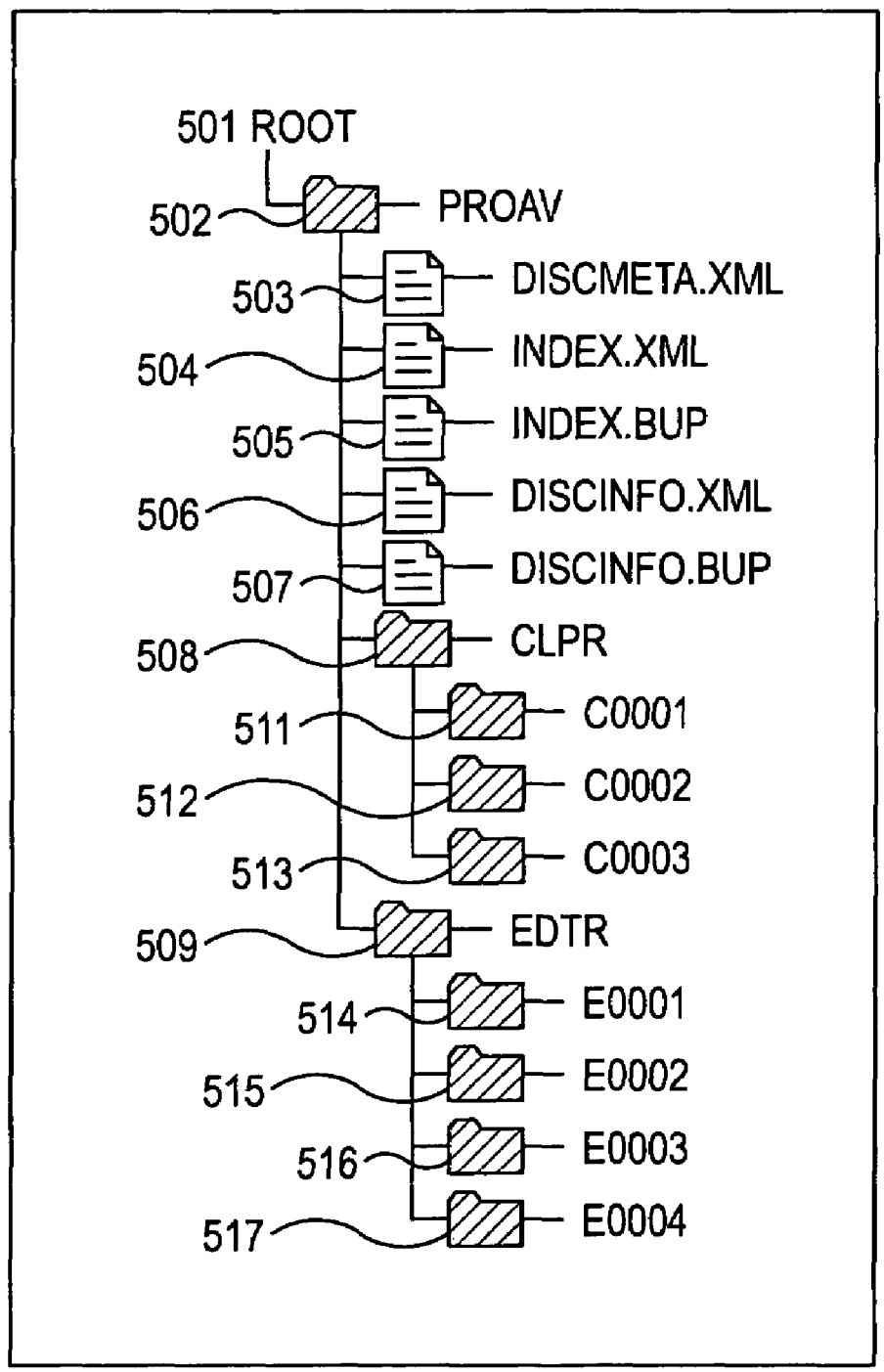
FIG. 35 illustrates an example of the directory structure in the disc shown in FIG. 23.
Figure 36:
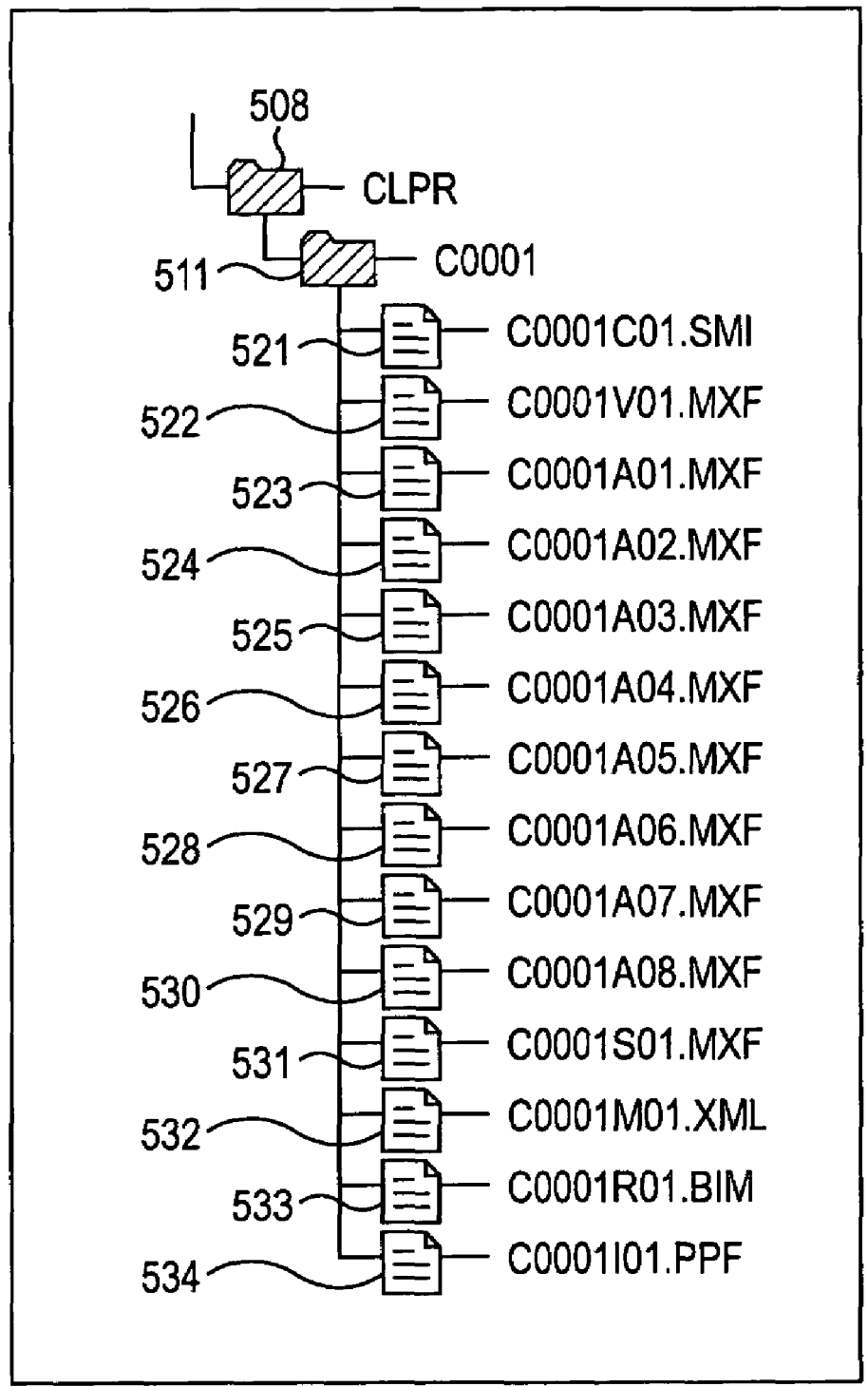
FIG. 36 illustrates an example of the detailed configuration of the directory structure shown in FIG. 35.
Figure 37:
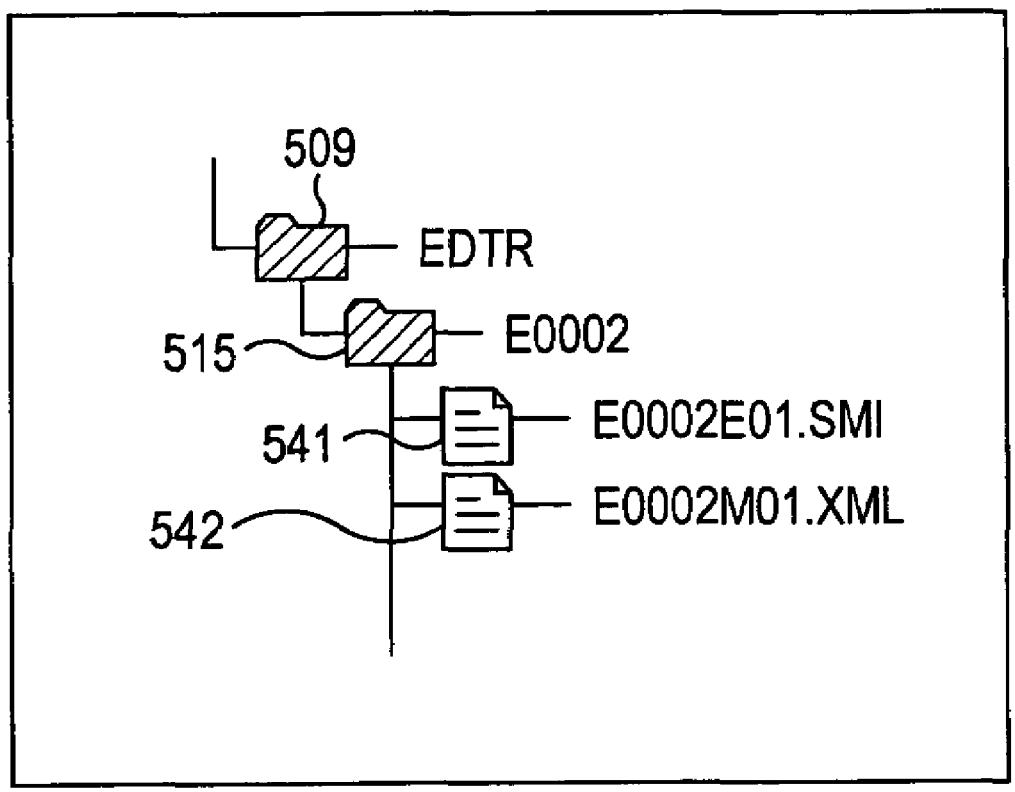
FIG. 37 illustrates an example of the detailed configuration of the directory structure shown in FIG. 35.

In this file system, the data recorded on the disc 322 is managed by the directory structure and the files shown in FIGS. 35 through 37.

In FIG. 35, a root directory (ROOT) 501 is provided with a PROAV directory 502 in which information concerning material data, for example, video data, audio data, or low resolution data, and edit lists indicating editing results of the material data are indicated in lower directories.

The PROAV directory 502 includes a disc meta file (DISCMETA.XML) 503, which is a file containing information concerning the titles and comments of all the material data recorded on the disc 322 and the paths of the video data corresponding to the typical frames of all the video data recorded on the disc 322, an index file (INDEX.XML) 504 containing management information for managing all the clips and edit lists recorded on the disc 322, and an index file (INDEX.BUP) 505. The index file 505 is a copy of the index file 504, and the two files are prepared to enhance the reliability.

The PROAV directory 502 also includes a disc information file (DISCINFO.XML) 506, which is meta data for all the data recorded on the disc 322, for example, a file containing information concerning a playback history, and a disc information file (DISCINFO.BUP) 507. The disc information file 507 is a copy of the disc information file 506, and the two files are prepared to enhance the reliability.

In addition to the above-described files, the PROAV directory 502 is also provided with a clip root directory (CLPR) 508 in which clip data are disposed in lower directories, and an edit list rooting directory (EDTR) 509 in which edit list data are disposed in lower directories.

In the clip root directory 508, the clip data for each clip recorded on the disc 322 is managed in a directory. In the example shown in FIG. 35, data concerning three clips are managed in a clip directory (C0001) 511, a clip directory (C0002) 512, and a clip directory (C0003) 513. That is, data of the first clip recorded on the disc 322 is managed as files of the lower directories of the clip directory 511, data of the second clip recorded on the disc 322 is managed as files of the lower directories of the clip directory 512, and data of the third clip recorded on the disc 322 is managed as files of the lower directories of the clip directory 513.

In the edit list root directory 509, an edit list recorded on the disc 322 corresponding to each editing operation is managed in a directory. In the example shown in FIG. 35, four edit lists are managed in an edit list directory (E0001) 514, an edit list directory (E0002) 515, an edit list directory (E0003) 516, and an edit list directory (E0004) 517. That is, the edit list indicating the first editing result of the clip recorded on the disc 322 is managed as a file of a lower directory of the edit list directory 514, the edit list indicating the second editing result is managed as files of the lower directories of the edit list directory 515, the edit list indicating the third editing result is managed as files of the lower directories of the edit list directory 516, and the edit list indicating the fourth editing result is managed as files of the lower directories of the edit list directory 517.

In the lower directories of the clip directory 511 provided for the above-described clip root directory 508, the clip data initially recorded on the disc 322 are disposed and managed as the files shown in FIG. 36.

In the example shown in FIG. 36, the clip directory 511 includes a clip information file (C0001C01.SMI) 521, which is a file for managing this clip, a video data file (C0001V01.MXF) 522, which is a file containing video data of this clip, audio data files (C0001A01.MXF through C0001A08.MXF) 523 through 530, which are eight files containing audio data of the corresponding channels of this clip, a low resolution data file (C0001S01.MXF) 531, which is a file containing sub stream data (low resolution data) of this clip, a non-real-time meta data file (C0001M01.XML) 532, which is a file containing non-real-time meta data, which is meta data which does not have to be processed in real time, corresponding to the material data of this clip, a real-time meta data file (C0001R01.BIM) 533, which is a file containing real-time meta data which must be processed in real time, and a picture pointer file (C0001I01.PPF) 534, which is a file indicating the frame structure of the video data file 222 (for example, information concerning the compression format of each picture, such as MPEG, or information concerning the offset address from the head of the file).

In the example shown in FIG. 36, the video data, low resolution data, and real-time meta data, which must be played back in real time, are each managed as one file so that the reading time is not increased.

The audio data must also be played back in real time, and to address multi-channeling of audio data, such as 7.1 channels, 8 channels are prepared and are managed as different files. Although in this example the audio data are managed as 8 files, they may be managed as 7 files or 9 or more files.

Similarly, the video data, low resolution data, and real-time meta data may be each managed as two or more files.

In FIG. 36, the non-real-time meta data which does not have to be processed in real time is managed as a file different from the files of the real-time meta data which must be processed in real time. The reason for this is to prevent meta data from being read while normal playback operation for, for example, video data, is performed. Accordingly, the playback processing time and load can be reduced.

The non-real-time meta data 532 is indicated in XML format for versatility, while the real-time meta data file 533 is a BIM format file compiled from an XML format file to reduce the playback processing time and load.

The example of the structure of the clip directory 511 shown in FIG. 36 can be used for all the clip directories of the corresponding clips recorded on the disc 322. That is, the file structure shown in FIG. 36 can be used for the other clip directories 512 and 513 shown in FIG. 35, though an explanation thereof is not given.

A description has been given of the files contained in the clip directories associated with one clip. However, the file structure is not restricted to the above-described example, and may be any format as long as a non-real time meta data file is disposed in a lower directory of each clip directory.

An example of the file structure of the lower directories of the edit list root directory 509 is described below. In the lower directories of the edit list directory 515 provided for the above-described edit list root directory 509, edit list data indicating information concerning the second editing result of the clip data recorded on the disc 322 is provided and managed as the files shown in FIG. 37.

In the example shown in FIG. 37, the edit list directory 515 includes an edit list file (E0002E01.SMI) 541, which is a file for managing this editing result (edit list) and an edit-list non-real-time meta data file (E0002M01.XML) 542, which is a file containing non-real-time meta data corresponding to the edited material data (extracted from the edited material data of all the clips) or non-real-time meta data generated from the previous non-real-time meta data.

The edit-list non-real-time meta data file 542 is a file containing new non-real-time meta data generated from the previous non-real-time meta data (non-real-time meta data file in a lower directory of the clip root directory 508) of the clip based on the editing result. The edit-list non-real-time meta data file 542 is indicated in XML format for versatility.

The example of the file structure of the edit list directory 515 shown in FIG. 37 can be used for all the edit lists (editing results). That is, the file structure shown in FIG. 37 can also be used for the other edit list directories 514, 516, and 517 shown in FIG. 35, though an explanation thereof is not given.

The files contained in the edit list directory corresponding to one editing operation have been described. However, the file structure is not restricted to the above-described example, and may be any format as long as an edit-list non-real-time meta data file corresponding to the editing operation is disposed in a lower directory of each edit list directory.

A description is now specifically given of the timing when an index file is updated.

Figure 38:
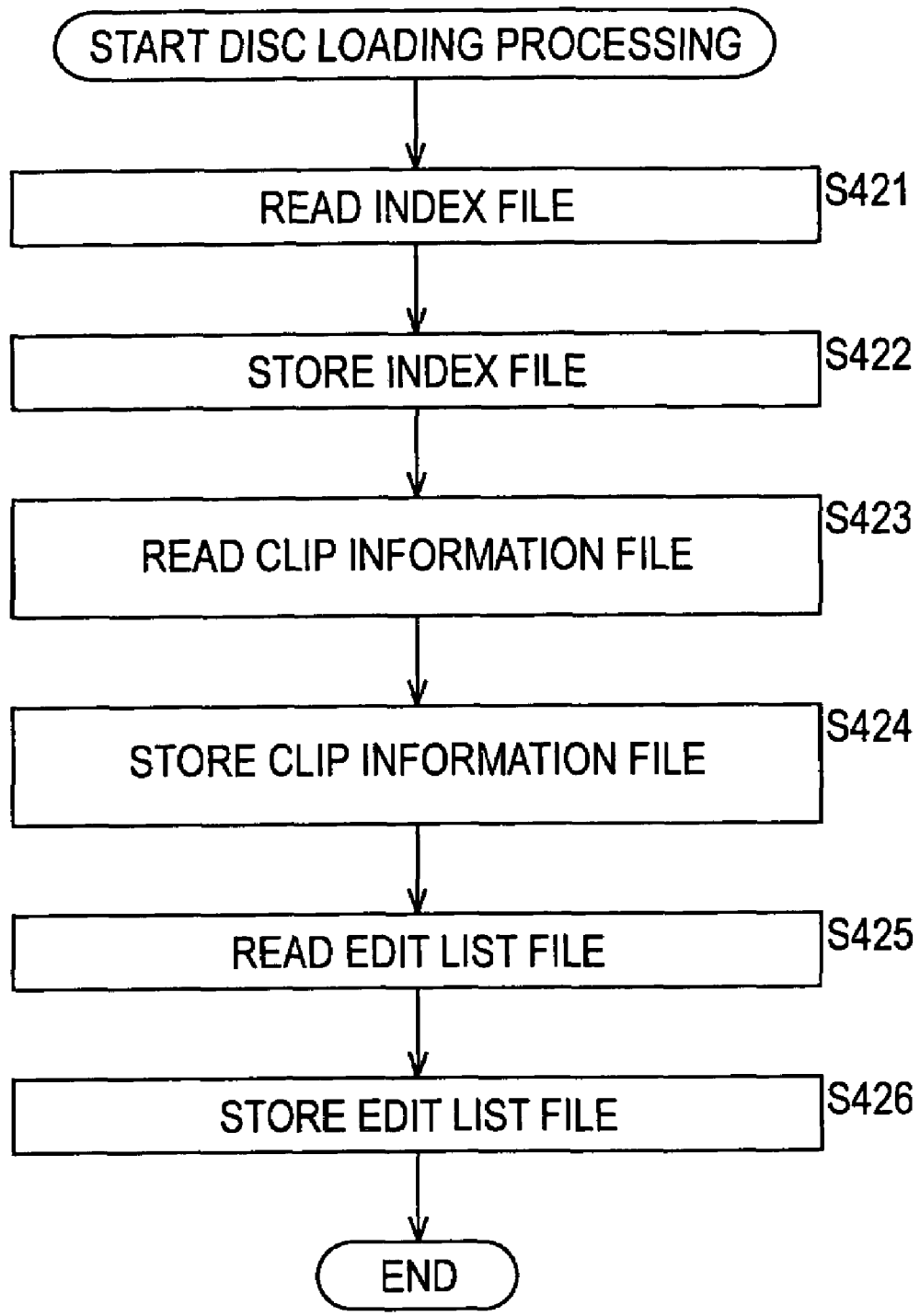
FIG. 38 is a flowchart illustrating disc loading processing.

As discussed above, an index file is updated when a clip or an edit list recorded on the disc 322 is updated. The disc 322 is first loaded in the drive 314 of the recording/playback apparatus 300 shown in FIG. 23 by the user. Upon detecting the disc 322 loaded in the drive 314, the recording/playback apparatus 300 performs processing indicated by the flowchart of FIG. 38 so as to expand the index file recorded on the disc 322 into the index file storage portion 351 and determine the structure of the clips and edit lists recorded on the disc 322.

The disc loading processing executed when the user loads the disc 322 into the drive 314 is described below.

The disc 322 is loaded in the drive 314 or power is supplied while the disc 322 is loaded in the drive 314. Then, in step S421, the index file reader 381 of the recording/playback apparatus 300 reads the index file from the disc 322 via the drive 314. Then, in step S422, the index file reader 381 supplies the read index file to the index file storage portion 351 and stores it therein. In step S423, the clip information file reader 382 reads a clip information file from the disc 322 via the drive 314. Then, in step S424, the clip information file reader 382 supplies the read clip information file to the clip information file storage portion 352 and stores it therein. If a clip information file is not recorded on the disc 322, steps S423 and S424 are skipped. In step S425, the edit list file reader 383 reads an edit list file from the disc 322 via the drive 314. Then, in step S426, the edit list file reader 383 supplies the read edit list file to the edit list file storage portion 353 and stores it therein. If an edit list file is not recorded on the disc 322, steps S425 and S426 are skipped. The disc loading processing is then completed. In this manner, management information for managing files, for example, material data, recorded on the disc 322 is read into the recording/playback apparatus 300.

Figure 39:
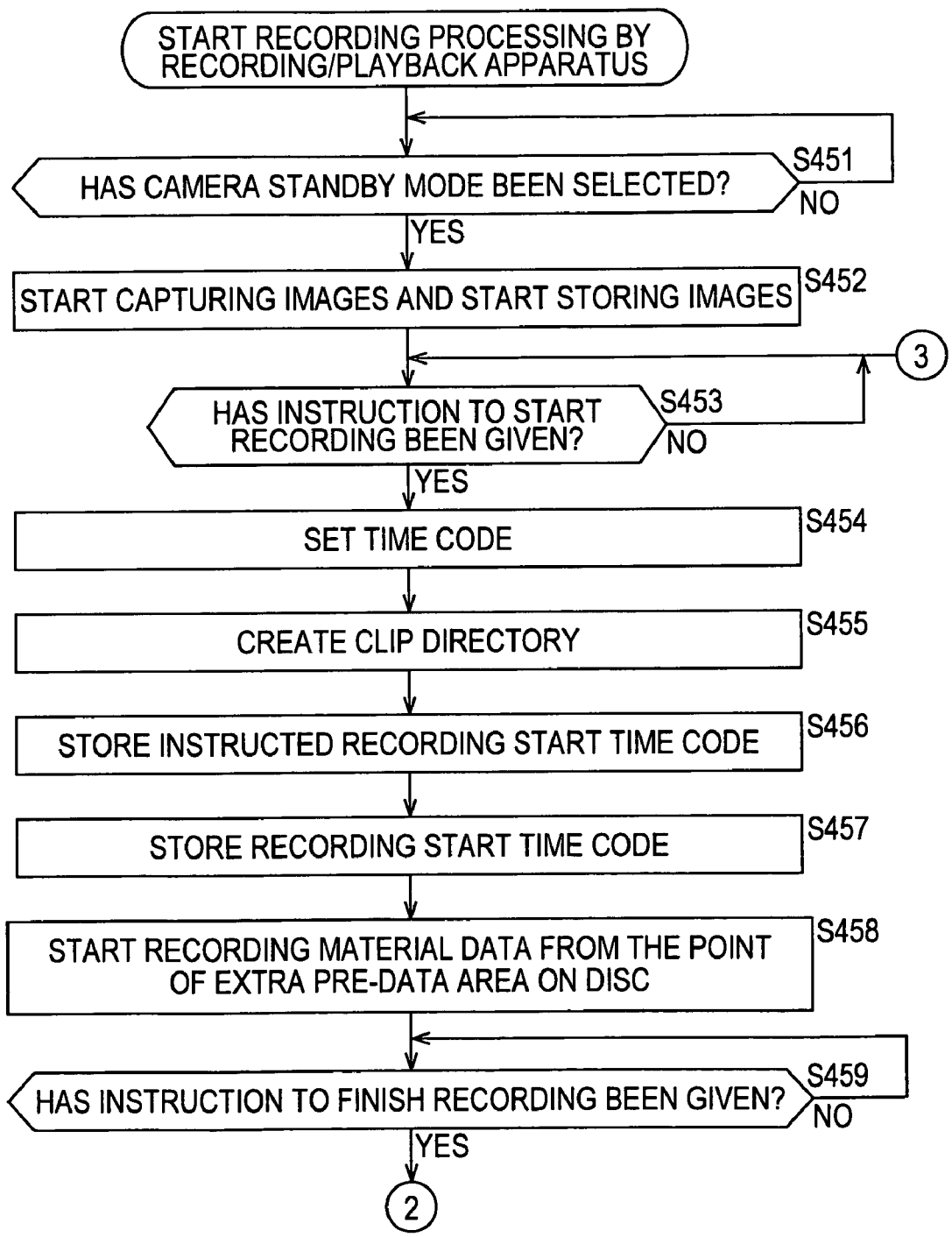
FIG. 39 is a flowchart illustrating recording processing.
Figure 40:
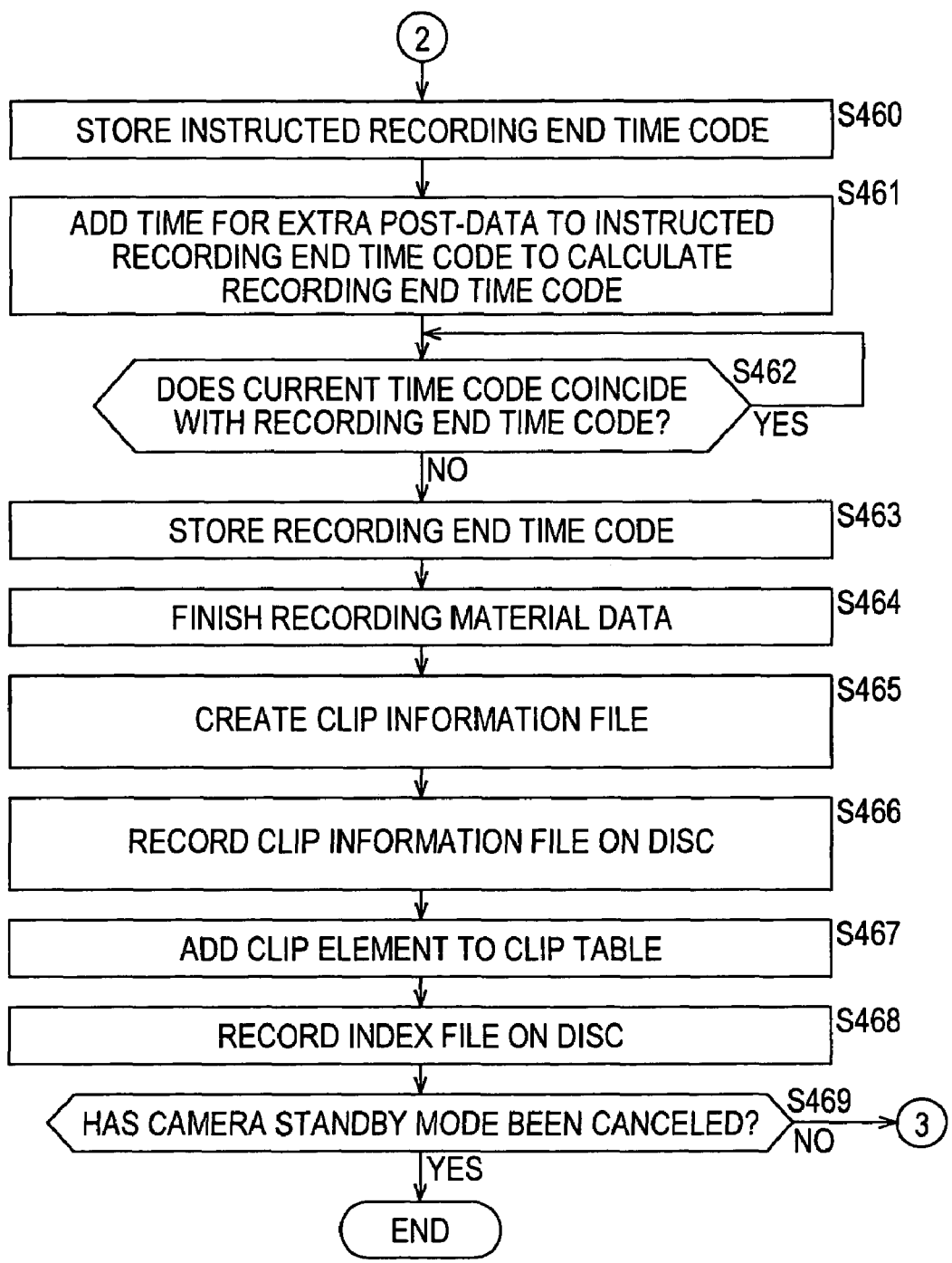
FIG. 40 is a flowchart continued from the flowchart of FIG. 39 illustrating the recording processing.

A description is now given, with reference to the flowcharts of FIGS. 39 and 40, of the recording processing performed by the recording/playback apparatus shown in FIG. 23, i.e., the processing for recording a clip on the disc 322.

In step S451, the material data recording control portion 410 determines whether an operation for selecting the camera standby mode has been input from the input unit 309, and waits until such an operation is input. When an operation for selecting the camera standby mode is input, the process proceeds to step S452.

In step S452, the material data recording control portion 410 requests the image capturing unit 331 to start capturing images of a subject and collecting sound via the input/output interface 308. In response to the request from the recording/playback apparatus 300, the image capturing unit 331 starts capturing images of the subject and collecting sound. The image capturing unit 331 sequentially outputs video data generated by capturing images, audio data generated by collecting sound, and low resolution data generated from the video data and audio data to the recording/playback apparatus 300. The material data recording control portion 410 temporarily stores the material data supplied from the image capturing unit 331 in the material data storage portion 358. As in the buffer memory 18 shown in FIG. 1, the material data storage portion 358 temporarily stores the supplied material data.

In step S453, the material data recording control portion 410 determines whether an instruction to record the material data on the disc 322 has been input from the input unit 309, and waits until such an instruction is input. When an instruction to record the material data on the disc 322 is given, the process proceeds to step S454.

In step S454, the time code control portion 411 sets time codes so that the time code of the head frame (head frame of an extra pre-data) of a clip to be recorded on the disc 322 becomes "00:00:00:00". For example, if the time length of the extra pre-data is set as one minute, the time code control portion 411 sets time codes so that the time code of the frame of the video data supplied from the image capturing unit 311 when an instruction to start recording is given (when the result of step S453 becomes YES) becomes "00:00:01:00". Thereafter, the time code control portion 411 generates time codes for frames supplied from the image capturing unit 311, such as "00:00:01:01", "00:00:01:02", "00:00:01:03", "00:00:01:04", and so on.

In step S455, the recording controller 306 creates a new clip directory under the clip root directory.

In step S456, the time code control portion 411 stores the time code supplied when the result of step S453 becomes YES in the instructed recording start time code storage portion 355. For example, as stated above, if the time length of the extra pre-data is set as one minute, the time code control portion 411 sets time codes so that the time code of the frame of the video data supplied from the image capturing unit 331 when an instruction to start recording is given (when the result of step S453 becomes YES) becomes "00:00:01:00".

Thus, the time code control portion 411 stores the time code "00:00:01:00" in the instructed recording start time code storage portion 355 as the instructed recording start time code.

In step S457, the time code control portion 411 stores the time code "00:00:00:00" of the head frame (head frame of extra pre-data) of a clip to be recorded on the disc 322 in the recording start time code storage portion 354.

In step S458, the material data recording control portion 410 reads material data stored in the material data storage portion 358 from the point of the extra pre-data from the material data storage portion 358, and starts recording the read material data on the disc 322 via the drive 314. From step S458 to step S464 of FIG. 40, the material data recording control portion 410 continues reading material data supplied from the image capturing unit 331 from the material data storage portion 358 and recording the read material data on the disc 322 via the drive 314.

The process then proceeds to step S459. In step S459, the material data recording control portion 410 determines whether an operation for giving an instruction to finish recording has been input from the input unit 309, and waits until such an operation is input. Meanwhile, the material data recording control portion 410 continues storing material data supplied from the image capturing unit 331 in the material data storage portion 358 and recording the material data stored in the material data storage portion 358 on the disc 322 via the drive 314.

If the material data recording control portion 410 determines in step S459 that an operation for giving an instruction to finish recording has been input, the process proceeds to step S460 of FIG. 40.

In step S460, the time code control portion 411 stores the time code generated when an instruction to finish recording is given (when the outcome of step S459 becomes YES) in the instructed recording end time code storage portion 356 as the instructed recording end time code.

In step S461, the time code control portion 411 adds a time length (for example, one minute) for the extra post-material data to the instructed recording end time code so as to calculate the recording end time code. For example, if the instructed recording end time code is "00:00:10:12", and if the time length of the extra post-data is set as one minute, the time code control portion 411 adds one minute to the instructed recording end time code "00:00:10:12" so as to calculate the recording end time code "00:00:11:12".

In step S462, the time code control portion 411 determines whether the generated time code coincides with the recording end time code calculated in step S461, and waits until the two time codes become equal to each other. When the generated time code coincides with the recording end time code calculated in step S461, the process proceeds to step S463.

In step S463, the time code control portion 411 stores the recording end time code in the recording end time code storage portion 357.

In step S464, the material data recording control portion 410 finishes reading material data from the material data storage portion 358 and recording the read material data on the disc 322.

In step S465, the clip information file creator 404 reads the instructed recording start time code stored in the instructed recording start time code storage portion 355 and the instructed recording end time code stored in the instructed recording end time code storage portion 356 so as to create a clip information file containing information concerning such time codes, and stores the clip information file in the clip information file storage portion 352. The clip information file may contain the recording start time code stored in the recording start time code storage portion 354 and the recording end time code stored in the recording end time code storage portion 357.

In step S466, the clip information file recording control portion 406 records the clip information file created in step S465 and stored in the clip information file storage portion 352 on the disc 322 via the drive 314.

In step S467, the index file manager 402 of the recording controller 306 adds information concerning the added clip (hereinafter referred to as a "clip element") to the clip table of the index file stored in the index file storage portion 351.

In this manner, in order to reflect the addition of a clip, the clip table of the index file stored in the index file storage portion 351 is updated. Then, in step S468, the index file recording control portion 403 records the updated index file stored in the index file storage portion 351 on the disc 322 by overwriting the previous index file.

In step S469, the material data recording control portion 410 determines whether an operation for canceling the camera standby mode has been input from the input unit 309. If such an operation is not input, the process returns to step S453 of FIG. 39, and repeats step S453 and the subsequent steps. If the material data recording control portion 410 determines in step S469 that an operation for canceling the camera standby mode is input, the recording processing is completed.

The recording processing performed by the recording/playback apparatus 300 has been discussed above.

In the processing of FIGS. 39 and 40, material data for a predetermined time period after an instruction to finish recording is given is recorded on the disc 322 as the extra post-material data. Alternatively, a predetermined amount of material data (hereinafter referred to as "data amount A") stored in the material data storage portion 358 after an instruction to finish recording is input may be recorded on the disc 322 as the extra post-material data. In this case, the user can set the data amount A as desired within the storage capacity of the material data storage portion 358.

In the processing of FIGS. 39 and 40, material data for a predetermined time period before an instruction to start recording is input is recorded on the disc 322 as the extra pre-material data. Alternatively, a predetermined amount of material data (hereinafter referred to as "data amount B") stored in the material data storage portion 358 before an instruction to start recording is input may be recorded on the disc 322. In this case, the user can set the data amount B as desired within the storage capacity of the material data storage portion 358.

The time length of material data recorded on the disc 322 as extra pre-material data can be set by the user within the time that can be stored in the material data storage portion 358. In contrast, the time length of material data recorded on the disc 322 as extra post-material data can be set by the user regardless of the time that can be stored in the material data storage portion 358 (the time length of material data recorded as extra post-material data may be longer than the time that can be stored in the material data storage portion 358). The time length of material data recorded on the disc 322 as extra pre-material data is longer as the storage capacity of the material data storage portion 358 is larger.

A specific example of an XML program of the clip information file created in step S465 of FIG. 40 is shown in FIG. 41.

In the third line of FIG. 41, UMID (Unique Material Identifier), which is an identifier for identifying the clip, is indicated. More specifically, in 'umid="0D12130000000000001044444484EEEE00E0188E130B' in the third line, '0D12130000000000001044444484EEEE00E0188E130B' indicates the UMID. In the fourth line of FIG. 41, the frame rate 'fps="59.94i"', the recording duration 'dur="1200"', the number of channels 'ch="2"' of the audio data file, and the aspect ratio 'aspectRatio="4:3"' of the video data are indicated. The recording duration is represented by the number of frames of the video data file. That is, in the example of the program shown in FIG. 41, the recording duration of the video data is 1200 frames. Since the frame rate is 59.94i, 1200 frames are equivalent to 40 seconds. In the example of the program shown in FIG. 41, the recording/playback apparatus 300 shown in FIG. 23 sets the time code of the head frame of the video data file contained in the clip to be "00:00:00:00". More specifically, in the 11th, 14th, and 17th lines, which are described below, "-" is indicated, which means that the time code of the head frame of the video data file contained in the clip is set to be "00:00:00:00". According to the recording duration 'dur="1200"', the time code of the final frame of the video data file contained in the clip can be specified as "00:00:40:00". That is, in the clip information file shown in FIG. 41, information for specifying the head frame, the playback start frame, the playback end frame, and the final frame of the clip is substantially indicated.

Instead of the recording duration, the time code of the final frame (recording end time code) may be indicated. In the example of the program shown in FIG. 41, the recording/playback apparatus 300 shown in FIG. 23 sets the time code of the head frame (recording start time code) to be "00:00:00:00". If the time code of the head frame is not set to be "00:00:00:00", the time code of the head frame (recording start time code) and the time code of the final frame (recording end time code) of the video data contained in the clip may be recorded in the clip information file.

From the fifth line to the 22nd line of FIG. 41, the body portion is indicated. The header is not indicated in the program shown in FIG. 41.

From the tenth line to the twelfth line of FIG. 41, information concerning the video data file is indicated. More specifically, in the tenth line of FIG. 41, the urn (Uniform Resource Name) of the video data file is represented by the UMID '0D12130000000000001044444484EEEE00E0188E130B'. In the eleventh line of FIG. 41, the compression method "IMX50" of the video data file is indicated, and "-" is indicated, which means that the time code of the head frame of the video data file contained in the clip is set to be "00:00:00:00". In the twelfth line of FIG. 41, the instructed recording start time code and the instructed recording end time code 'clipBegin="smpte-30=00:00:10:00" clipEnd="smpte-30=00:00:30:00' are indicated. More specifically, the 'clipBegin' indicates that the instructed recording start time code is to be described, and "00:00:10:00" after 'clipBegin' indicates the instructed recording start time code. The 'clipEnd' indicates that the instructed recording end time code is to be described, and "00:00:30:00" indicates the instructed recording end time code.

From the 13th line to the 15th line of FIG. 41, information concerning the audio data file of channel 1 is indicated, and from the 16th line to the 18th line of FIG. 41, information concerning the audio data file of channel 2 is indicated. More specifically, in the 13th line of FIG. 41, the urn of the audio data file of channel 1 is represented by the UMID '0D12130000000000001044444484EEEE00E0188E130B'. In the 14th line of FIG. 41, the coding method "LPCM16" of the audio data file of channel 1, the channel "CH1", and "-", which means that the time code of the head frame of the video data file contained in the clip is set to be "00:00:00:00", are indicated. In the 15th line of FIG. 41, the instructed recording start time code and the instructed recording end time code 'clipBegin="smpte-30=00:00:10:00" clipEnd="smpte-30=00:00:30:00' are indicated. More specifically, the 'clipBegin' indicates that the instructed recording start time code is to be described, and "00:00:10:00" after 'clipBegin' indicates the instructed recording start time code. The 'clipEnd' indicates that the instructed recording end time code is to be described, and "00:00:30:00" after 'clipEnd' indicates the instructed recording end time code.

In the 16th line of FIG. 41, the urn of the audio data file of channel 2 is represented by the UMID '0D1213000000000001044444484EEEE00E0188E130B'. In the 17th line of FIG. 41, the coding method "LPCM16" of the audio data file of channel 2, the channel "CH2", and "-", which means that the time code of the head frame of the video data file contained in the clip is set to be "00:00:00:00", are indicated. In the 18th line of FIG. 41, the instructed recording start time code and the instructed recording end time code 'clipBegin="smpte-30=00:00:10:00" clipEnd="smpte-30=00:00:30:00' are indicated. More specifically, the 'clipBegin' indicates that the instructed recording start time code is to be described, and "00:00:10:00" after 'clipBegin' indicates the instructed recording start time code. The 'clipEnd' indicates that the instructed recording end time code is to be described, and "00:00:30:00" indicates the instructed recording end time code.

The instructed recording start time code (clipBegin) of the video data file, the instructed recording start time code (clipBegin) of the audio data file of channel 1, and the instructed recording start time code (clipBegin) of the audio data file of channel 2 are the same time code. The instructed recording end time code (clipEnd) of the video data file, the instructed recording end time code (clipEnd) of the audio data file of channel 1, and the instructed recording end time code (clipEnd) of the audio data file of channel 2 are the same time code.

Figure 42:
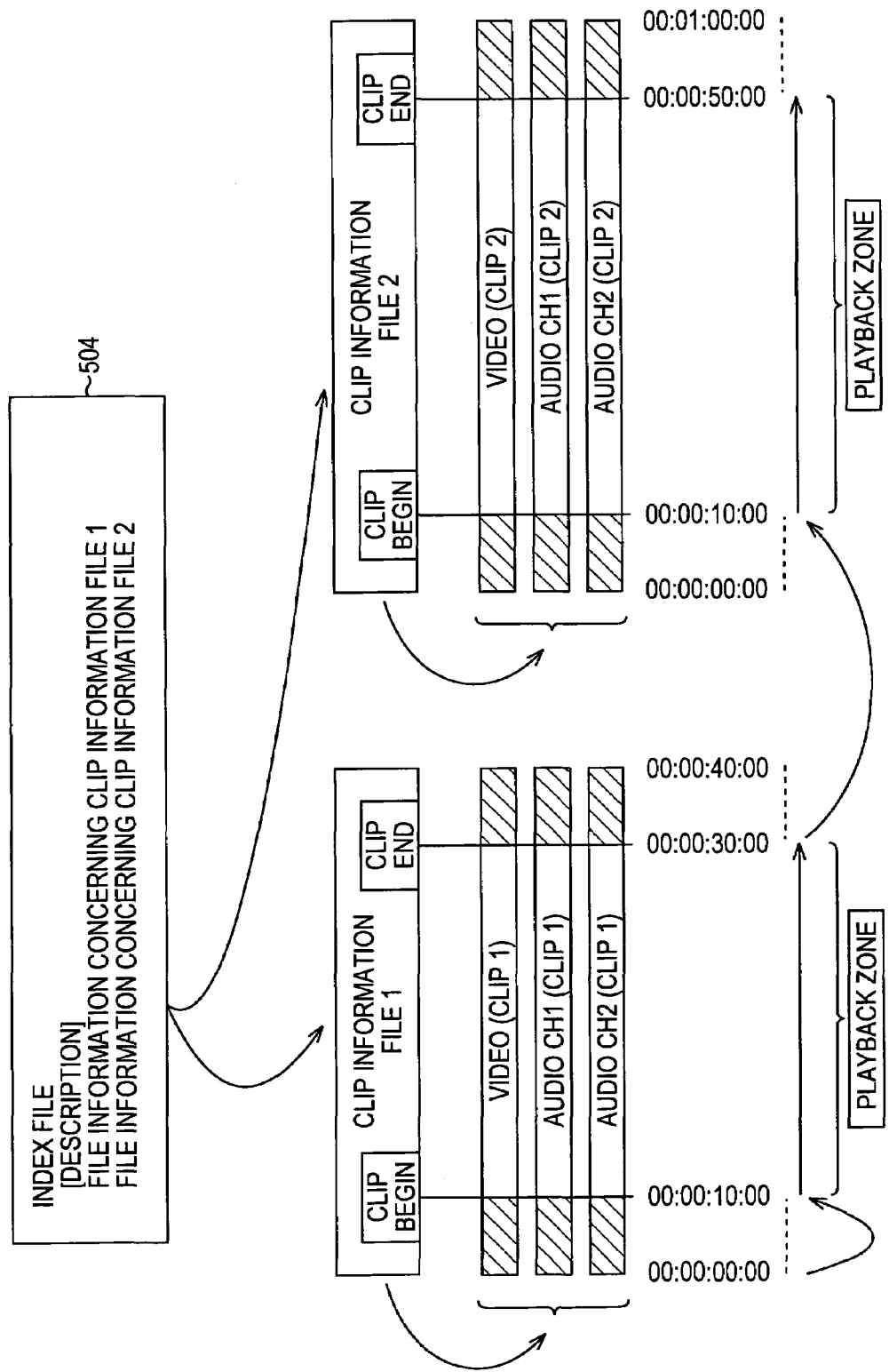
FIG. 42 illustrates playback zones of clips.

When the clip is played back based on the clip information file indicated by the program shown in FIG. 41, the interval between the instructed recording start time code "00:00:10:00" and the instructed recording end time code "00:00:30:00" of the clip is the playback zone, as indicated at the left side of FIG. 42.

In the index file 504 shown at the top side of FIG. 42, file information concerning the clip information file 1 and file information concerning the clip information file 2 are indicated.

In the clip information file 1 shown at the left side of FIG. 42, the instructed recording start time code is indicated as the clip begin, and the instructed recording time end code is indicated as the clip end. When the corresponding clip (hereinafter referred to as "clip 1") is played back based on the clip information file 1, the interval between the clip begin and the clip end is the playback zone, as indicated below the clip information file 1 shown in FIG. 42, and the data only in the playback zone is played back. Accordingly, the extra pre-material data indicated by the hatched portion between the time codes "00:00:00:00" and "00:00:10:00" and the extra post-material data indicated by the hatched portion between the time codes "00:00:30:00" and "00:00:40:00" are not played back. Thus, the clip begin is the instructed recording start time code (the time code when an instruction to start recording is given) and is also the playback start time code (the time code at the playback start point). The clip end is the instructed recording end time code (the time code when an instruction to finish recording is given) and is also the playback end time code (the time code at the playback end point).

As in the clip information file 1, in the clip information file 2 shown at the right side of FIG. 42, the instructed recording start time code (playback start time code) is indicated as the clip begin, and the instructed recording end time code (playback end time code) is indicated as the clip end. When the clip (hereinafter referred to as "clip 2") is played back based on the clip information file 2, the interval between the clip begin and the clip end is the playback zone, as indicated below the clip information file 2 shown in FIG. 42, and the data only in the playback zone is played back. Accordingly, the extra pre-material data indicated by the hatched portion between the time codes "00:00:00:00" and "00:00:10:00" and the extra post-material data indicated by the hatched portion between the time codes "00:00:50:00" and "00:01:00:00" are not played back.

If, for example, clip 1 is recorded on the disc 322 by the first recording operation, and clip 2 is subsequently recorded on the disc 322 by the second recording operation, material data can be played back in the recording order as if material data recorded on a tape-like recording medium were played back. The processing for playing back material data in the recording order as material data recorded on a tape-like recording medium is played back is referred to as "tape-like playback processing". When performing the tape-like playback processing as in the above-described processing, the extra pre-material data and the extra post-material data of clip 1 and the extra pre-material data and the extra post-material data of clip 2 can be prevented from being played back.

When the time code at the clip begin or the clip end indicated in the clip information file is changed, the extra pre-material data or the extra post-material data can be played back. The processing for changing an extra portion of a clip is described below with reference to the flowchart of FIG. 43. The clip information file of a clip whose extra portion is to be changed has been read from the disc 322 and stored in the clip information file storage portion 352 by the clip information file reader 382 during the disc loading processing.

In step S501, the clip information file manager 405 receives the input of an operation for changing an extra portion from the input unit 309. For example, in the clip information file indicated by the program shown in FIG. 41, the clip begin (playback start time code) is "00:00:10:00", and the clip end (playback end time code) is "00:00:30:00". In step S501, the input of an operation for changing the clip begin (playback start time code) to, for example, "00:00:05:00" is received.

In step S502, the clip information file manager 405 creates a clip information file based on the input received in step S501, and stores the clip information file in the clip information file storage portion 352. In this case, the clip information file stored in the clip information file storage portion 352 can be updated by overwriting the previous clip information file by the new clip information file. If, for example, the input of an operation for changing the clip begin (playback start time code) of the clip information file indicated by the program shown in FIG. 41 from "00:00:10:00" to "00:00:05:00" is received in step S501, the clip information file, such as that shown in FIG. 44, is created in step S502. In the example shown in FIG. 44, the time code at the clip begin "00:00:10:00" indicated in the 12th, 15th, and 18th lines of FIG. 41 is changed to "00:00:05:00". The other portions of the program shown in FIG. 44 are similar to those of FIG. 41.

In step S503, the clip information file recording control portion 406 records the clip information file created in step S502 and stored in the clip information file storage portion 352 on the disc 322 via the drive 314. The clip information file recording control portion 406 overwrites the previous clip information file of the same clip recorded on the disc 322 by the clip information file created in step S502.

Figure 45:
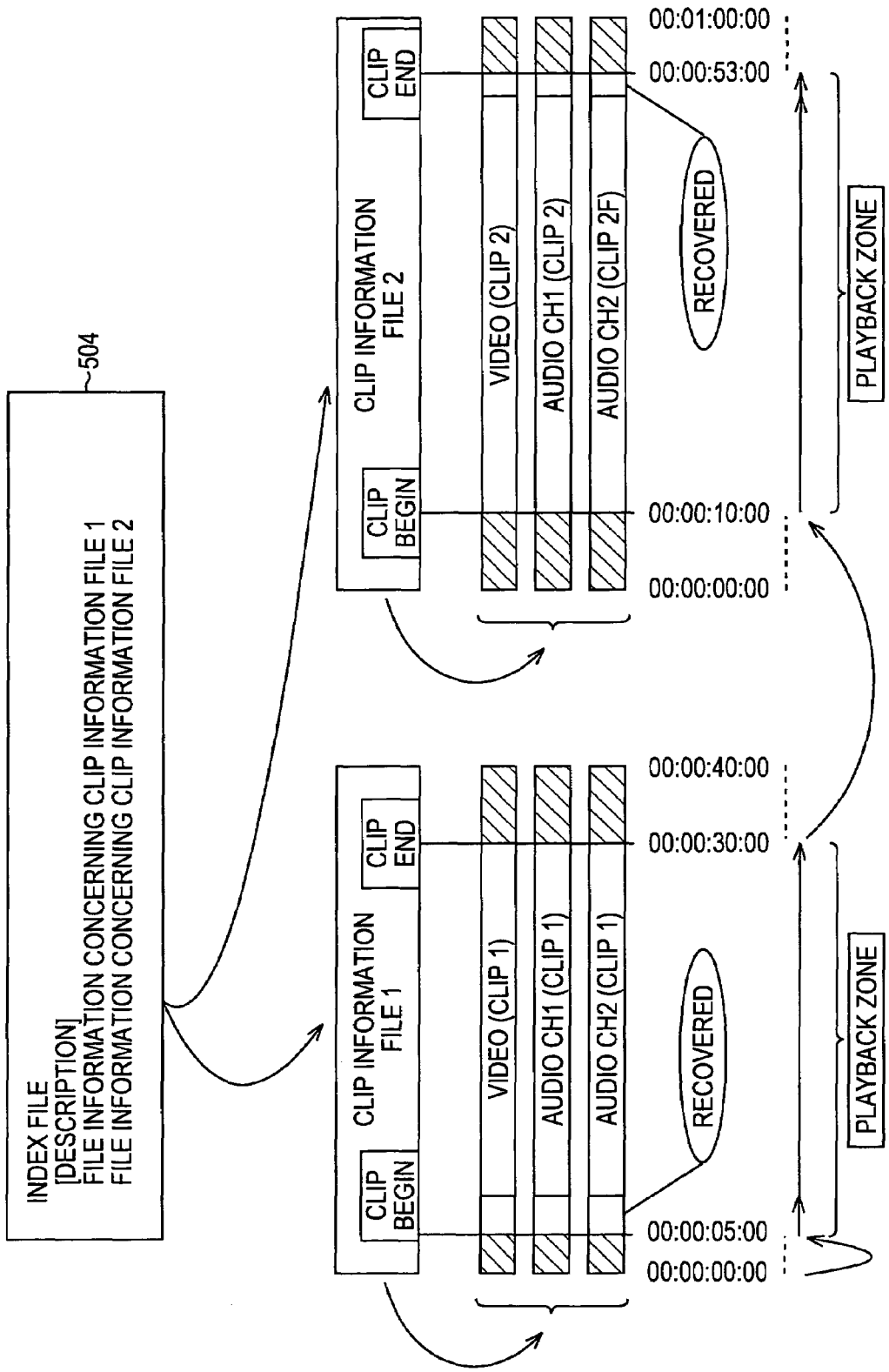
FIG. 45 illustrates playback zones of clips.

As a result of the above-described extra-portion changing processing, the material data originally contained in the extra pre-data or the extra post-data can be included in the playback zone, as shown in FIG. 45. That is, in the example of FIG. 45, the clip begin of the clip information file 1 and the clip end of the clip information file 2 shown in FIG. 42 are changed so that part of the extra pre-data and part of the extra post-data are included in the playback zone.

As in FIG. 42, the index file 504 is shown at the top side of FIG. 45, the clip information file 1 and clip 1 are shown at the left side of FIG. 45, and the clip information file 2 and clip 2 are shown at the right side of FIG. 45.

In FIG. 45, the clip begin of the clip information file 1 is changed to "00:00:05:00" while the counterpart in FIG. 42 is "00:00:10:00". Accordingly, the material data between "00:00:05:00" and "00:00:10:00" contained in the extra pre-data shown in FIG. 42 is included in the playback zone. Thus, the material data originally contained in the extra pre-data can be played back.

In FIG. 45, the clip end of the clip information file 2 is changed to "00:00:53:00" while the counterpart in FIG. 42 is "00:00:50:00". Accordingly, the material data between "00:00:50:00" and "00:00:53:00" contained in the extra post-data shown in FIG. 42 is included in the playback zone. Thus, the material data originally contained in the extra post-data can be played back.

The processing for playing back material data recorded on the disc 322 is as follows. The playback processing includes designated-clip playback processing for playing back only designated clips, the above-described tape-like playback processing, and designated-edit-list playback processing for playing back data based on an editing result.

Figure 46:
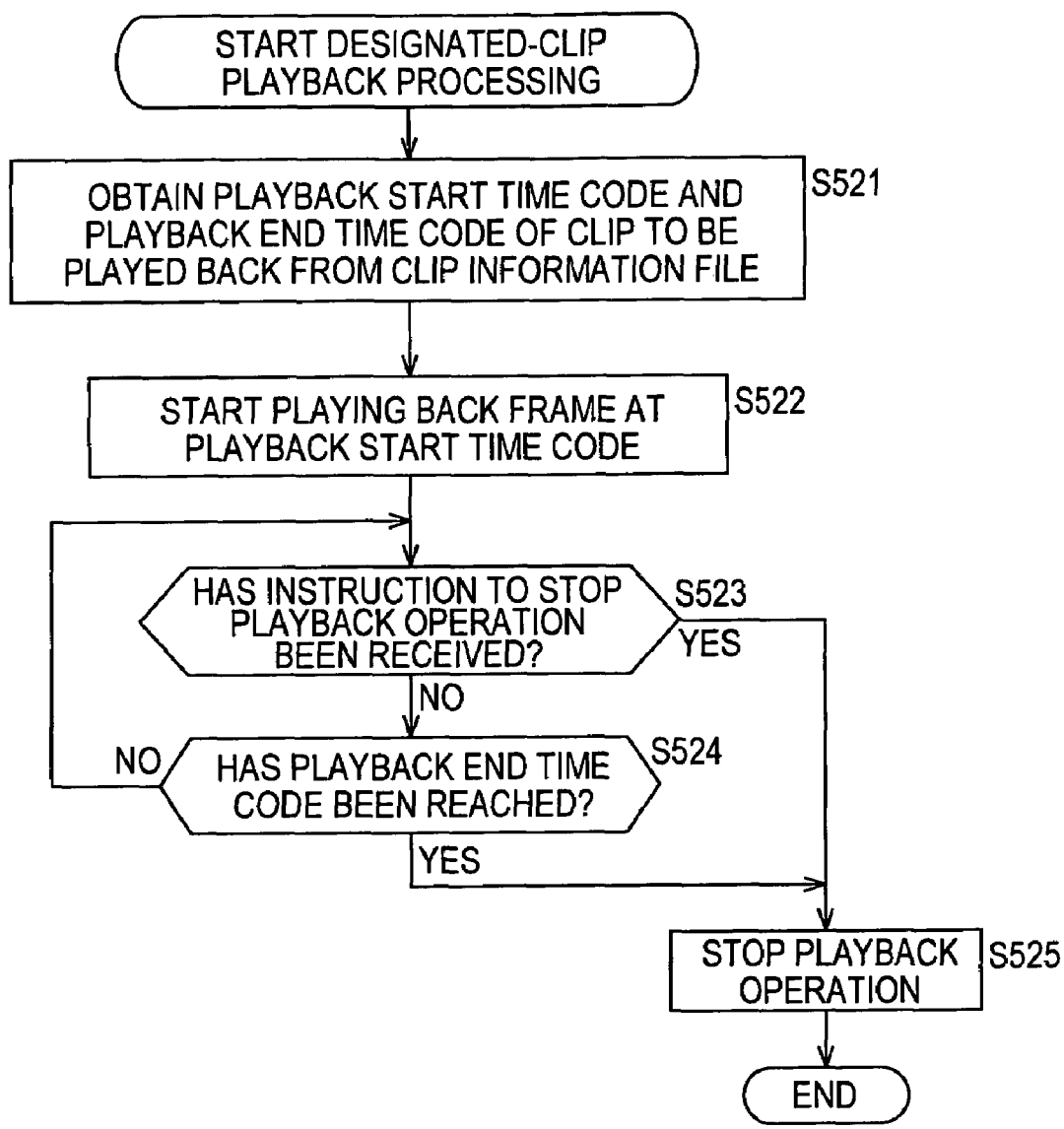
FIG. 46 is a flowchart illustrating designated-clip playback processing.

The designated-clip playback processing is described below with reference to the flowchart of FIG. 46.

In step S521, when an instruction to play back a designated clip is input from the input unit 309, the material data playback control portion 384 obtains the playback start time code (clip begin) and the playback end time code (clip end) from the program of the clip information file stored in the clip information file storage portion 352.

In step S522, among the material data, such as video data, audio data, and low resolution data, contained in the clip to be played back, the material data playback control portion 384 starts playing back the material data of the frame at the playback start time code (clip begin) designated in step S521. The image (moving picture) associated with the video data of the played back material data is displayed on, for example, a monitor contained in the output unit 310, and the sound corresponding to the audio data is output from, for example, a speaker contained in the output unit 310. The material data playback control portion 384 continues playing back the material data until step S525.

In step S523, the material data playback control portion 384 determines whether an instruction to stop playing back the material data has been input from the input unit 309. If such an instruction is not input, the process proceeds to step S524.

In step S524, the material data playback control portion 384 determines whether the time code of the currently played back material data coincides with the playback end time code (clip end) obtained in step S521. If the time code of the currently played back material data has not reached the playback end time code (clip end) obtained in step S521, the process returns to step S523, and step S523 and the subsequent steps are repeated.

If an instruction to stop playing back material data is not input, and if the time code of the currently played back material data has not reached the playback end time code (clip end), the loop operation of steps S523 and S524 is repeated. If it is determined in step S523 that an instruction to stop playing back material data has been input, the process proceeds to step S525. If it is determined in step S524 that the time code of the currently played back material data coincides with the playback end time code (clip end) obtained in step S521, the process proceeds to step S525.

In step S525, the material data playback control portion 384 finishes playing back the material data, and then, the designated-clip playback processing is completed. As described above, only the material data of the clip from the playback start time code (clip begin) to the playback end time code (clip end) is played back.

Figure 47:
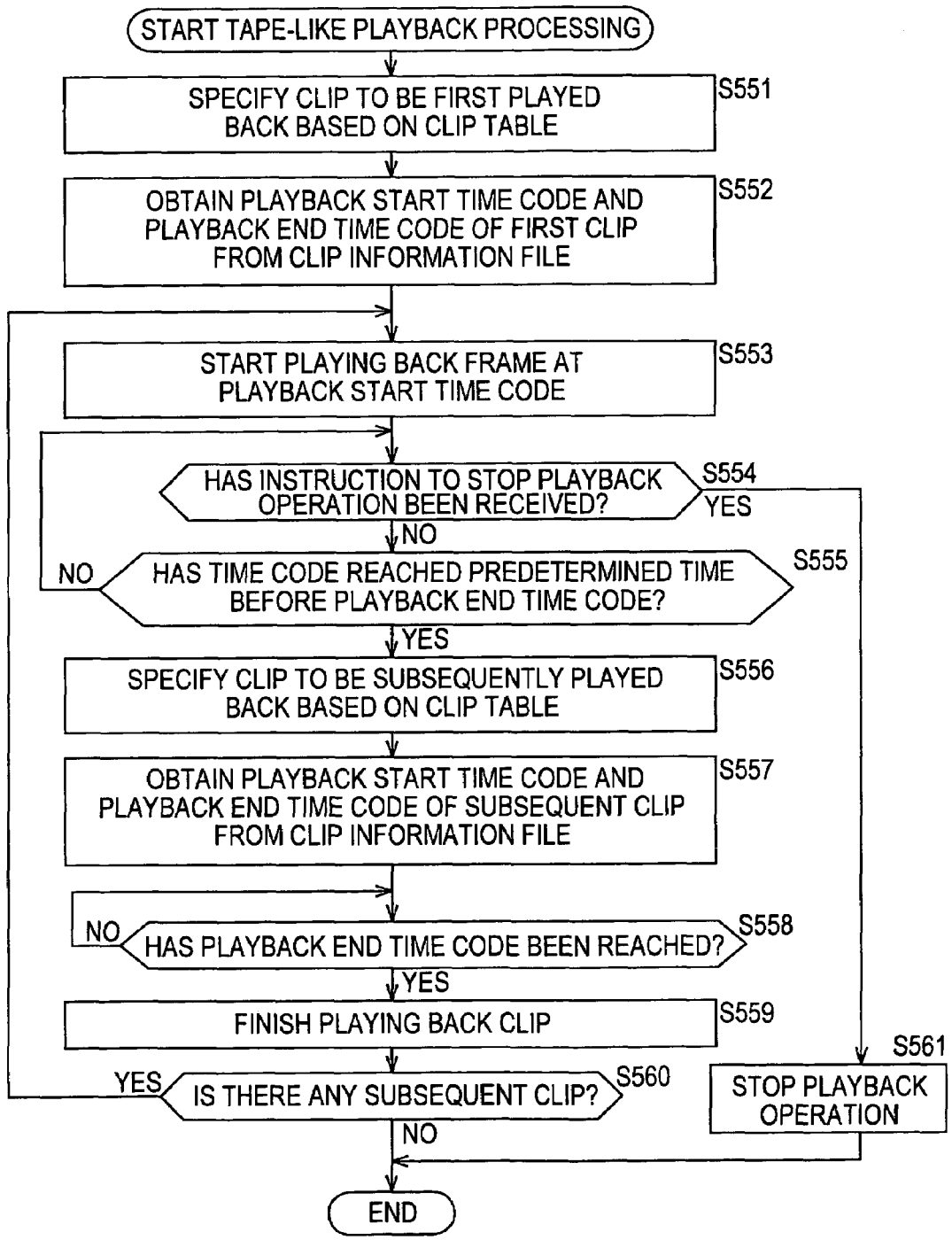
FIG. 47 is a flowchart illustrating tape-like playback processing.

The tape-like playback processing is described below with reference to the flowchart of FIG. 47.

In step S551, the material data playback control portion 384 specifies a clip to be first played back based on the clip table of the index file stored in the index file storage portion 351. The order in which the clip elements are indicated in the clip table of the index file corresponds to the order in which the clips are recorded on the disc 322. For example, in the index file shown in FIGS. 31 through 34, the information concerning the oldest clip (hereinafter referred to as "clip A") is indicated from the sixth line to the 23rd line of FIG. 31, the information concerning the second oldest clip after clip A (hereinafter referred to as "clip B") is indicated from the 25th line of FIG. 31 to the 13th line of FIG. 32, the information concerning the third oldest clip after clip B (hereinafter referred to as "clip C") is indicated from the 15th line of FIG. 32 to the third line of FIG. 33, and the fourth oldest clip after clip C (hereinafter referred to as "clip D") is indicated from the fifth line to the 23rd line of FIG. 33. In this case, in step S551, the material data playback control portion 384 specifies clip A as the clip to be first played back.

In step S552, among the clip information files stored in the clip information file storage portion 352, the material data playback control portion 384 obtains the playback start time code (clip begin) and the playback end time code (clip end) from the program of the clip information file associated with the clip specified in step S551.

In step S553, the material data playback control portion 384 starts playing back the frame associated with the playback start time code (clip begin) specified in step S552 of the material data, such as the video data, audio data, and low resolution data, contained in the designated clip. The image (moving picture) corresponding to the video data of the played back material data is displayed on, for example, the monitor contained in the output unit 310, and the sound corresponding to the audio data is output from, for example, the speaker contained in the output unit 310.

In step S554, the material data playback control portion 384 determines whether an instruction to stop playing back the material data has been input from the input unit 309. If such an instruction is not input, the process proceeds to step S555.

In step S555, the material data playback control portion 384 determines whether the time code of the currently played back material data has reached a predetermined time before the playback end time code (clip end) obtained in step S552. If the time code of the currently played back material data has not reached the predetermined time before the playback end time code (clip end) obtained in step S552, the process returns to step S554, and step S554 and the subsequent steps are repeated. For example, if the playback end time code is "00:

00:30:00", and if the predetermined time is one second, the material data playback control portion 384 determines whether the time code of the currently played back material data has reached the predetermined time before the playback end time code, i.e., "00:00:29:00". If the time code of the currently played back material data has not reached "00:00:29:00", the process returns to step S554, and step S554 and the subsequent steps are repeated.

As described above, if an instruction to stop the playback operation is not input, and if the time code of the currently played back material data has not reached the predetermined time before the playback end time code (clip end), the loop operation of steps S554 and S555 is repeated. If it is determined in step S554 that an instruction to stop the playback operation has been input from the input unit 309, the process proceeds to step S561, and the material data playback control portion 384 finishes playing back the material data. If it is determined in step S555 that the time code of the currently played back material data has reached the predetermined time before the playback end time code (clip end) obtained in step S552, the process proceeds to step S556.

In step S556, the material data playback control portion 384 specifies a clip to be played back subsequent to the currently played back clip based on the clip table of the index file stored in the index file storage portion 351. For example, if clip A is being played back, the material data playback control portion 384 specifies clip B as the clip to be subsequently played back. The process then proceeds to step S557. If there is no clip to be subsequently played back, step S557 is skipped, and the process proceeds to step S558.

In step S557, among the clip information files stored in the clip information file storage portion 352, the material data playback control portion 384 obtains the playback start time code (clip begin) and the playback end time code (clip end) from the program of the clip information file corresponding to the clip specified in step S556.

In step S558, the material data playback control portion 384 determines whether the time code of the currently played back material data coincides with the playback end time code (clip end) of the currently played back material data, and waits until the two time codes become equal to each other. If the time code of the currently played back material data has reached the playback end time code (clip end) of the currently played back material data, the process proceeds to step S559.

In step S559, the material data playback control portion 384 finishes playing back the currently played back clip (material data).

In step S560, the material data playback control portion 384 determines whether there is any clip to be subsequently played back by determining whether a clip to be subsequently played back has been specified in step S556. If it is determined that the subsequent clip has been specified in step S556, the material data playback control portion 384 determines that there is a clip to be subsequently played back. Then, the process returns to step S553, and step S553 and the subsequent steps are repeated. In step S553 after performing step S560, the frame at the playback time code obtained in step S557 of the clip specified in step S556 is played back.

In this manner, the loop operation from step S553 to step S560 is repeated so as to sequentially playback the clips indicated in the clip table. If the material data playback control portion 384 determines in step S560 that a subsequent clip cannot be specified in step S556, it determines that there is no clip to be played back, and completes the tape-like playback processing.

The tape-like playback processing is performed as stated above. In the above-described tape-like playback processing, the playback order of clips is specified based on the index file, and the playback start time code (clip begin) and the playback end time code (clip end) of each clip are specified based on the clip information file of the corresponding clip. Accordingly, the extra portions can be prevented from being played back.

When the time code of the currently played back clip reaches the predetermined time before the playback end time code (clip end), the clip to be subsequently played back can be specified, and the playback start time code (clip begin) and the playback end time code (clip end) of the clip to be subsequently played back can be obtained. Thus, immediately after the playback operation of the current clip is finished, the playback operation of the subsequent clip can be started. In this manner, clips can be played back seamlessly.

Figure 48:
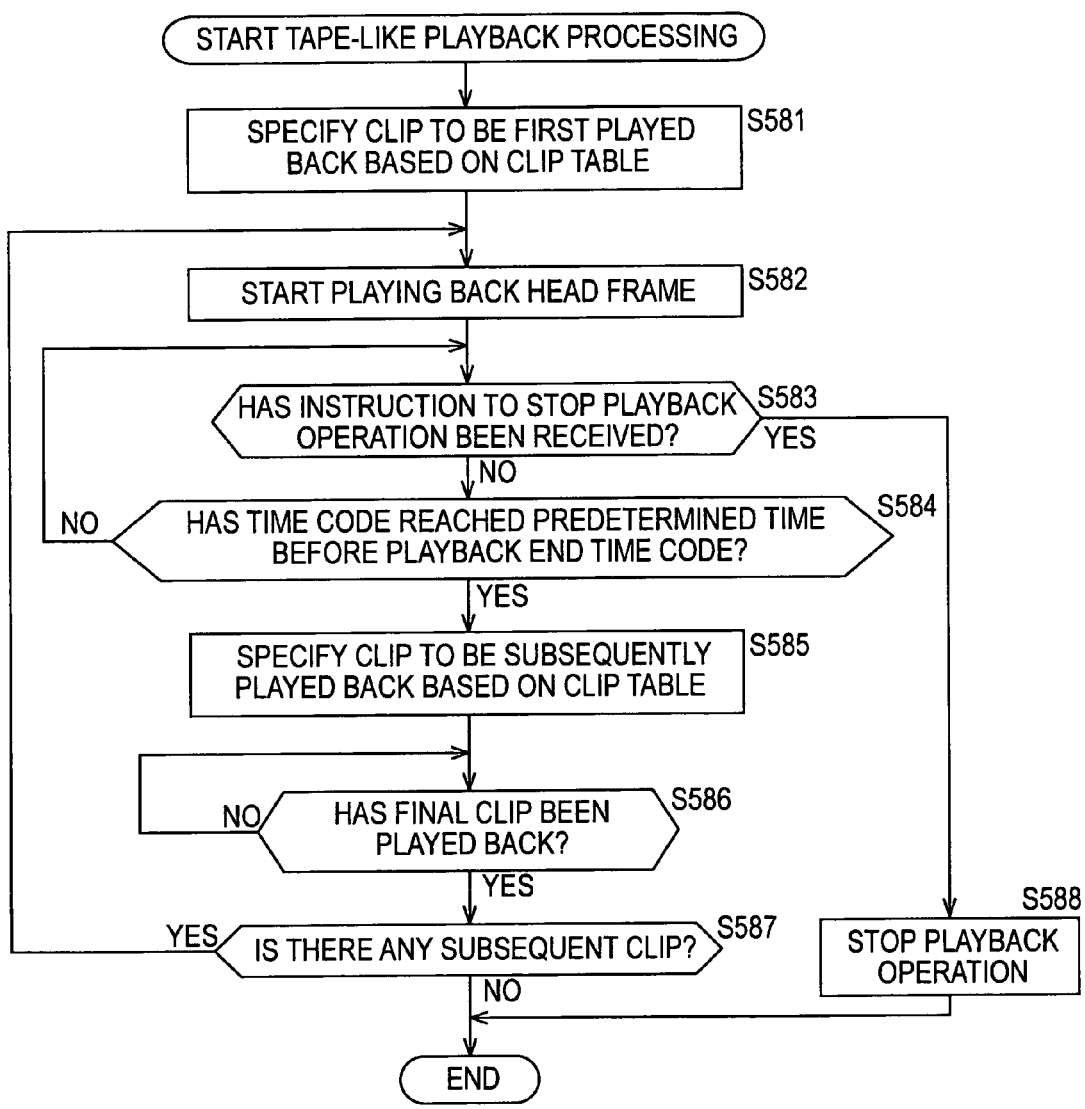
FIG. 48 is a flowchart illustrating tape-like playback processing.

In the above-described tape-like playback processing, extra portions are not played back. It may be sometimes desirable, however, that the whole material data including extra portions be played back. A description is now given, with reference to the flowchart of FIG. 48, of tape-like playback processing when the whole material data including extra portions is played back.

In step S581, the material data playback control portion 384 specifies a clip to be first played back based on the clip table of the index file stored in the index file storage portion 351. The order in which the clip elements are indicated in the clip table of the index file corresponds to the order in which the clips are recorded on the disc 322. For example, in the index file shown in FIGS. 31 through 34, the information concerning the oldest clip (hereinafter referred to as "clip A") is indicated from the sixth line to the 23rd line of FIG. 31, the information concerning the second oldest clip after clip A (hereinafter referred to as "clip B") is indicated from the 25th line of FIG. 31 to the 13th line of FIG. 32, the information concerning the third oldest clip after clip B (hereinafter referred to as "clip C") is indicated from the 15th line of FIG. 32 to the third line of FIG. 33, and the fourth oldest clip after clip C (hereinafter referred to as "clip D") is indicated from the fifth line to the 23rd line of FIG. 33. In this case, in step S581, the material data playback control portion 384 specifies clip A as the clip to be first played back.

In step S582, the material data playback control portion 384 starts playing back from the head frame of the material data, for example, video data, audio data, and low resolution data, contained in the specified clip. The image (moving picture) corresponding to the video data of the played back material data is displayed on, for example, the monitor of the output unit 310, and the sound associated with the audio data is output from, for example, the speaker of the output unit 310. Accordingly, the extra pre-material data is also played back.

In step S583, the material data playback control portion 384 determines whether an instruction to stop playing back the material data has been input from the input unit 309. If such an instruction is not given, the process proceeds to step S584.

In step S584, the material data playback control portion 384 determines whether the time code of the currently played back material data has reached a predetermined time before the time code of the end frame of the currently played back material data. If the time code of the currently played back material data has not reached the predetermined time, the process returns to step S583, and step S583 and the subsequent steps are repeated.

If an instruction to stop playing back the material data is not input, and if the time code of the currently played back material data has not reached the predetermined time before the time code of the end frame of the currently played back material data, the loop operation of steps S583 and S584 is repeated. If it is determined in step S583 that an instruction to stop the playback operation has been input from the input unit 309, the process proceeds to step S588. In step S588, the material data playback control portion 384 finishes playing back the material data. If it is determined in step S584 that the time code of the currently played back material data has reached the predetermined time before the time code of the end frame of the currently played back material data, the process proceeds to step S585.

In step S585, the material data playback control portion 384 specifies a clip to be played back subsequent to the currently played back clip based on the clip table of the index file stored in the index file storage portion 351. For example, if the above-described clip A is currently played back, the material data playback control portion 384 specifies clip B as the clip to be subsequently played back. The process then proceeds to step S586.

In step S586, the material data playback control portion 384 determines whether the currently played back material data has been played back, and if not, the material data playback control portion 384 repeats step S586 until the currently played back material data has been played back. If the material data has been played back, the process proceeds to step S587. In this manner, the extra post-material data is played back.

In step S587, the material data playback control portion 384 determines whether there is a clip to be subsequently played back by determining whether the subsequent clip has been specified in step S585. If the subsequent clip has been specified in step S585, the material data playback control portion 384 determines that there is a clip to be subsequently played back. The process then returns to step S582, and step S582 and the subsequent steps are repeated. In step S582 after performing step S587, the head frame of the clip specified in step S585 is played back.

In this manner, the loop operation from step S582 to step S587 is repeated so as to sequentially play back the clips indicated in the clip table. If the material data playback control portion 384 determines in step S587 that the subsequent clip has not been specified in step S585, it determines that there is no clip to be subsequently played back, and completes the tape-like playback processing.

The tape-like playback processing has been performed as stated above. In the above-described tape-like playback processing, the playback order of clips is specified based on the index file, and the whole zone of each clip including extra portions can be played back according to the specified playback order. This allows the user to check the whole material data recorded on the disc 322.

In the example of the program of the index file shown in FIGS. 31 through 34, the playback start time code (clip begin) and the playback end time code (clip end) are not indicated in the clip table. However, the playback start time code (clip begin) and the playback end time code (clip end) may be indicated in the clip table of the index file.

FIGS. 49 and 50 illustrate an example of the program of the index file in which the playback start time code (clip begin) and the playback end time code (clip end) are indicated in the clip table.

More specifically, from the sixth line of FIG. 49 to the tenth line of FIG. 50, the clip table is indicated. A clip element of one clip (hereinafter referred to as "clip A") is indicated from the sixth line to the 17th line of FIG. 49. A clip element of another clip (hereinafter referred to as "clip B") is indicated from the 19th line of FIG. 49 to the tenth line of FIG. 50.

Information concerning the video data file is indicated from the eighth line to the tenth line of FIG. 49. More specifically, the UMID of the video data '0D12130000000000001044444484EEEE00E0188E130B' is indicated in the eighth line of FIG. 49. In the ninth line of FIG. 49, the file name "C0001C01.MXF" of the video data file, the coding method "DV25_411" of the video data file, the header size "65536", and the time code "00:00:00:00" of the head frame during the tape-like playback processing are indicated. In the tenth line of FIG. 49, the instructed recording start time code and the instructed recording end time code 'clipBegin="smpte-30=00:00:05:00" clipEnd="smpte-30=00:00:30:00' are indicated. More specifically, the "clipBegin" indicates that the instructed recording start time code (playback start time code) is to be described, and "00:00:05:00" after "clipBegin" indicates the instructed recording start time code. The "clipEnd" indicates that the instructed recording end time code (playback end time code) is to be described, and "00:00:30:00" indicates the instructed recording end time code.

From the 11th line to the 13th line of FIG. 49, information concerning the audio data file of channel 1 is indicated, and from the 14th line to the 16th line of FIG. 49, information concerning the audio data file of channel 2 is indicated. More specifically, in the 11th line of FIG. 49, the UMID '0D12130000000000001044444484EEEE00E0188E130B' of the audio data file of channel 1 is indicated. In the 12th line of FIG. 49, the file name "C0001A01.MXF" of the audio data file of channel 1, the coding method "LPCM16", the header size "65536", the channel "CH1" which outputs sound, and the time code "00:00:00:00" of the head frame during the tape-like playback processing are indicated. In the 13th line of FIG. 49, the instructed recording start time code and the instructed recording end time code 'clipBegin="smpte-30=00:00:05:00" clipEnd="smpte-30=00:00:30:00' are indicated. More specifically, the 'clipBegin' indicates that the instructed recording start time code (playback start time code) is to be described, and "00:00:05:00" after 'clipBegin' indicates the instructed recording start time code. The 'clipEnd' indicates that the instructed recording end time code (playback end time code) is to be described, and "00:00:30:00" indicates the instructed recording end time code.

From the 14th line to the 16th line of FIG. 49, information concerning the audio data file of channel 2 is indicated in a manner similar to the information concerning the audio data file of channel 1, and an explanation thereof is thus omitted.

From the 19th line of FIG. 49 to the tenth line of FIG. 50, information concerning clip B is indicated in a manner similar to the information concerning clip A.

From the first line to the third line of FIG. 50, information concerning the video data file is indicated. More specifically, the UMID of the video data '0D12130000000000001044444484EEEE00E0188E130C' is indicated in the first line of FIG. 50. In the second line of FIG. 50, the file name "C0002C01.MXF" of the video data file, the coding method "DV25_411" of the video data file, the header size "65536", and the time code "00:00:25:00" of the head frame during the tape-like playback processing are indicated. In the third line of FIG. 50, the instructed recording start time code and the instructed recording end time code 'clipBegin="smpte-30=00:00:10:00" clipEnd="smpte-30=00:00:53:00' are indicated. More specifically, the "clipBegin" indicates that the instructed recording start time code (playback start time code) is to be described, and "00:00:10:00" after "clipBegin" indicates the instructed recording start time code. The "clipEnd" indicates that the instructed recording end time code (playback end time code) is to be described, and "00:00:53:00" indicates the instructed recording end time code.

From the fourth line to the sixth line of FIG. 50, information concerning the audio data file of channel 1 is indicated, and from the seventh line to the ninth line of FIG. 50, information concerning the audio data file of channel 2 is indicated. More specifically, in the fourth line of FIG. 50, the UMID '0D1213000000000001044444484EEEE00E0188E130C' of the audio data file of channel 1 is indicated. In the fifth line of FIG. 50, the file name "C0002A01.MXF" of the audio data file of channel 1, the coding method "LPCM16", the header size "65536", the channel "CH1" which outputs sound, and the time code "00:00:25:00" of the head frame during the tape-like playback processing are indicated. In the sixth line of FIG. 50, the instructed recording start time code and the instructed recording end time code 'clipBegin="smpte-30=00:00:10:00" clipEnd="smpte-30=00:00:53:00' are indicated. More specifically, the 'clipBegin' indicates that the instructed recording start time code (playback start time code) is to be described, and "00:00:10:00" after 'clipBegin' indicates the instructed recording start time code. The 'clipEnd' indicates that the instructed recording end time code (playback end time code) is to be described, and "00:00:53:00" indicates the instructed recording end time code.

From the seventh line to the ninth line of FIG. 50, information concerning the audio data file of channel 2 is indicated in a manner similar to the information concerning the audio data file of channel 1, and an explanation thereof is thus omitted.

When adding a clip element to the clip table in step S467 of FIG. 40, the clip begin and the clip end may be recorded, as shown in FIGS. 49 and 50.

If the clip begin and the clip end of each clip are recorded in the clip table of the index file, not only the clip information file, but also the index file are desirably updated when changing extra portions of a clip. If the clip begin and the clip end of each clip are recorded in the clip table of the index file, a clip can be designated and played back by referring to the index file instead of the clip information file during the designated-clip playback processing. If the clip begin and the clip end of each clip are recorded in the clip table of the index file, each clip can be played back by referring to only the index file without the need to check the clip information file during the tape-like playback processing.

A description is now given of the clip extra-portion changing processing, the designated-clip playback processing, and the tape-like playback processing when the clip begin and the clip end of each clip are recorded in the clip table of the index file.

The clip extra-portion changing processing when the clip begin and the clip end of each clip are recorded in the clip table of the index file is first described with reference to the flowchart of FIG. 51.

Figure 43:
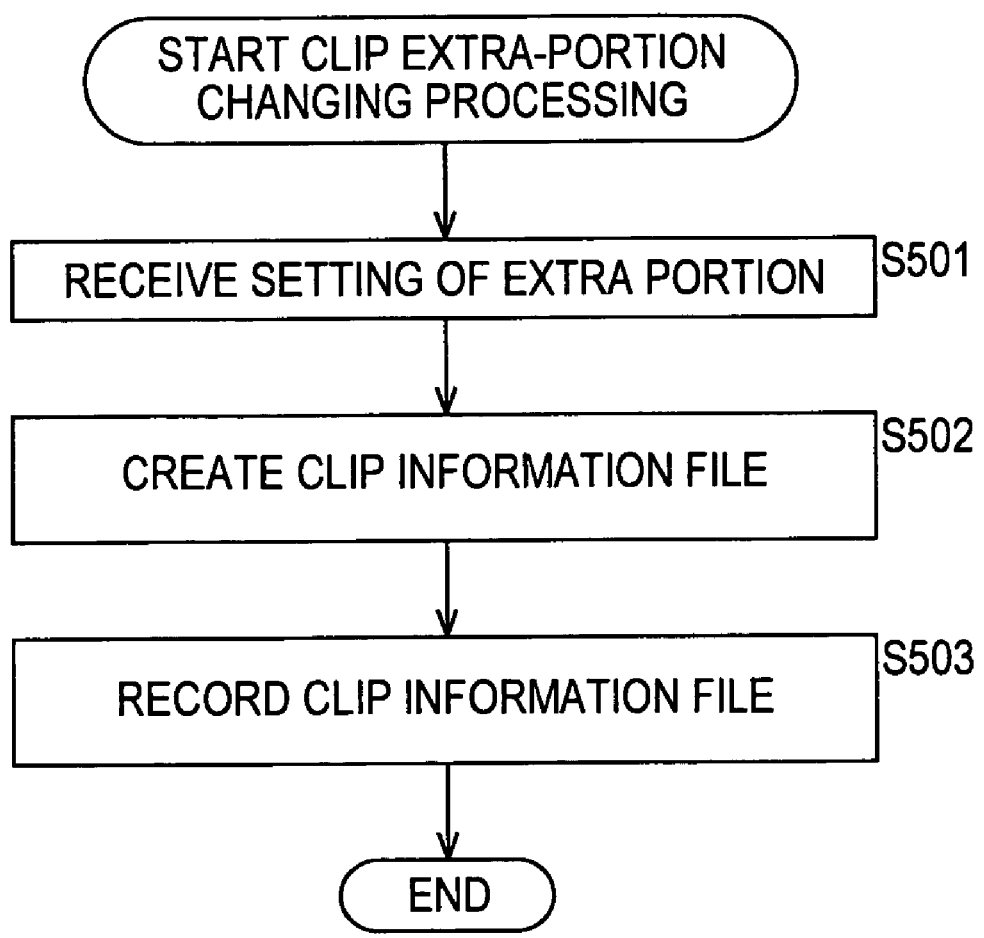
FIG. 43 is a flowchart illustrating clip extra-portion changing processing.
Figure 51:
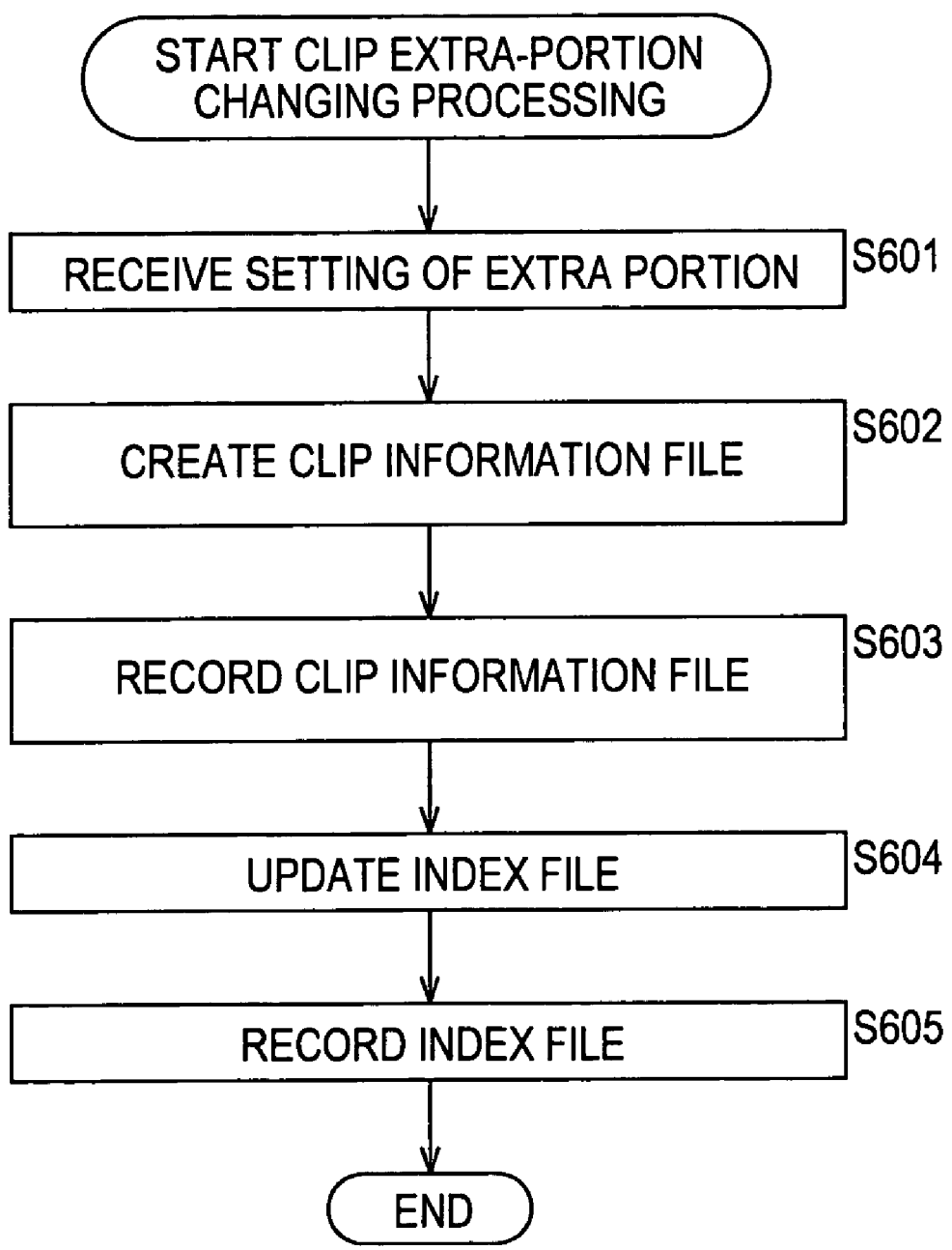
FIG. 51 is a flowchart illustrating clip extra-portion changing processing.

Steps S601 through S603 of FIG. 51 are similar to steps S501 through S503, respectively, of FIG. 43, and thus, they are simply explained. The clip information file of a clip whose extra portion is to be changed has been read from the disc 322 and stored in the clip information storage portion 352 by the clip information file reader 382 during the disc loading processing.

In step S601, the clip information file manager 405 receives the input of an operation for changing an extra portion from the input unit 309.

In step S602, the clip information file manager 405 creates a clip information file reflecting a change in the playback start time code (clip begin) or the playback end time code (clip end) based on the input received in step S501, and stores the clip information file in the clip information file storage portion 352. In this case, the clip information file stored in the clip information file storage portion 352 is updated by overwriting the previous clip information file by the new clip information file.

In step S603, the clip information file recording control portion 406 records the updated clip information file created in step S602 and stored in the clip information file storage portion 352 on the disc 322 via the drive 314. The clip information file recording control portion 406 overwrites the clip information file of the same clip stored in the disc 322 by the clip information file created in step S602.

In step S604, based on the input received in step S601, the index file manager 402 overwrites the playback start time code (clip begin) or the playback end time code (clip end) of the clip element of the clip whose extra portion is to be changed, and stores the changed time code in the index file storage portion 351. In this case, the index file stored in the index file storage portion 351 can be updated by overwriting the previous index file by the new index file.

In this manner, in order to reflect a change in the extra portion, the clip table of the index file stored in the index file storage portion 351 is updated. Then, in step S605, the index file recording control portion 403 records the updated index file stored in the index file storage portion 351 on the disc 322 by overwriting the previous index file.

The extra-portion changing processing has been performed as described above. When the clip begin and the clip end of each clip are recorded in the clip table of the index file, they can be updated when performing the above-described extra-portion changing processing.

Figure 52:
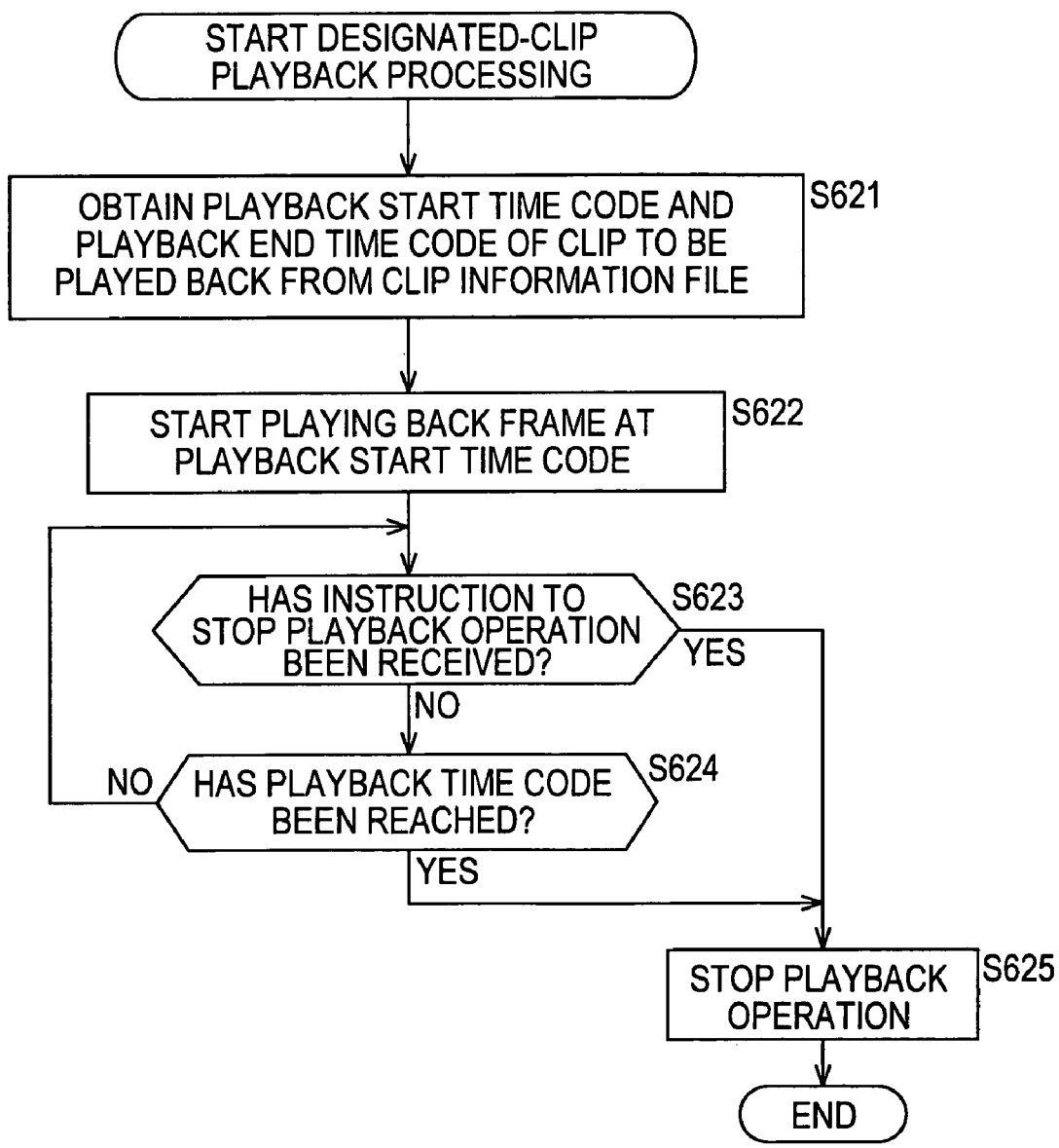
FIG. 52 is a flowchart illustrating designated-clip playback processing.

A description is now given, with reference to the flowchart of FIG. 52, of the designated-clip playback processing when the clip begin and the clip end of each clip are recorded in the clip table of the index file. Steps S622 through S625 of FIG. 52 are similar steps S522 through S525, respectively, of FIG. 46, and thus, they are simply explained.

In step S621, when an instruction to designate a clip and play it back is input from the input unit 309, the material data playback control portion 384 obtains the playback start time code (clip begin) and the playback end time code (clip end) from the program of the clip element of the designated clip in the clip table of the index file stored in the index file storage portion 351.

In step S622, the material data playback control portion 384 starts playing back from the frame of the material data, for example, video data and audio data, contained in the designated clip, at the playback start time code (clip begin) specified in step S621.

In step S623, the material data playback control portion 384 determines whether an instruction to stop playing back the material data has been input from the input unit 309. If such an instruction is not input, the process proceeds to step S624.

In step S624, the material data playback control portion 384 determines whether the time code of the currently played back material data has reached the playback end time code (clip end) obtained in step S621. If the two time codes are not equal to each other, the process returns to step S623, and step S623 and the subsequent steps are repeated.

If it is determined in step S623 that an instruction to stop the playback operation has been input from the input unit 309, or if it is determined in step S624 that the time code of the currently played back material data has reached the playback end time code (clip end) obtained in step S621, the process proceeds to step S625. In step S625, the material data playback control portion 384 finishes playing back the material data, and completes the designated-clip playback processing.

When the clip begin and the clip end are indicated in the clip table of the index file, the designated-clip playback processing can be performed by referring to the index file, as described above.

Figure 53:
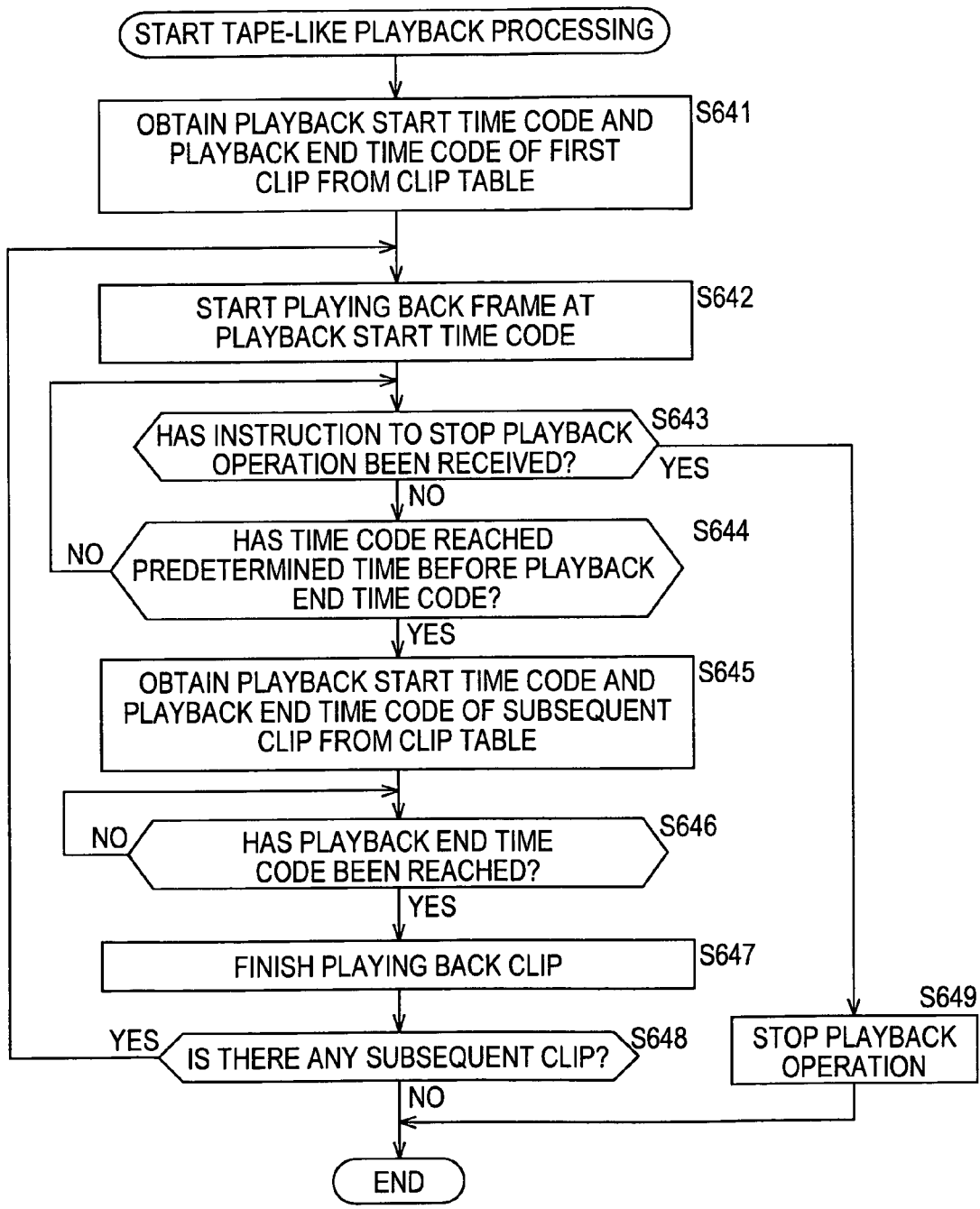
FIG. 53 is a flowchart illustrating tape-like playback processing.

A description is now given, with reference to the flowchart of FIG. 53, of the tape-like playback processing when the playback start time code (clip being) and the playback end time code (clip end) are recorded in the clip table of the index file.

In step S641, the material data playback control portion 384 specifies a clip to be first played back based on the clip table of the index file stored in the index file storage portion 351, and obtains the playback start time code (clip begin) and the playback end time code (clip end) from the program of the clip element corresponding to the specified clip. For example, the material data playback control portion 384 specifies the clip corresponding to the clip element indicated from the sixth line to the 17th line of FIG. 49, and obtains the playback start time code (clip begin) "00:00:05:00" and the playback end time code (clip end) "00:00:30:00" indicated in the clip element.

In step S642, the material data playback control portion 384 starts playing back from the frame at the playback start time code (clip begin) specified in step S641 of the material data, such as video data and audio data, contained in the specified clip. The image (moving picture) corresponding to the video data of the played back material data is displayed on, for example, the monitor of the output unit 310, and the sound associated with the audio data is output from, for example, the speaker of the output unit 310. In the example shown in FIG. 49, "00:00:05:00" has been obtained as the playback start time code (clip begin), and thus, the material data playback control portion 384 plays back from the frame at the time code "00:00:05:00" of the material data, such as video data and audio data, contained in this clip.

In step S643, the material data playback control portion 384 determines whether an instruction to stop the playback operation has been input from the input unit 309. If such an instruction is not input, the process proceeds to step S644.

In step S644, the material data playback control portion 384 determines whether the time code of the currently played back material data has reached a predetermined time before the playback end time code (clip end) obtained in step S641. If the time code of the currently played back material data has not reached the predetermined time, the process returns to step S643, and step S643 and the subsequent steps are repeated.

If an instruction to stop the playback operation is not input, and if the time code of the currently played back material data has not reached the predetermined time before the playback end time code (clip end), the loop operation of steps S643 and S644 is repeated. If it is determined in step S643 that an instruction to stop the playback operation has been input from the input unit 309, the process proceeds to step S649. In step S649, the material data playback control portion 384 finishes playing back the material data. If it is determined in step S644 that the time code of the currently played back material data has reached the predetermined time before the playback end time code (clip end) obtained in step S641, the process proceeds to step S645.

In step S645, the material data playback control portion 384 specifies a clip to be played back subsequent to the currently played back clip based on the clip table of the index file stored in the index file storage portion 351. The material data playback control portion 384 then obtains the playback start time code (clip begin) and the playback end time code (clip end) from the program of the clip element associated with the clip to be subsequently played back. For example, if the clip of the clip element indicated from the sixth line to the 17th line of FIG. 49 is currently played back, the material data playback control portion 384 specifies the clip of the clip element indicated from the 19th line of FIG. 49 to the tenth line of FIG. 50 as the clip to be subsequently played back. Then, the material data playback control portion 384 obtains the playback start time code (clip begin) "00:00:10:00" and the playback end time code (clip end) "00:00:53:00" from the program of the clip element indicated from the 19th line of FIG. 49 to the tenth line of FIG. 50.

In step S646, the material data playback control portion 384 determines whether the time code of the currently played back material data has reached the playback end time code (clip end) of the currently played back material data, and repeats step S646 until the two time codes become equal to each other. If the time code of the currently played back material data has reached the playback end time code of the currently played back material data, the process proceeds to step S647.

In step S647, the material data playback control portion 384 finishes playing back the currently played back clip (material data).

In step S648, the material data playback control portion 384 determines whether there is a clip to be subsequently played back by determining whether the subsequent clip has been specified in step S645. If the subsequent clip has been specified in step S645, the material data playback control portion 384 determines that there is a clip to be subsequently played back. The process then returns to step S642, and step S642 and the subsequent steps are repeated. In step S642 after performing step S648, the frame at the playback start time code obtained in step S645 of the clip specified in step S645 is played back.

In this manner, the loop operation from step S642 to step S648 is repeated so as to sequentially play back the clips corresponding to the clip elements indicated in the clip table. If the material data playback control portion 384 determines in step S648 that the subsequent clip has not been specified in step S645, it determines that there is no clip to be subsequently played back, and completes the tape-like playback processing.

The tape-like playback processing has been performed as described above. In the above-described tape-like playback processing, the playback order of clips is specified based on the index file, and the playback start time code (clip begin) and the playback end time code (clip end) of each clip are specified. Thus, the extra portions can be prevented from being played back.

Figure 54:
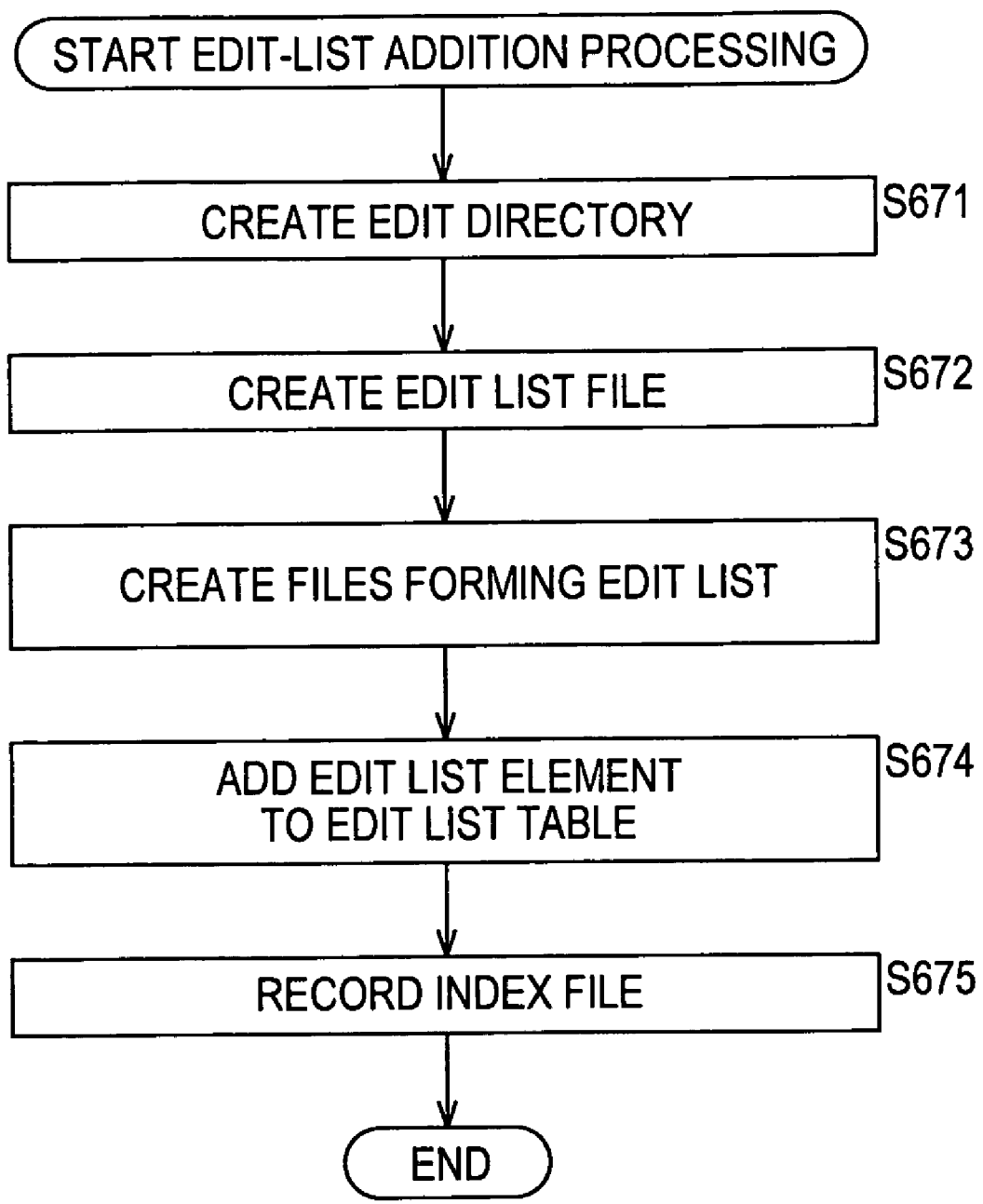
FIG. 54 is a flowchart illustrating edit-list addition processing.

Edit-list addition processing to be performed when an edit list is added is described below with reference to the flowchart of FIG. 54, and if, necessary, to FIG. 55.

For example, after editing a clip recorded on the disc 322 without updating original material data and creating an edit list indicating editing information, (hereinafter such editing is referred to as "non-destructive editing"), the user gives an instruction to add a new edit list to the disc 322. Then, in step S671, the recording controller 306 of the recording/playback apparatus 300 creates a new edit list directory under the root directory of the disc 322. In this case, the name of the new edit list directory should not be overlapped with the names of the edit list directories that are already recorded on the disc 322.

Then, in step S672, the recording controller 306 creates an edit list file under the edit list directory created in step S671.

FIG. 55 illustrates a specific example of the program of the edit list file represented in XML. In FIG. 55, the numbers at the head of the lines are added for the convenience of representation only, and are not part of the XML program.

As stated above, the edit list file is a file including editing information concerning the non-destructive editing performed on a clip, and also indicating the playback method for the editing result.

As shown in FIG. 55, the XML program of the edit list file is mainly divided into the header between the header tags (<head></head>) and the body portion between the body tags (<body></body>). In the example of FIG. 55, the header is indicated from the third line to the tenth line of FIG. 55, and the body portion is indicated from the 11th line to the 24th line.

In the header, information concerning the edit list meta data file contained in the same edit list directory is indicated. In the example of FIG. 55, the body portion indicates that the first clip (Clip 1) and the second clip (Clip 2) are spliced.

Between parallel tags (<par></par>) from the 12th line to the 23rd line of FIG. 55 to indicate that the clips therebetween are sequentially played back, information concerning the first clip is indicated from the 14th line to the 17th line, and information concerning the second clip is indicated from the 19th line to the 22nd line, the information indicating that the clips have been edited so that the two clips are sequentially played back.

As stated above, in the XML program of the edit list file, information concerning the non-destructive editing performed on clips is indicated.

Referring back to FIG. 54, in step S673, the recording controller 306 creates, for example, files forming the edit list other than the edit list file such as the edit list meta data file, under the edit list directory created in step S671.

After completing step S673, the recording controller 306 proceeds to step S674. In step S674, the index file manager 402 of the recording controller 306 adds information concerning the added edit list (hereinafter referred to as the "edit list element") to the edit list table of the index file stored in the index file storage portion 351.

In this manner, in order to reflect the addition of the edit list, the edit list table of the index file stored in the index file storage portion 351 is updated. Then, in step S675, the index file recording control portion 403 records on the disc 322 the updated index file stored in the index file storage portion 351 by overwriting the previous index file. After updating the index file of the disc 322, the index file recording control portion 403 completes the edit-list addition processing.

In this manner, the index file recorded on the disc 322 can be updated when an edit list is added.

Figure 56:
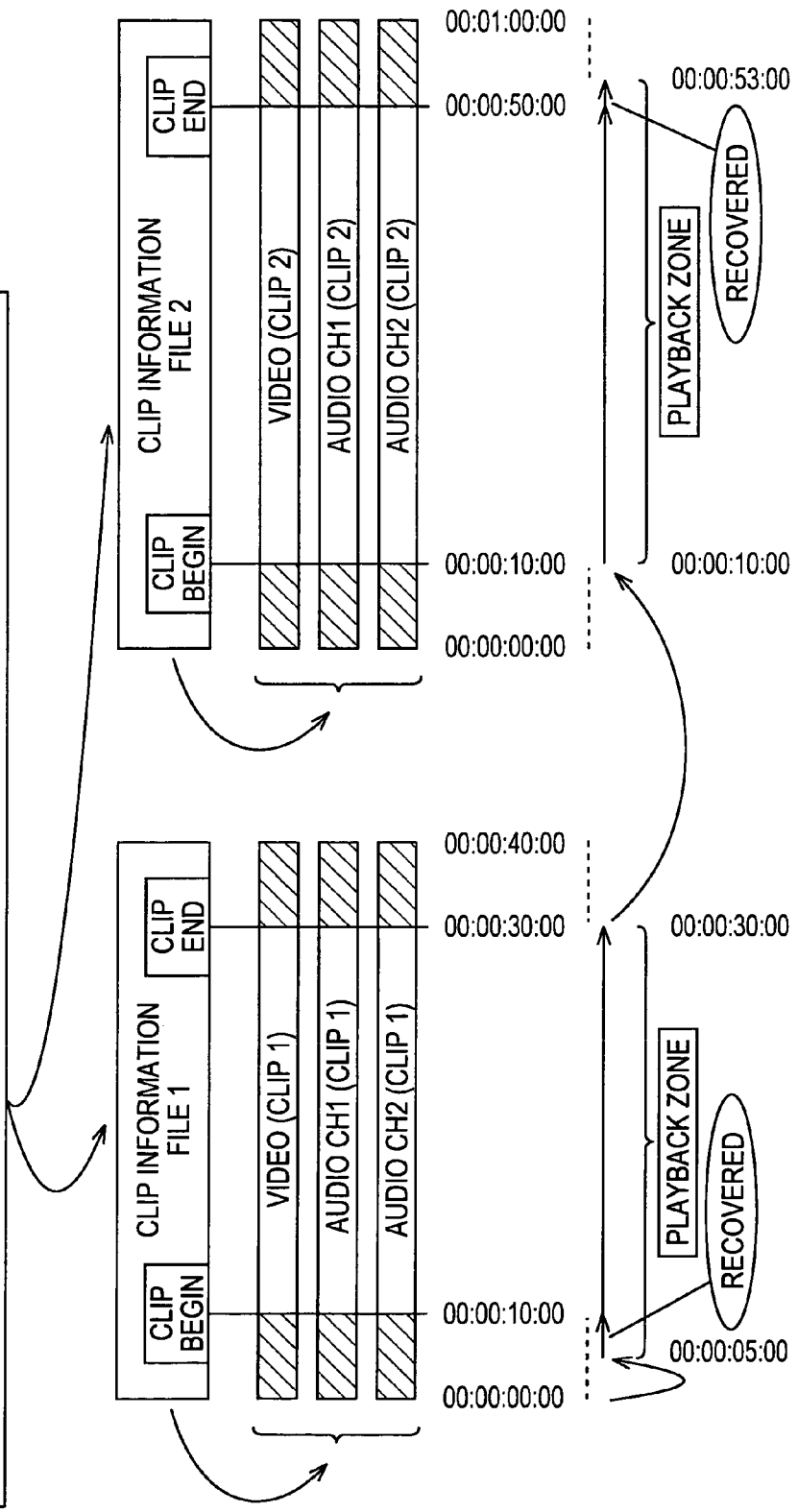
FIG. 56 illustrates playback zones of clips.

As result of performing the above-described edit-list addition processing, extra pre-video data and extra pre-audio data can be included in the playback zone, as shown in FIG. 56. More specifically, FIG. 56 shows that clip 1 and clip 2 shown in FIG. 42 have been edited in a non-destructive manner. The edit list file 241 shown at the top side of FIG. 56 indicates that clip 1 is played back from the playback start time code (clip begin) "00:00:05:00" to the playback end time code (clip end) "00:00:30:00", and then, clip 2 is sequentially played back from the playback start time code (clip begin) "00:00:10:00" to the playback end time code (clip end) "00:00:53:00".

In the clip information file 1 shown at the left side of FIG. 56, the instructed recording start time code is indicated as the clip begin, and the instructed recording end time code is indicated as the clip end. When the corresponding clip (hereinafter referred to as "clip 1") is played back based on the clip information file 1, the interval between the clip begin "00:00: 10:00" and the clip end "00:00:30:00" is the playback zone, and only the playback zone is played back. Accordingly, in the material data of clip 1, the extra pre-data area indicated by the hatched portion between the time code "00:00:00:00" and "00:00:10:00" and the extra post-data area indicated by the hatched portion between the time code "00:00:30:00" and "00:00:40:00" are not played back. In contrast, when clip 1 and clip 2 are played back based on the editing information contained in the edit list file 241, clip 1 is played back from the playback start time code (clip begin) "00:00:05:00" to the playback end time code (clip end) "00:00:30:00", including the extra pre-data area between "00:00:05:00" and "00:00: 10:00". Accordingly, by specifying the playback zone by referring to the edit list file 241, the extra pre-material data can be played back.

In a manner similar to the clip information file 1, in the clip information file 2 at the right side of FIG. 56, the instructed recording start time code is indicated as the clip begin, and the instructed recording end time code is indicated as the clip end. When clip (hereinafter referred to as "clip 2") is played back based on the clip information file 2, the interval between the clip begin "00:00:10:00" and the clip end "00:00:50:00" is the playback zone, and only the playback zone is played back. Accordingly, in the material data of clip 2, the extra pre-data area indicated by the hatched portion between the time code "00:00:00:00" and "00:00:10:00", and the extra post-data area indicated by the hatched portion between the time code "00:00:50:00" and "00:01:00:00" are not played back. In contrast, when clip 1 and clip 2 are played back based on the editing information contained in the edit list file 241, clip 2 is played back from the playback start time code (clip begin) "00:00:10:00" to the payback end time code (clip end) "00: 00:53:00", including the extra post-data area between "00: 00:50:00" and "00:00:53:00". In this manner, by designating the playback zone by referring to the edit list file 241, the extra post-material data can be played back.

As described above, by specifying an extra pre-data area or an extra post-data area within the playback zone, the extra pre-material data or the extra post-material data can be played back.

FIG. 57 illustrates an example of the program of an edit list file when split editing is performed such that the point at which video data is changed is displaced from the point at which audio data is changed. In FIG. 57, the numbers at the head of the lines are added for the convenience of representation only, and are not part of the XML program. In the example of FIG. 57, for the video data files, the video data file of clip 1 is played back from "00:01:00:00" to "00:05:00:00" and the video data file of clip 2 is played back from "00:02: 00:00" to "00:03:30:00". For the audio data files, the audio data file of clip 1 is played back from "00:01:00:00" to "00: 04:59:28", and the audio data file of clip 2 is then played back from "00:01:59:28" to "00:03:30:00".

As shown in FIG. 57, the XML program of the edit list file is mainly divided into the header between the header tags (<head></head>) and the body portion between the body tags (<body></body>). In the example of FIG. 57, the header is indicated from the third line to the tenth line of FIG. 57, and the body portion is indicated from the 11th line to the 24th line.

In the header, information concerning the edit list meta data file contained in the same edit list directory is indicated, and information concerning the editing result is indicated together with the playback method in the body portion. In the example of FIG. 57, the body portion indicates that editing is performed such that the first clip (Clip 1) and the second clip (Clip 2) are spliced.

Between parallel tags (<par></par>) from the 12th line to the 23rd line of FIG. 57 to indicate that the clips therebetween are sequentially played back, information concerning the first clip is indicated from the 14th line to the 17th line, and information concerning the second clip is indicated from the 19th line to the 22nd line, the information indicating that the clips have been edited so that the two clips are sequentially played back.

In the 14th line of FIG. 57, the urn of the video data file contained in the first clip is represented by the UMID "060A2B340101010501010D1213000000FEDCBA9876 543210FEDCBA98765 43210". In the 15th line, the coding method "IMX50" of the video data contained in the first clip, the time code "00:00:00:00" of the playback start frame of the edited video data file contained in the first clip, the playback start time code (clip begin) "00:01:00:00" and the playback end time code (clip end) "00:05:00:00" of the video data file contained in the first clip are indicated.

In the 16th line of FIG. 57, the urn of the audio data file contained in the first clip is represented by the UMID "060A2B340101010501010D1213000000FEDCBA987 6543210FEDCBA98765 43210". In the 17th line, the coding method "LPCM16" of the audio data contained in the first clip, the time code "00:00:00:00" of the playback start frame of the edited audio data file contained in the first clip, the playback start time code (clip begin) "00:01:00:00" and the playback end time code (clip end) "00:04:59:28" of the audio data file contained in the first clip are indicated.

In the 19th line of FIG. 57, the urn of the video data file contained in the second clip is represented by the UMID "060A2B340101010501010D1213000000FEDCBA98 76543210FEDCBA98765 43210F". In the 20th line, the coding method "IMX50" of the video data contained in the second clip, the playback start time code (clip begin) "00:02:00:00" and the playback end time code (clip end) "00:03:30:00" of the video data file contained in the second clip, and the time code "00:04:00:00" of the playback start frame of the edited video data file contained in the second clip are indicated.

In the 21st line of FIG. 57, the urn of the audio data file contained in the second clip is represented by the UMID "060A2B340101010501010D1213000000FEDCBA9 876543210FEDCBA98765 43210F". In the 22nd line, the coding method "LPCM16" of the audio data contained in the second clip, the playback start time code (clip begin) "00:01:59:28" and the playback end time code (clip end) "00:03:30:00" of the audio data file contained in the second clip, and the time code "00:03:59:28" of the playback start frame of the edited audio data file contained in the second clip are indicated.

When material data is played back based on the edit list shown in FIG. 57, for the video data files, the first clip is played back for four minutes from "00:01:00:00" to "00:05:00:00", and the second clip is played back for one minute and 30 seconds from "00:02:00:00" to "00:03:30:00". For the audio data files, the first clip is played back for frames for three minutes, 59 seconds, and 28 milliseconds from "00:01:00:00" to "00:04:59:28", and the second clip is played back from "00:01:59:28" to "00:03:30:00" for one minute, 30 seconds, and 32 milliseconds. Accordingly, the timing (change point) with which the video data file to be played back is switched from the first clip to the second clip is different from the timing (change point) with which the audio data file to be played back is switched from the first clip to the second clip.

In such split editing, extra pre-material data or post-material data can be contained in the playback zone by setting the clip begin or the clip end to be the time code in the extra pre-material data or post-material data.

For an edit list which has already been created, the clip begin or the clip end may be changed. Edit-list updating processing is described below with reference to the flowchart of FIG. 58. An edit list file whose extra portion is to be changed has been read from the disc 322 by the edit list file reader 383 and stored in the edit list file storage portion 353 during the disc loading processing.

In step S701, the edit list file manager 408 receives the input of an operation for changing the clip begin or the clip end from the input unit 309. The user can give an instruction to change the clip begin or the clip end by specifying the changed time code.

In step S702, the edit list file manager 408 creates an edit list file based on the input received in step S701, and stores the edit list file in the edit list file storage portion 353. In this case, the edit list file to be stored in the edit list file storage portion 353 can be updated by overwriting the previous edit list file by the created edit list file.

In step S703, the edit list file recording control portion 409 records on the disc 322 via the drive 314 the updated edit list file created in step S702 and stored in the edit list file storage portion 353.

The edit-list updating processing is then completed.

Figure 59:
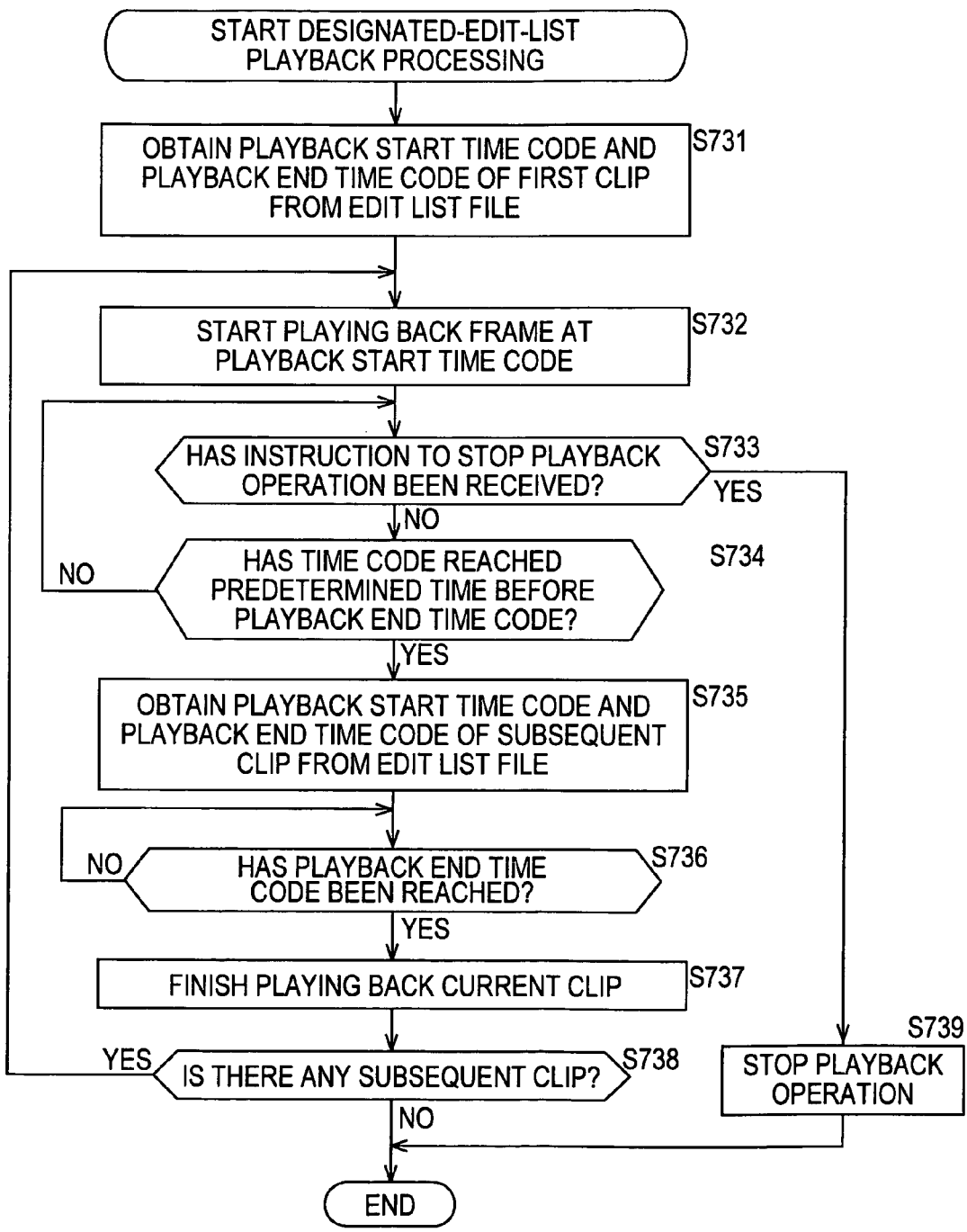
FIG. 59 is a flowchart illustrating designated-edit-list playback processing.

Designated-edit-list playback processing for playing back material data based on an edit list is described below with reference to the flowchart of FIG. 59.

In step S731, the edit list file reader 383 reads a specified edit list from the disc 322 via the drive 314 and stores it in the edit list file storage portion 353. The material data playback control portion 384 specifies the clip to be first played back based on the edit list file stored in the edit list file storage portion 353, and obtains the playback start time code (clip begin) and the playback end time code (clip end) from the program of the specified clip. For example, the material data playback control portion 384 specifies the clip indicated from the 14th line to the 17th line of FIG. 55, and obtains the playback start time code (clip begin) "00:00:05:00" and the playback end time code (clip end) "00:00:30:00" indicated in the 16th and 17th lines.

In step S732, the material data playback control portion 384 starts playing back from the frame at the playback start time code (clip begin) specified in step S731 of the material data, such as video data, audio data, and low resolution data, contained in the clip specified in step S731. The image (moving picture) corresponding to the video data of the played back material data is displayed on, for example, the monitor of the output unit 310, and the sound corresponding to the audio data is output from, the speaker of the output unit 310. In the example shown in FIG. 55, "00:00:05:00" has been obtained as the playback start time code (clip begin), as stated above. The material data playback control portion 384 thus starts playing back from the frame at the time code "00:00:05:00" of the material data, such as video data, audio data, and low resolution data, contained in the clip.

In step S733, the material data playback control portion 384 determines whether an instruction to stop playing back the material data has been input from the input unit 309. If such an instruction is not input, the process proceeds to step S734.

In step S734, the material data playback control portion 384 determines whether the time code of the currently played back material data has reached a predetermined time before the playback end time code (clip end) obtained in step S731. If the time code of the currently played back material data has not reached the predetermined time, the process returns to step S733, and step S733 and the subsequent steps are repeated.

If an instruction to stop the playback operation is not input, and if the time code of the currently played back material data has not reached the predetermined time before the playback end time code (clip end), the loop operation of steps S733 and S734 is repeated. If it is determined in step S733 that an instruction to stop the playback operation has been input from the input unit 309, the process proceeds to step S739. In step S739, the material data playback control portion 384 finishes playing back the material data. If it is determined in step S734 that the time code of the currently played back material data has reached the predetermined time before the playback end time code (clip end) obtained in step S731, the process proceeds to step S735.

In step S735, the material data playback control portion 384 specifies the clip to be played back subsequent to the currently played back clip based on the edit list file stored in the edit list file storage portion 353. The material data playback control portion 384 then obtains the playback start time code (clip begin) and the playback end time code (clip end) from the program of the clip to be subsequently played back. For example, if the clip indicated from the 14th line to the 17th line of FIG. 55 is currently played back, the material data playback control portion 384 specifies the clip indicated from the 19th line to the 22nd line of FIG. 55 as the clip to be subsequently played back. Then, the material data playback control portion 384 obtains the playback start time code (clip begin) "00:00:10:00" and the playback end time code (clip end) "00:00:53:00" from the program indicated in the 21st and 22nd lines of FIG. 55.

In step S736, the material data playback control portion 384 determines whether the time code of the currently played back material data has reached the playback end time code (clip end) of the currently played back material data, and repeats step S736 until the two time codes become equal to each other. If the time code of the currently played back material data has reached the playback end time code of the currently played back material data, the process proceeds to step S737.

In step S737, the material data playback control portion 384 finishes playing back the current clip (material data).

In step S738, the material data playback control portion 384 determines whether there is a clip to be subsequently played back by determining whether the subsequent clip has been specified in step S735. If the subsequent step has been specified in step S735, the material data playback control portion 384 determines that there is a clip to be subsequently played back. The process then returns to step S732, and step S732 and the subsequent steps are repeated. In step S732 after performing step S738, the frame at the playback start time code obtained in step S735 of the clip specified in step S735 is played back.

The loop operation from step S732 to step S738 is repeated so as to sequentially play back the clips indicated in the clip table. If the material data playback control portion 384 determines in step S738 that the subsequent clip has not been specified in step S735, it completes the designated-edit-list playback processing.

The designated-edit-list playback processing has been performed as discussed above. By performing the above-described designated-edit-list playback processing, material data specified as extra pre-data or post-data in the clip information file can also be played back.

Figure 58:
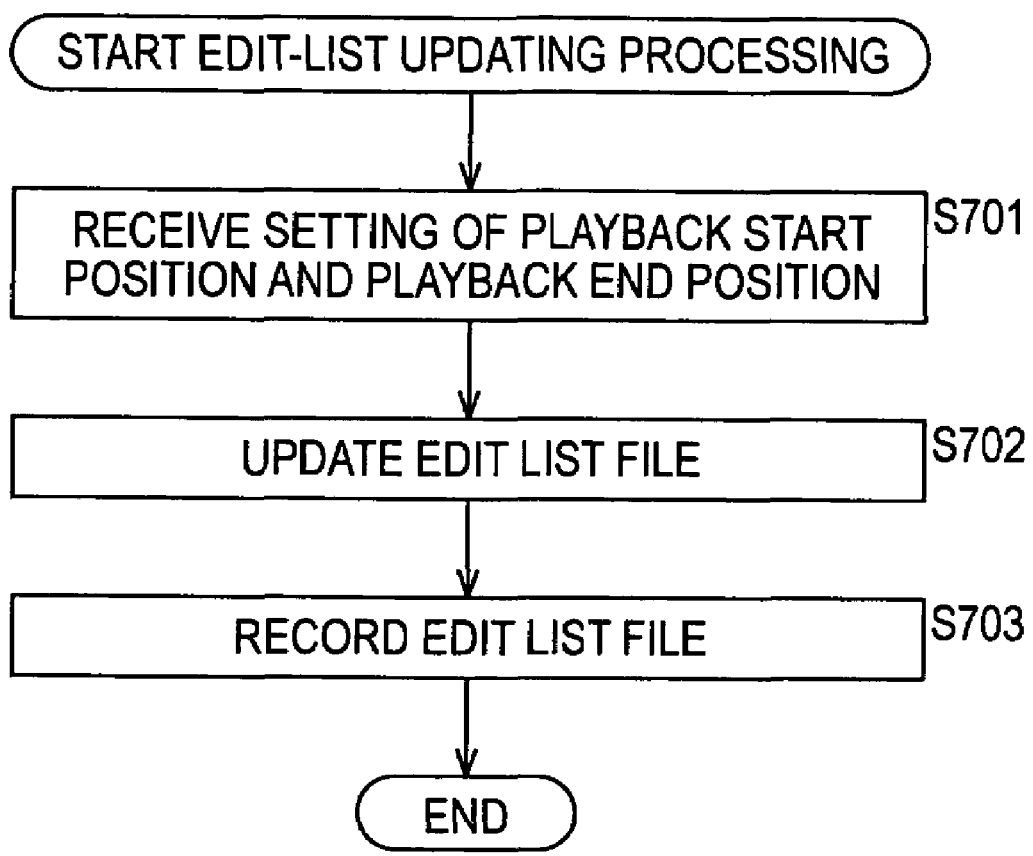
FIG. 58 is a flowchart illustrating edit-list updating processing.

If the clip begin (or the clip end) of the edit list is changed so that the extra pre-material data (or post-material data) is contained in the playback zone by performing the edit-list updating processing shown in FIG. 58, the clip begin (or the clip end) of the clip information file may be changed in accordance with the changed clip begin (or clip end) of the edit list.

Figure 60:
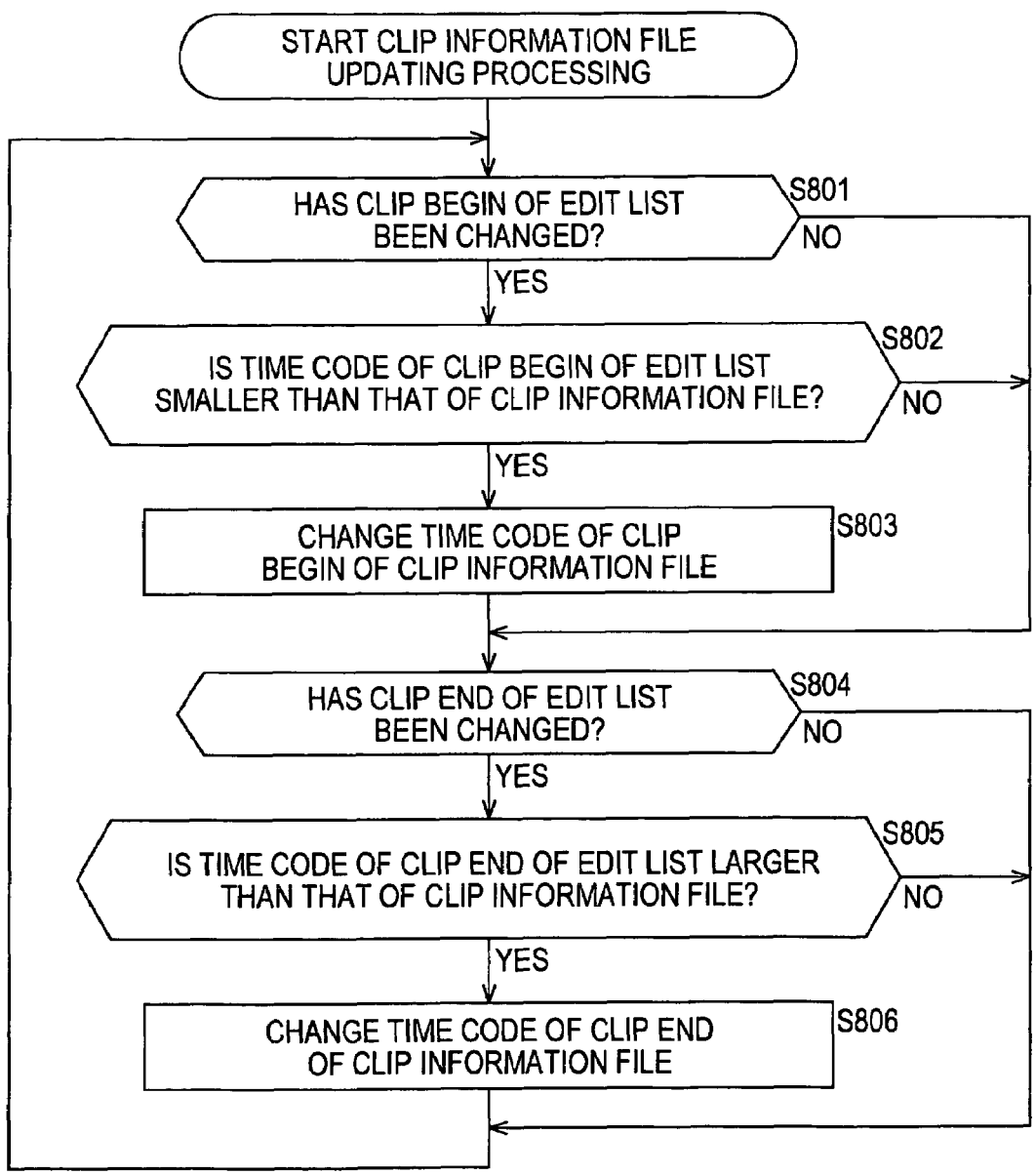
FIG. 60 is a flowchart illustrating clip information file updating processing.

A description is now given, with reference to the flowchart of FIG. 60, of clip information file updating processing for updating a clip information file in accordance with a result of the edit-list updating processing.

In step S801, the clip information file manager 405 determines whether the clip begin of the edit list file has been changed by performing the edit list file updating processing. If the clip begin of the edit list file has been changed, the process proceeds to step S802. In step S802, the clip information file reader 382 reads from the disc 322 the clip information file corresponding to the clip whose clip begin has been changed in the edit list file, and stores the clip information file in the clip information file storage portion 352. The clip information file manager 405 then reads the clip begin of the clip information file stored in the clip information file storage portion 352, and determines whether the time code of the clip begin changed in the edit list file is smaller than the time code of the clip begin of the clip information file. If the time code of the clip begin changed in the edit list file is smaller than the time code of the clip begin of the clip information file, the process proceeds to step S803.

In step S803, the clip information file manager 405 updates the clip information file by changing the time code of the clip begin of the clip information file to the same time code of the clip begin changed in the edit list, and stores the clip information file in the clip information file storage portion 352. Then, the clip information file recording control portion 406 records on the disc 322 the clip information file stored in the clip information file storage portion 352. The process then proceeds to step S804.

If it is determined in step S801 that the clip begin of the edit list file has not been changed, steps S802 and S803 are skipped, and the process proceeds to step S804. If it is determined in step S802 that the time code of the clip begin changed in the edit list file is greater than the time code of the clip begin of the clip information file, step S803 is skipped, and the process proceeds to step S804.

In step S804, the clip information file manager 405 determines whether the clip end of the edit list file has been changed by performing the edit list file updating processing. If the clip end of the edit list file has been changed, the process proceeds to step S805. In step S805, the clip information file reader 382 reads from the disc 322 the clip information file corresponding to the clip whose clip end has been changed in the edit list file, and stores the clip information file in the clip information file storage portion 352. The clip information file manager 405 then reads the clip end in the clip information file stored in the clip information file storage portion 352, and determines whether the time code of the clip end changed in the edit list file is greater than the time code of the clip end in the clip information file. If the time code of the clip end changed in the edit list file is greater than the time code of the clip end in the clip information file, the process proceeds to step S806.

In step S806, the clip information file manager 405 updates the clip information file by changing the time code of the clip end in the clip information file to the same time code of the clip end changed in the edit list, and stores the clip information file in the clip information file storage portion 352. Then, the clip information file recording control portion 406 records on the disc 322 the clip information file stored in the clip information file storage portion 352. The process then returns to step S801, and step S801 and the subsequent steps are repeated.

If it is determined in step S804 that the clip end of the edit list file has not been changed, steps S805 and S806 are skipped, and the process returns to step S801 and step S801 and the subsequent steps are repeated. If it is determined in step S805 that the time code of the clip end changed in the edit list file is smaller than the time code of the clip end in the clip information file, step S806 is skipped. The process then returns to step S801, and step S801 and the subsequent steps are repeated.

The clip information file updating processing has been executed as stated above.

Hitherto, tape-like recording media are mostly used for recording image data or audio data obtained by capturing images by image-capturing devices. However, disc-like recording media, such as CD-RW (Compact DISC-ReWritable) and DVD-RW (Digital Versatile Disc-ReWritable), which allow data to be repeatedly read and written are coming into widespread use due to a decrease in the cost of such recording media.

In such disc-like recording media, since random access to predetermined data can be performed, data such as video data and audio data are sometimes recorded in separate areas on a recording medium.

In contrast, in tape-like recording media, since data are recorded in the order in which data are captured, it can be played back in the order in which data are captured merely by playing back the recording media.

In disc-like recording media, as well as in tape-like recording media, there is an increasing demand to continuously play back data recorded on disc-like recording media. Accordingly, in disc-like recording media, video data and audio data obtained by one capturing operation are recorded as one clip, and then, all the clips recorded on a disc-like recording medium are continuously played back.

However, some clips to be recorded on a disc-like recording medium are formed of only one frame of a black or color image. Such a clip is used together with other clips when editing, and is almost meaningless if it is used singly.

Thus, if such clips are recorded on a disc-like recording medium, all the clips including black or color bars, which are unnecessary, recorded on the recording medium are continuously played back when the clips recorded on the recording medium are played back.

Additionally, when a black or color-bar clip is played back, only one frame is played back. Accordingly, the reading of clip data to be subsequently played back is delayed for the playback time, resulting in the discontinuity of the clips played back.

Thus, in the recording/playback apparatus 300, in the clip elements corresponding to clips including black or color-bars in the clip table of the index file, information indicating that such clips should not be played back during the tape-like playback processing is indicated, thereby preventing such clips from being played back.

Such information can be indicated by, for example, 'playable="false"'. For example, in the program of the index file shown in FIGS. 49 and 50, if the clip element indicated from the sixth line to the 17th line of FIG. 49 is a clip element corresponding to a clip storing a color-bar or black image, the seventh line of FIG. 49 can be indicated by 'file="C0001C01.SMI" fps="59.94i" dur="750" ch="2" aspectRatio="4:3" playable="false"'. Accordingly, the material data playback control portion 384 can avoid the clips corresponding to clip elements indicating 'playable="false"' from being played back during the tape-like playback processing, thereby preventing clips storing color-bar or black image data from being played back.

In the clip elements associated with clips to be played back during the tape-like playback processing, information indicating that such clips are played back can be provided. Such information can be indicated by, for example, 'playable="true"'. For example, in the program of the index file shown in FIGS. 49 and 50, if the clip element indicated from the sixth line to the 17th line of FIG. 49 is a clip element corresponding to a clip to be played back, the seventh line of FIG. 49 can be indicated by 'file="C0001C01.SMI" fps="59.94i" dur="750" ch="2" aspectRatio="4:3" playable="true"'. Accordingly, the material data playback control portion 384 can reliably play back clips corresponding to clip elements indicating 'playable="true"' during the tape-like payback processing. The information indicating whether or not clips are played back during the tape-like playback processing is also referred to as "clip-playable information".

Clip-playable-information setting processing for setting playable information, such as 'playable="false"' or 'playable="true"', is as follows.

In the recording/playback apparatus 300, solid-black or color-bar image data is sometimes obtained for one frame and recorded on the disc 322 in order to use such image data as a background for the captured video data. In the file system of the disc 322, the solid-black or color-bar image data is managed as a clip formed of a one-frame image data file. Such a clip is used by setting the one-frame image data file to be displayed longer.

Accordingly, such a clip formed of one frame may be meaningless if it is played back singly. In particular, in the tape-like playback processing for playing back all the captured clips, all the clips recorded on the disc 322 including the above-described clips are played back.

Thus, the user operates, for example, a button of the input unit 309 to avoid such clips from being played back singly. When an instruction signal indicating that a clip is not playable is input from the input unit 309, the index file manager 402 changes clip-playable information indicated in the corresponding clip element in the clip table of the index file.

For example, in the program of the index file shown in FIGS. 40 and 50, if the seventh line of the clip element indicated from the sixth line to the 17th line of FIG. 49 indicates 'file="C0001C01.SMI" fps="59.94i" dur="750" ch="2" aspectRatio="4:3" playable="true"', and if the clip corresponding to this clip element is a clip storing a color-bar or black image data file, the user operates, for example, a button of the input unit 309 so as to avoid this clip from being played back during the tape-like processing. When an instruction signal indicating that the clip is not playable is input from the input unit 309, the index file manager 402 changes the description of the seventh line of FIG. 49 to 'file="C0001C01.SMI" fps="59.94i" dur="750" ch="2" aspectRatio="4:3" playable="false"'.

In this manner, clip-playable information ('playable="false"' or 'playable="true"') is indicated in each clip element in the clip table of the index file.

Figure 61:
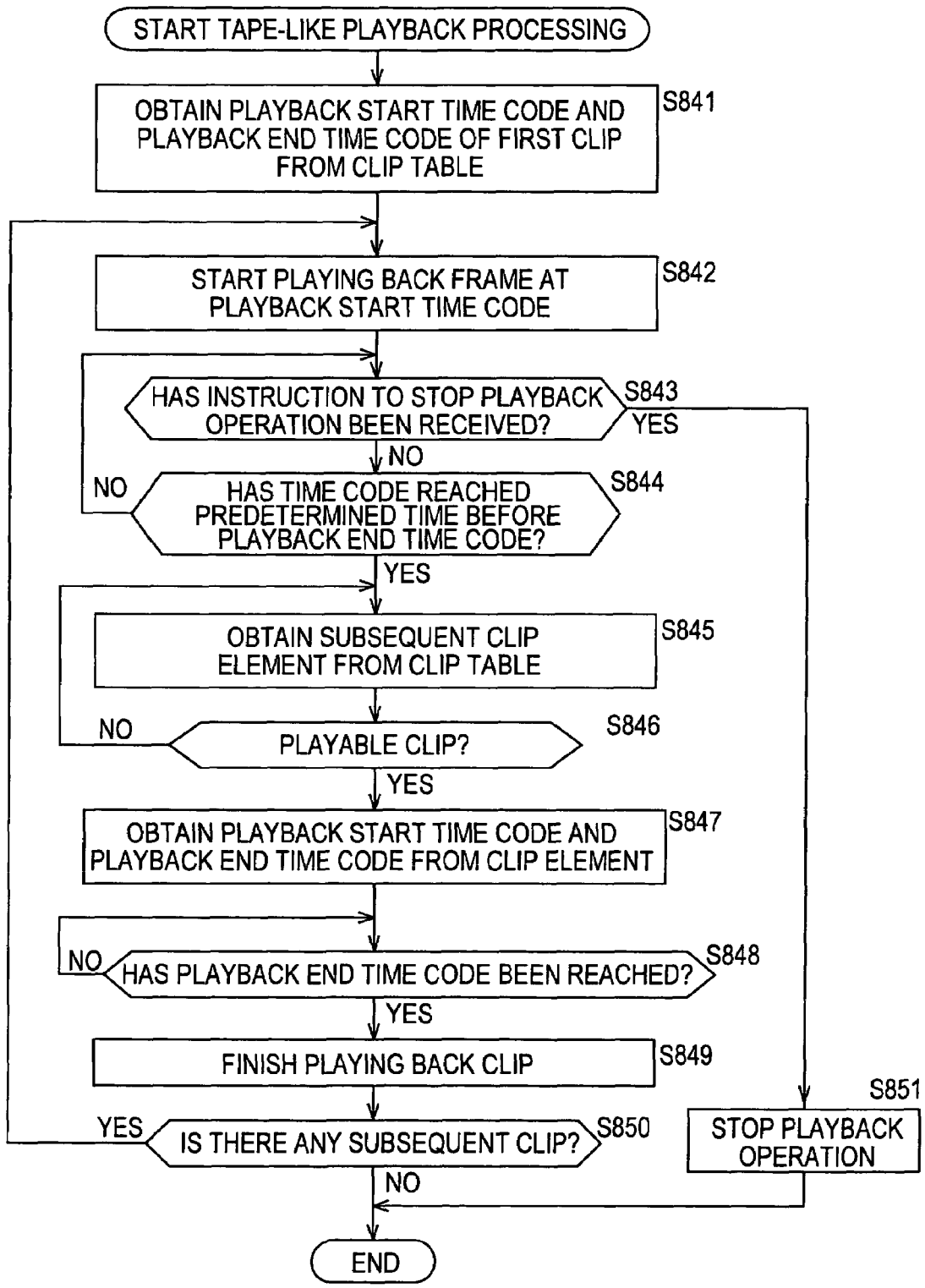
FIG. 61 is a flowchart illustrating tape-like playback processing.

The tape-like playback processing performed based on the index file containing such clip-playable information is described below with reference to the flowchart of FIG. 61. In the following description, it is assumed that the clip begin and the clip end are indicated for each clip element in the clip table of the index file. Although in the following description a clip to be first played back is a playable clip, the following tape-like playback processing is applicable when a clip to be first played back is not playable.

In step S841, the material data playback control portion 384 specifies a clip to be first played back based on the clip table of the index file stored in the index file storage portion 351, and obtains the playback start time code (clip begin) and the playback end time code (clip end) from the program of the clip element of the specified clip.

In step S842, the material data playback control portion 384 starts playing back from the frame at the playback start time code (clip begin) specified in step S841 of the material data such as video data, audio data, and low resolution data contained in the specified clip. The image (moving picture) corresponding to the video data of the played back material data is displayed on, for example, the monitor of the output unit 310, and the sound corresponding to the audio data is output from, for example, the speaker of the output unit 310.

In step S843, the material data playback control portion 384 determines whether an instruction to stop the playing operation has been input from the input unit 309. If such an instruction is not input, the process proceeds to step S844.

In step S844, the material data playback control portion 384 determines whether the time code of the currently played back material data has reached a predetermined time before the playback end time code (clip end) obtained in step S841. If the time code of the currently played back material data has not reached the predetermined time, the process returns to step S843, and step S643 and subsequent steps are repeated.

If an instruction to stop the playback operation is not input, and if the time code of the currently played back material data has not reached the predetermined time before the playback end time code (clip end), the loop operation of steps S843 and S844 is repeated. If an instruction to stop the playback operation is input from the input unit 309, the process proceeds to step S851. In step S851, the material data playback control portion 384 finishes playing back the material data. If it is determined in step S844 that the time code of the currently played back material data has reached the predetermined time before the playback end time code (clip end) obtained in step S841, the process proceeds to step S845.

In step S845, the material data playback control portion 384 obtains the clip element recorded subsequent to the currently played back clip based on the clip table of the index file stored in the index file storage portion 351.

In step S846, the material data playback control portion 384 determines whether the clip corresponding to the clip element obtained in step S845 is a playable clip based on the clip-playable information indicated in the clip element obtained in step S845. More specifically, if the clip-playable information indicates 'playable="false"', the material data playback control portion 384 determines that the clip is not a playable clip. If the clip-playable information indicates 'playable="true"', the material data playback control portion 384 determines that the clip is a playable clip. If the material data playback control portion 384 determines that the clip corresponding to the clip element obtained in step S845 is not a playable clip, the process returns to step S845, and step S845 and the subsequent steps are repeated.

If the material data playback control portion 384 determines in step S846 that the clip corresponding to the clip element obtained in step S845 is a playable clip, the process proceeds to step S847.

If the subsequent clip element has not been obtained in step S845, steps S846 and S847 are skipped, and the process proceeds to step S848.

In step S847, the material data playback control portion 384 obtains the playback start time code (clip begin) and the playback end time code (clip end) from the program of the clip element obtained in step S845.

In step S848, the material data playback control portion 384 determines whether the time code of the currently played back material data has reached the playback end time code (clip end) of the currently played back material data, and repeats step S848 until the two time codes become equivalent to each other. If the time code of the currently played back material data has reached the playback end time code (clip end) of the currently played back material data, the process proceeds to step S849.

In step S849, the material data playback control portion 384 finishes playing back the currently played back clip (material data).

In step S850, the material data playback control portion 384 determines whether there is a clip to be subsequently played back by determining whether the time codes of the clip begin and the clip end of the clip to be subsequently played back have been obtained in step S847. If such time codes have been obtained in step S847, the material data playback control portion 384 determines that there is a clip to be subsequently played back. The process then returns to step S842, and step S842 and the subsequent steps are repeated. In step S842 after performing step S850, the frame at the playback start time code obtained in step S847 is played back.

The loop operation from step S842 to step S850 is repeated to sequentially play back the clips corresponding to the clip elements indicated in the clip table. If the material data playback control portion 384 determines in step S850 that there is no clip to be subsequently played back, it completes the tape-like playback processing.

The tape-like playback processing has been executed as stated above. In the above-described tape-like playback processing, clips which should be played back and clips which should not be played back can be specified based on the index file, thereby preventing unnecessary clips from being played back.

According to the above-described recording/playback apparatus 300, the playback controller 305 or the recording controller 306 suitably generates a control signal for controlling the corresponding element based on instruction information concerning an operation input from the input unit 309, and the drive 314 then records material data on the disc 322 based on the control signal. While the material data is being recorded on the disc 322, the drive 314 continues recording the material data from the instructed recording end time at which information concerning an instruction to finish recording is received from the input unit 309 to the real recording end time determined by a predetermined condition (a predetermined time period or predetermined data amount), and at the real recording end time, the recording of the material data on the disc 322 is finished. Accordingly, after the recording operation, the user is able to view and listen to or edit images or sound before (after) images or sound which the user has intended to record if he/she desires to do so.

In this embodiment, there are provided a controller (for example, the controller 12 shown in FIG. 1 or the playback controller 305 and the recording controller 306 in FIG. 23) for generating a control signal based on instruction information from a user, and a recorder (for example, the drive shown in FIG. 1 or the drive 314 shown in FIG. 23) for recording data (for example, video data or audio data) on a recording medium (for example, the optical disc 42 shown in FIG. 1 or the disc 322 shown in FIG. 23) based on the control signal. The controller controls the recorder to record on the recording medium, in addition to the data for an instructed recording period from the instructed recording start time at which an instruction to start recording is received as the instruction information to the instructed recording end time at which an instruction to finish recording is received as the instruction information, at least one of the data for a first period from a time before the instructed recording start time for a time period determined by a first condition in accordance with the instructed recording start time to the instructed recording start time and the data for a second period from the instructed recording end time to a time after the instructed recording end time for a time period determined by a second condition in accordance with the instructed recording end time. Then, the user is able to view and listen to or edit images or sound before (after) images or sound that the user has intended to record.

In this embodiment, the controller manages at least one of the data for the above-described first period and the data for the above-described second period, and the instructed recording period (for example, the period from point B to point C in FIG. 2) as a clip, and generates management information for managing the data for the instructed recording period and at least one of the first period or the second period (for example, from point A to point C, from point B to point D, or from point A to point D in FIG. 2) as an extended clip. Accordingly, the controller can manage the data by distinguishing the data for the extra portions from the data for the instructed recording period specified by the user.

In this embodiment, the management information is created for each extended clip, and contains clip information for specifying the head and the end of each extended clip and the head and the end of each clip. Accordingly, data created for each recording operation can be managed by the corresponding clip information.

In this embodiment, at least one of the information for specifying the head and the information for specifying the end of the clip can be changed within the range between the head and the end of the extended clip. This allows the user to change the head or the end of each clip as desired.

In this embodiment, when an instruction is given to play back clips in the order in which the clips are recorded, the controller is able to play back the clips according to clip-playable information.

In this embodiment, the management information includes an edit list which contains information for specifying the playback start point and the playback end point in at least one extended clip and for playing back at least part of the data in the corresponding extended clip. According to this edit list, extra portions can be specified as the playback zone.

In this embodiment, at least one of the playback start point and the playback end point in each extended clip of the edit list can be changed.

In this embodiment, when at least one of the playback start point and the playback end point of the edit list is changed, and if the changed playback start point or playback end point is outside the range between the head and the end of the corresponding clip information, the controller can automatically change information for specifying the head and the end of the clip information. Accordingly, the entire playback zone specified by the edit list can be played back based on the clip information file.

In this embodiment, the controller can control the recorder to record the management information on the recording medium, and thus, data and the corresponding management information can be recorded on the same recording medium, thereby making it possible to handle the data and information easily.

It is not essential, however, that the management information and the data be recorded on the same recording medium.

In this embodiment, the controller can make management information for managing the extended clips invisible to the user in the normal mode, and allows the user to see the management information in the special mode. This prevents the user from inadvertently changing extra portions.

In this embodiment, based on an index, contained in the management information, for managing at least one clip recorded on the recording medium, the controller plays back the clips according to the order in which the clips are recorded. Accordingly, data can be played back as if data recorded on a tape-like recording medium were played back.

In this embodiment, the index contains information for specifying the head and the end of each clip. When playing back the clips in the order in which the clips are recorded, the controller plays back data from the head to the end of each clip based on the information for specifying the head and the end of each clip. Accordingly, when data is played back as if data recorded on a tape-like recording medium were played back, extra portions can be specified only by referring to the index without the need to check the clip information.

In this embodiment, there are also provided a capturing unit, for example, the image capturing unit 13 shown in FIG. 1 or the image capturing unit 331 shown in FIG. 23, for capturing the data, and a storage unit, for example, the buffer memory 18 shown in FIG. 1 or the material data storage portion 358 shown in FIG. 24, for temporarily storing the data captured by the capturing unit. The recorder reads the data stored in the storage unit and records it on the recording medium, thereby making it possible to store extra pre-data portions in the storing unit before they are recorded on the recording medium.

In this embodiment, there are also provided a time code control portion 411 shown in FIG. 26 for generating time codes, and a clip information file creator 404 shown in FIG. 26 for creating management information containing a first time code generated by the generator when an instruction to start recording is given and a second time code generated by the generator when an instruction to finish recording is given.

In this embodiment, there is also provided the material data playback control portion 384 for playing back the data between the first time code and the second time code based on the management information.

In this embodiment, the controller can control the recording means to repeatedly overwrite the data in a predetermined zone of the recording medium until an instruction to start recording the data is given.

In the foregoing description, although the terms such as "playlist" and "edit list" are separately used, they are the same since they are used in the sense of management information for managing data such as video data and audio data.

The present invention is applicable to recording media other than the optical disc 41 or the disc 322, for example, magnetic disks, semiconductor memory, hard disks, or tape-like recording media (in the example shown in FIG. 15, however, random-access recording media, for example, magnetic disks or semiconductor memory, are more preferable than take-like recording media). The present invention is also applicable to removable media (recording media) or fixed recording media (recording devices).

In the foregoing description, material data (AV data) such as audio data and video data and management information (playlist and edit list) are recorded on the same recording medium. In the present invention, however, material data (AV data) and management information do not have to be recorded on the same recording medium. For example, in a package medium containing a disc medium (or a tape medium) and a semiconductor memory in a single cartridge, material data (AV data) may be recorded on the disc medium (or the tape medium) and management information may be recorded on the semiconductor memory. Alternatively, in two devices connected to each other via a network, material data (AV data) may be stored in one device, and management information may be stored in the other device. The present invention can be used in other examples in which material data (AV data) and management information are not recorded on the same recording medium.

Although in the description with reference to FIG. 1 the present invention is used in a camcorder, it can be used in devices other than a camcorder, for example, a recorder disposed separately from a camera, a device to which a camera and a recording device are detachably attached, or a recording/playback device.

In the foregoing description, the recording processing, the playback processing, and the editing processing are performed in the same apparatus. However, a recording device for performing the recording processing, a playback device for performing the playback processing, and an editing device for performing the editing processing may be separately provided. The above-described processes indicated by the flowcharts may be executed in different devices.

In the foregoing description, both the video data and audio data are recorded on the optical disc 41 or the disc 322. In the present invention, however, only video data or only audio data may be recorded.

In the foregoing description, time codes are used. However, the use of time codes is not essential, and instead, another type of information may be used as long as it can uniquely specify each frame within one clip.

In step S2, step S3, and steps S6 through S8 of FIG. 3, and step S202, step S203, and steps S206 through S209 of FIG. 16, the time code is set, i.e., the time code is set either in the REC run mode or the free run mode. The present invention can be used when the time code is not set in such modes. For example, if the present invention is used in a device for initially setting the time code when the camera standby mode is selected, step S2 and steps S6 through S8 of FIG. 3 (step S202 and steps S206 through S209 of FIG. 16) are skipped. Alternatively, if the present invention is used in a device for initially setting the time code when an instruction to start recording is given, step S2, step S3, and step S6 of FIG. 2 (step S202, step S203, and step S206 of FIG. 16) are skipped. The present invention can be used in devices other than the above-described types of devices.

The above-described series of processes may be implemented by hardware or software. If software is used to execute the processes, a corresponding software program is installed into a computer and is executed therein, thereby functionally implementing the above-described recording/playback apparatus 1.

Figure 62:
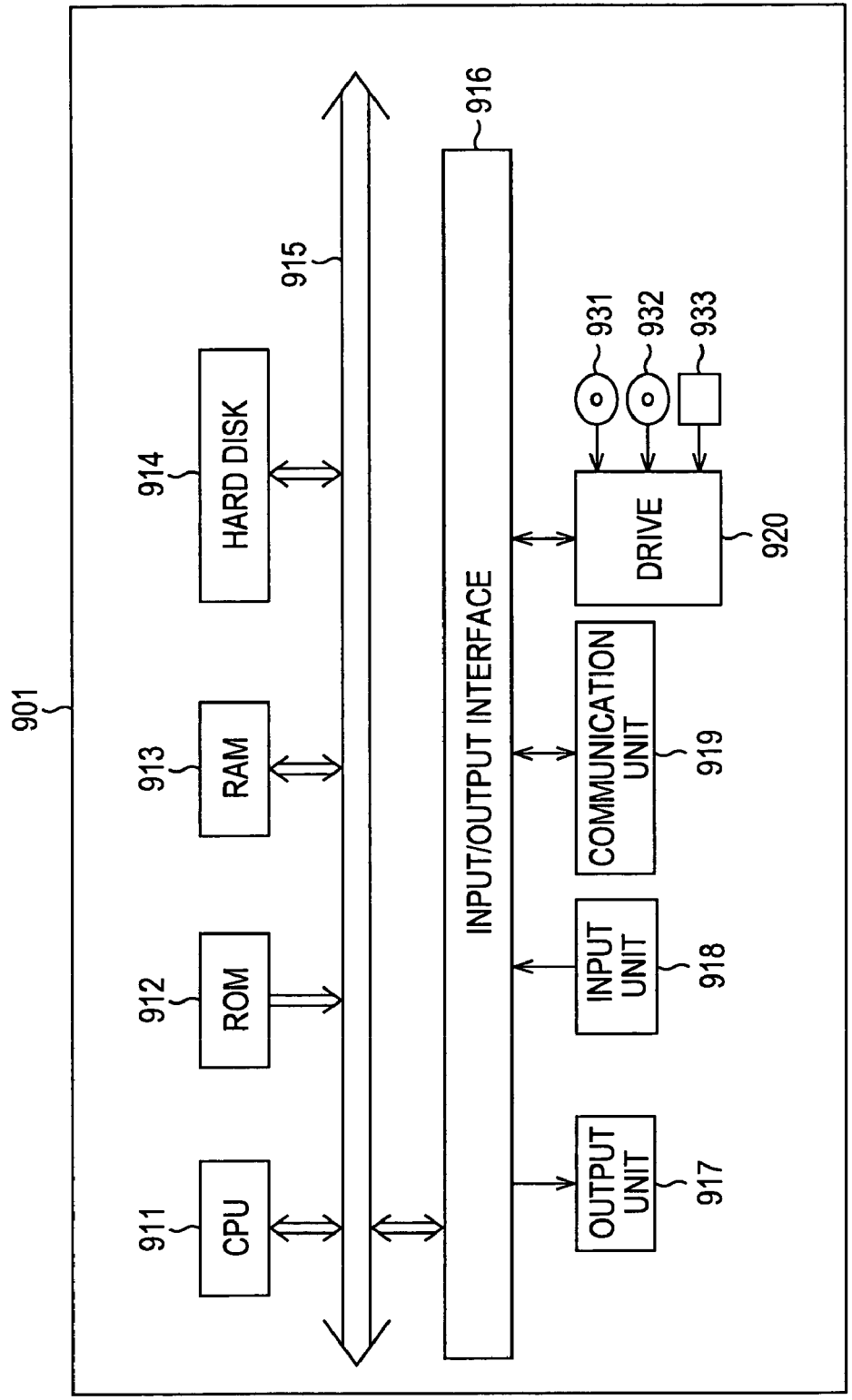
FIG. 62 is a block diagram illustrating an example of the configuration of a personal computer.

FIG. 62 is a block diagram illustrating the configuration of an embodiment of a computer 901 which functions as the disc-recording/playback apparatus 1 or the recording/playback apparatus 300. An input/output interface 916 is connected to a CPU (Central Processing Unit) 911 via a bus 915. When an instruction is input by the user from an input unit 918 formed of, for example, a keyboard and a mouse, via the input/output interface 916, the CPU 911 loads into a RAM (Random Access Memory) 913 a program stored in a ROM (Read Only Memory) 912, a hard disk 914, or a recording medium such as a magnetic disk 931, an optical disc 932, or a semiconductor memory 933 loaded in a drive 920, and executes the loaded program, thereby executing the above-described processes.

The CPU 911 outputs a processing result to an output unit 917 formed of, for example, an LCD, via the input/output interface 916 if necessary. The program can be stored in the hard disk 914 or the ROM 912 and be provided to the user integrally with the computer 901. Alternatively, the program may be provided as a package medium, such as the magnetic disk 931, the optical disc 932 or the semiconductor memory 933, or may be provided to the hard disk 914 from a satellite or a network via a communication unit 919.

The steps forming the program provided by the recording medium (program storage medium) can be executed in chronological order designated in this specification. However, they may be executed concurrently or individually.

In this specification, the system represents an overall apparatus formed of a plurality of devices.

INDUSTRIAL APPLICABILITY

As described above, according to the present invention, data can be recorded on a recording medium.

According to the present invention, data desired by the user can be reliably recorded.

The invention claimed is:

1. A data processing apparatus comprising:
control means for generating a control signal based on instruction information from a user; and
recording means for recording data on a recording medium based on the control signal,
wherein said control means controls said recording means to continue recording the data on the recording medium from an instructed recording end time at which an instruction to finish recording is received as the instruction information while the data is being recorded on the recording medium by said recording means to a real recording end time determined by a predetermined condition, and to finish recording the data on the recording medium at the real recording end time;
wherein in addition to the data for an instructed recording period from an instructed recording start time at which an instruction to start recording is received as the instruction information to the instructed recording end time at which an instruction to finish recording is received as the instruction information, said control means controls said recording means to record on the recording medium the data for a first period from a time before the instructed recording start time, which is determined by a first condition in accordance with the instructed recording start time, to the instructed recording start time; and
said control means manages as a clip the instructed recording period and the data for the first period and the data for a second period from the instructed recording end time to the real recording end time, and generates management information for managing the instructed recording period and the data of the first period and the second period as an extended clip,
wherein the management information is generated for each of the extended clips, and contains clip information for specifying a head and an end of each of the extended clips and for specifying a head and an end of each of the clips,
wherein at least one of the information for specifying the head of the clip and the information for specifying the end of the clip is changeable within a range between the head and the end of the extended clip
wherein at least one of the playback start point and the playback end point of each of the extended clips in the edit list is changeable,
wherein, when at least one of the playback start point and the playback end point of each of the extended clips in the edit list is changed, said control means automatically changes information for specifying the head and the end of the corresponding clip information when the changed playback start point or playback end point is outside the range specified by the head and the end of the clip information.

2. A data processing apparatus according to claim 1, wherein said control means plays back the clips according to clip-playable information when an instruction to playback the clips in the order in which the chips are recorded is given.

3. A data processing apparatus according to claim 1, wherein said control means controls said recording means to record the management information on the recording medium.

4. A data processing apparatus according to claim 1, wherein said control means makes the management information for managing the extended clip invisible to a user in a normal mode, and allows the user to see the management information for managing the extended clip.

5. A data processing apparatus according to claim 1, wherein said control means plays back the clips in the order in which the clips are recorded based on an index, contained in the management information, for managing at least one of the clips recorded on the recording medium.

6. A data processing apparatus according to claim 5, wherein the index contains information for specifying the head and the end of each of the clips, and, when the clips are played back in the order in which the clips are recorded, said control means plays back from the head to the end of each of the clips based on the information for specifying the head and the end.

7. A data processing apparatus according to claim 1, further comprising:
capturing means for capturing the data; and
storage means for temporarily storing the data captured by said capturing means,
wherein said recording means reads the data stored in said storage means and records the data on the recording medium.

8. A data processing apparatus according to claim 7, further comprising:
generation means for generating time codes; and
formation means for forming management information containing a first time code generated by said generation means at a time at which an instruction to start recording is given and a second time code generated by said generation means at a time at which an instruction to finish recording is given.

9. A data processing apparatus according to claim 8, further comprising playback means for playing back the data between the first time code and the second time code based on the management information.

10. A data processing apparatus according to claim 1, wherein said control means controls said recording means to repeatedly overwrite the data in a predetermined zone of the recording medium until an instruction to start recording the data is given.

11. A data processing method comprising:
a detection step of detecting a real recording end time determined by a predetermined condition after an instructed recording end time at which an instruction to finish recording is given as instruction information from a user while data is being recorded on a recording medium; and
a control step of continuing recording the data on the recording medium from the instructed recording end time to the real recording end time, and of finishing recording the data on the recording medium at the real recording end time,
wherein, in processing of the control step, in addition to the data for an instructed recording period from an instructed recording start time at which an instruction to start recording is received as the instruction information to the instructed recording end time at which an instruction to finish recording is received as the instruction information, the data for a first period from a time before the instructed recording start time, which is determined by a first condition in accordance with the instructed recording start time, to the instructed recording start time is controlled to be recorded,
said data processing method further comprising a generation step of managing as a clip the instructed recording period and at least one of the data for the first period and the data for a second period from the instructed recording end time to the real recording end time, and of generating management information for managing the instructed recording period and the data of the first period and the second period as an extended clip,
wherein the management information is generated for each of the extended clips, and contains clip information for specifying a head and an end of each of the extended clips and for specifying a head and an end of each of the clips,
wherein at least one of the information for specifying the head of the clip and the information for specifying the end of the clip is changeable within a range between the head and the end of the extended clip,
wherein the management information includes an edit list which contains information for specifying a playback start point and a playback end point of each of the extended clips so as to play back at least part of the data of at least one of the extended clips; and
a changing step of, when at least one of the playback start point and the playback end point of each of the extended clips in the edit list is changed, automatically changing information for specifying the head and the end of the corresponding clip information when the changed playback start point or playback end point is outside the range specified by the head and the end of the clip information.

12. A data processing method according to claim 11, wherein at least one of the information for specifying the head of the clip and the information for specifying the end of the clip is changeable within a range between the head and the end of the extended clip.

13. A data processing method according to claim 11, wherein at least one of the playback start point and the playback end point of each of the extended clips in the edit list is changeable.

14. A computer readable medium storing a program for allowing a computer to execute a data processing method which comprises:
a detection step of detecting a real recording end time determined by a predetermined condition after an instructed recording end time at which an instruction to finish recording is given as instruction information from a user while data is being recorded on a recording medium; and
a control step of continuing recording the data on the recording medium from the instructed recording end time to the real recording end time, and of finishing recording the data on the recording medium at the real recording end time,
wherein, in processing of the control step, in addition to the data for an instructed recording period from an instructed recording start time at which an instruction to start recording is received as the instruction information to the instructed recording end time at which an instruction to finish recording is received as the instruction information, the data for a first period from a time before the instructed recording start time, which is determined by a first condition in accordance with the instructed recording start time, to the instructed recording start time is controlled to be recorded, said data processing method further comprising a generation step of managing as a clip the instructed recording period and at least one of the data for the first period and the data for a second period from the instructed recording end time to the real recording end time, and of generating management information for managing the instructed recording period and the data the first period and the second period as an extended clip, generating the management information for each of the extended clips, the management information containing clip information for specifying a head and an end of each of the extended clips and for specifying a head and an end of each of the clips, wherein at least one of the information for specifying the head of the clip and the information for specifying the end of the clip is changeable within a range between the head and the end of the extended clip wherein the management information includes an edit list which contains information for specifying a playback start point and a playback end point of each of the extended clips so as to playback at least part of the data of at least one of the extended clips, further comprising a changing step of, when at least one of the playback start point and the playback end point of each of the extended clips in the edit list is changed, automatically changing information for specifying the head and the end of the corresponding clip information when the changed playback start point or playback end point is outside the range specified by the head and the end of the clip information.

* * * * *

UNITED STATES PATENT AND TRADEMARK OFFICE
CERTIFICATE OF CORRECTION

PATENT NO. : 7,593,619 B2 Page 1 of 1
APPLICATION NO. : 10/493584
DATED : September 22, 2009
INVENTOR(S) : Kenji Yamasaki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1489 days.

Signed and Sealed this

Fourteenth Day of December, 2010

David J. Kappos
*Director of the United States Patent and Trademark Office*